US008287986B2

(12) United States Patent
Huss et al.

(10) Patent No.: US 8,287,986 B2
(45) Date of Patent: Oct. 16, 2012

(54) ULTRA PREMIUM BATH TISSUE

(75) Inventors: Richard D. Huss, Appleton, WI (US); Brian J. Schuh, Appleton, WI (US); Michael E. Hennes, Neenah, WI (US); Kang Chang Yeh, Neenah, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 464 days.

(21) Appl. No.: 12/455,017

(22) Filed: May 27, 2009

(65) Prior Publication Data

US 2009/0297781 A1 Dec. 3, 2009

Related U.S. Application Data

(60) Provisional application No. 61/128,941, filed on May 27, 2008.

(51) Int. Cl.
*D06N 7/04* (2006.01)
*D21H 27/40* (2006.01)
*B32B 27/14* (2006.01)

(52) U.S. Cl. ......... 428/156; 428/153; 428/154; 428/198

(58) Field of Classification Search .................. 428/153, 428/154, 156, 172, 198
See application file for complete search history.

(56) References Cited

U.S. PATENT DOCUMENTS

| | | | |
|---|---|---|---|
| 3,414,459 A | 12/1968 | Wells | |
| 3,554,862 A | 1/1971 | Hervey et al. | 162/158 |
| 3,554,863 A | 1/1971 | Hervey et al. | |
| 3,650,882 A | 3/1972 | Thomas | |
| 3,684,603 A | 8/1972 | Iltis | |
| 3,834,286 A | 9/1974 | Nystrand | |
| 3,844,880 A | 10/1974 | Meisel, Jr. et al. | |
| 3,868,205 A | 2/1975 | Thomas | |
| 3,953,638 A | 4/1976 | Kemp | |
| 4,064,213 A | 12/1977 | Lazorisak et al. | |
| 4,094,718 A | 6/1978 | Czerwin | |
| 4,100,017 A | 7/1978 | Flautt, Jr. | |
| 4,304,625 A | 12/1981 | Grube et al. | |
| 4,320,162 A | 3/1982 | Schulz | |
| 4,376,671 A | 3/1983 | Schulz | |
| 4,469,735 A | 9/1984 | Trokhan | |
| 4,501,640 A | 2/1985 | Soerens | |
| 4,528,316 A | 7/1985 | Soerens | |
| 4,603,176 A | 7/1986 | Bjorkquist et al. | |
| 4,605,702 A | 8/1986 | Guerro et al. | |
| 4,675,394 A | 6/1987 | Solarek et al. | |
| 4,684,439 A | 8/1987 | Soerens | |

(Continued)

FOREIGN PATENT DOCUMENTS

EP 0 675 225 10/1995

(Continued)

OTHER PUBLICATIONS

J. D. Bates, in "Softness Index: Fact or Mirage?" TAPPI, vol. 48 (1965), No. 4, pp. 63A-64A.

*Primary Examiner* — Catherine A Simone
(74) *Attorney, Agent, or Firm* — Laura L. Bozek

(57) ABSTRACT

Visibility of ply-bonding created by glassining spot embossing on decorative pattern embossed tissue products is provided by obscuring the glassined spot embosses by distributing them along a meandering path through the decorative pattern, obscuring the edges of the glassined spot embosses by providing a gradual transition therefrom and combinations of the two techniques.

36 Claims, 48 Drawing Sheets

U.S. PATENT DOCUMENTS

| | | | | |
|---|---|---|---|---|
| 4,720,383 | A | 1/1988 | Drach et al. | |
| 4,795,530 | A | 1/1989 | Soerens et al. | |
| 4,804,769 | A | 2/1989 | Solarek et al. | |
| 4,866,151 | A | 9/1989 | Tsai et al. | |
| 4,883,564 | A | 11/1989 | Chen et al. | |
| 4,886,579 | A | 12/1989 | Clark et al. | |
| 4,927,588 | A | 5/1990 | Schulz | |
| 4,981,557 | A | 1/1991 | Bjorkquist | |
| 4,983,748 | A | 1/1991 | Tsai et al. | |
| 5,008,344 | A | 4/1991 | Bjorkquist | |
| 5,085,736 | A | 2/1992 | Bjorkquist | |
| 5,093,068 | A | 3/1992 | Schulz | |
| 5,138,002 | A | 8/1992 | Bjorkquist | |
| 5,145,737 | A | 9/1992 | Boiron et al. | |
| 5,180,471 | A | 1/1993 | Sauer et al. | |
| 5,217,576 | A | 6/1993 | Van Phan | |
| 5,223,096 | A | 6/1993 | Phan et al. | |
| 5,225,047 | A | 7/1993 | Graef et al. | |
| 5,240,562 | A | 8/1993 | Phan et al. | |
| 5,246,544 | A | 9/1993 | Hollenberg et al. | |
| 5,262,007 | A | 11/1993 | Phan et al. | |
| 5,281,307 | A | 1/1994 | Smigo et al. | |
| 5,312,522 | A | 5/1994 | Van Phan et al. | |
| 5,354,425 | A | 10/1994 | Mackey et al. | |
| 5,374,334 | A | 12/1994 | Sommese et al. | |
| 5,382,323 | A | 1/1995 | Furman, Jr. et al. | |
| 5,382,464 | A | 1/1995 | Ruppel et al. | |
| 5,399,241 | A | 3/1995 | Oriaran et al. | |
| 5,437,908 | A | 8/1995 | Demura et al. | |
| 5,543,202 | A | 8/1996 | Clark et al. | |
| 5,622,734 | A | 4/1997 | Clark et al. | |
| 5,693,406 | A | 12/1997 | Wegele et al. | |
| 5,698,291 | A | 12/1997 | Clark et al. | |
| 5,736,223 | A | 4/1998 | Laurent | |
| 5,755,654 | A | 5/1998 | Schulz et al. | |
| 5,830,558 | A | 11/1998 | Barnholtz | |
| 5,882,464 | A | 3/1999 | Theisgen et al. | |
| 5,906,711 | A | 5/1999 | Barnholtz | |
| 5,919,556 | A | 7/1999 | Barnholtz | |
| 5,958,555 | A | 9/1999 | Takeuchi et al. | |
| 6,033,761 | A | 3/2000 | Dwiggins et al. | |
| 6,106,928 | A | 8/2000 | Laurent et al. | |
| 6,153,053 | A | 11/2000 | Harper et al. | |
| 6,165,585 | A | 12/2000 | Trokhan | |
| 6,180,214 | B1 | 1/2001 | Nissing et al. | |
| 6,221,211 | B1 | 4/2001 | Hollenberg et al. | |
| 6,245,197 | B1 | 6/2001 | Oriaran et al. | |
| 6,270,875 | B1 | 8/2001 | Nissing | |
| 6,328,850 | B1 | 12/2001 | Phan et al. | |
| 6,573,203 | B1 | 6/2003 | McConnell et al. | 442/79 |
| 6,589,634 | B2 | 7/2003 | Schultz et al. | |
| 6,599,614 | B1 | 7/2003 | Roussel et al. | |
| 6,602,387 | B1 | 8/2003 | Loughran et al. | |
| 6,607,630 | B2 | 8/2003 | Bartman et al. | |
| 6,656,569 | B1 | 12/2003 | Roussel et al. | |
| 6,733,866 | B2 | 5/2004 | Muller | |
| 6,746,558 | B2 | 6/2004 | Hoeft et al. | |
| 6,805,766 | B1 | 10/2004 | Roussel et al. | |
| 6,827,819 | B2 | 12/2004 | Dwiggins et al. | |
| 6,896,768 | B2 | 5/2005 | Dwiggins et al. | |
| 6,913,673 | B2 | 7/2005 | Baggot et al. | |
| 6,936,330 | B2 | 8/2005 | Fereshtehkhou et al. | |
| 6,949,167 | B2 | 9/2005 | Shannon et al. | 162/135 |
| 7,063,766 | B2 | 6/2006 | Saarvali et al. | |
| 7,381,299 | B2 | 6/2008 | Shannon et al. | 162/125 |
| 7,497,923 | B2 | 3/2009 | Ward et al. | |
| 2002/0103469 | A1 | 8/2002 | Chen et al. | 604/374 |
| 2003/0111196 | A1 | 6/2003 | Hu | |
| 2003/0111198 | A1 | 6/2003 | Hu | |
| 2003/0127203 | A1 | 7/2003 | Hu | |
| 2003/0215605 | A1 | 11/2003 | Muller | 428/138 |
| 2004/0009327 | A1 | 1/2004 | Saarvali et al. | |
| 2004/0018369 | A1 | 1/2004 | Goulet et al. | 428/535 |
| 2004/0023003 | A1 | 2/2004 | Basler et al. | |
| 2004/0045685 | A1 | 3/2004 | Horner et al. | |
| 2004/0062916 | A1 | 4/2004 | Mansson et al. | |
| 2004/0163783 | A1 | 8/2004 | Muller | |
| 2004/0166290 | A1 | 8/2004 | Sembritzki et al. | |
| 2004/0168780 | A1 | 9/2004 | Dwiggins et al. | 162/125 |
| 2004/0238135 | A1 | 12/2004 | Edwards et al. | |
| 2005/0034826 | A1 | 2/2005 | Hu | |
| 2005/0045267 | A1 | 3/2005 | Muvundamina | |
| 2005/0199759 | A1 | 9/2005 | Redmann et al. | |
| 2005/0199761 | A1 | 9/2005 | Redmann et al. | |
| 2005/0217814 | A1 | 10/2005 | Super et al. | |
| 2005/0241786 | A1 | 11/2005 | Edwards et al. | |
| 2005/0241787 | A1 | 11/2005 | Murray et al. | |
| 2005/0279471 | A1 | 12/2005 | Murray et al. | |
| 2006/0000567 | A1 | 1/2006 | Murray et al. | |
| 2006/0237154 | A1 | 10/2006 | Edwards et al. | |
| 2006/0269706 | A1 | 11/2006 | Shannon et al. | 428/35.2 |
| 2006/0289133 | A1 | 12/2006 | Yeh et al. | |
| 2006/0289134 | A1 | 12/2006 | Yeh et al. | 162/111 |
| 2007/0095461 | A1 | 5/2007 | Redmann et al. | |
| 2008/0029235 | A1 | 2/2008 | Edwards et al. | |
| 2008/0053598 | A1 | 3/2008 | Redmann et al. | |
| 2009/0162611 | A1 | 6/2009 | Ward et al. | |

FOREIGN PATENT DOCUMENTS

| | | | |
|---|---|---|---|
| EP | 0755212 | | 1/1997 |
| EP | 0782503 | B1 | 12/1999 |
| EP | 1533112 | A1 | 5/2005 |
| EP | 1 632 604 | | 3/2006 |
| GB | 1059746 | | 2/1967 |
| WO | WO 95/27429 | | 10/1995 |
| WO | 00/31340 | | 6/2000 |
| WO | 01/12902 | | 2/2001 |
| WO | 03/054302 | | 7/2003 |
| WO | WO 2005/089342 | | 9/2005 |

PLY BOND STRENGTH AS FUNCTION OF PRESSURE AND WHEEL DESIGN

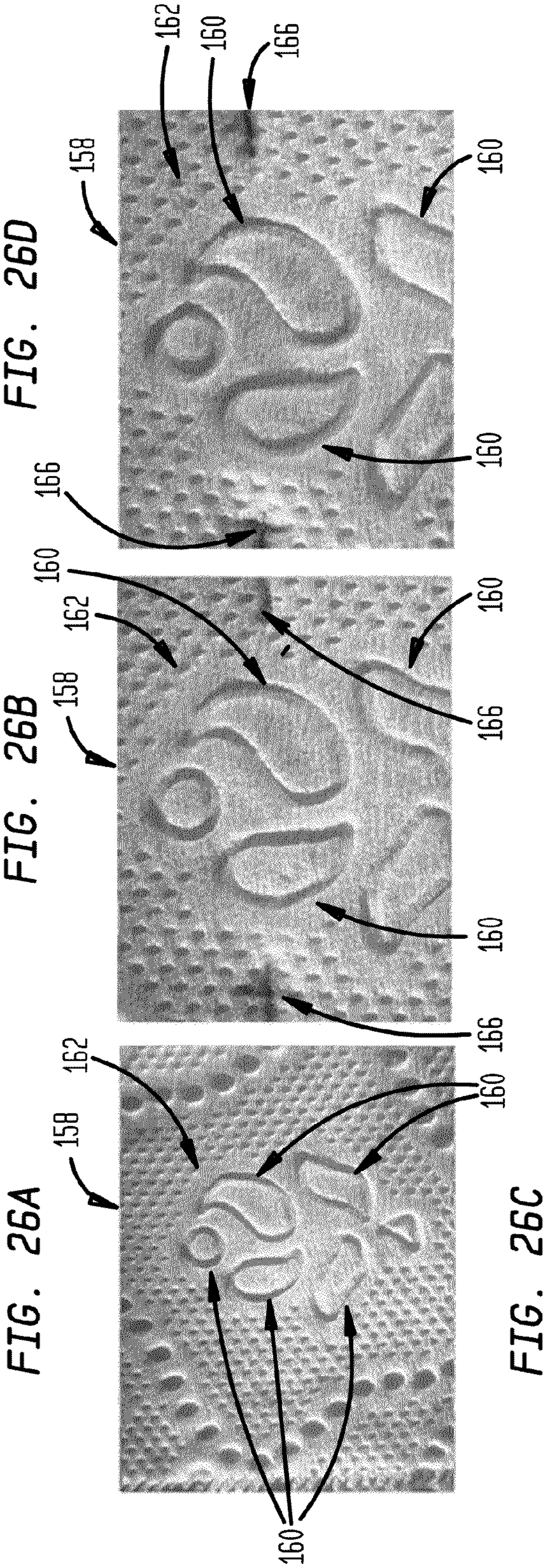
FIG. 26A
FIG. 26B
FIG. 26D
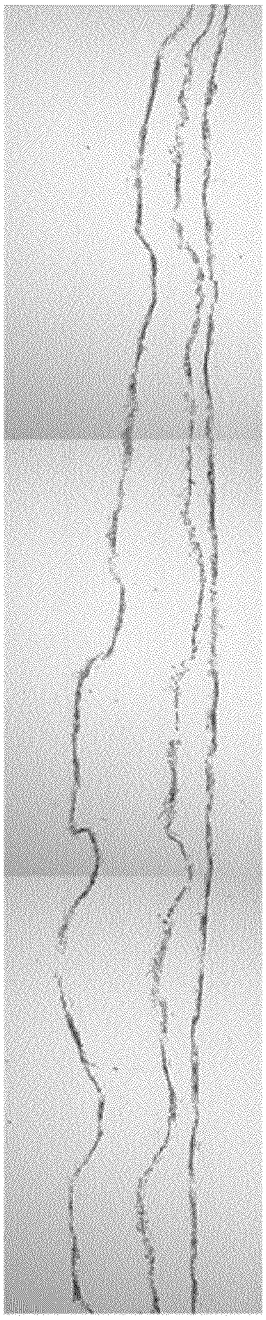
FIG. 26C
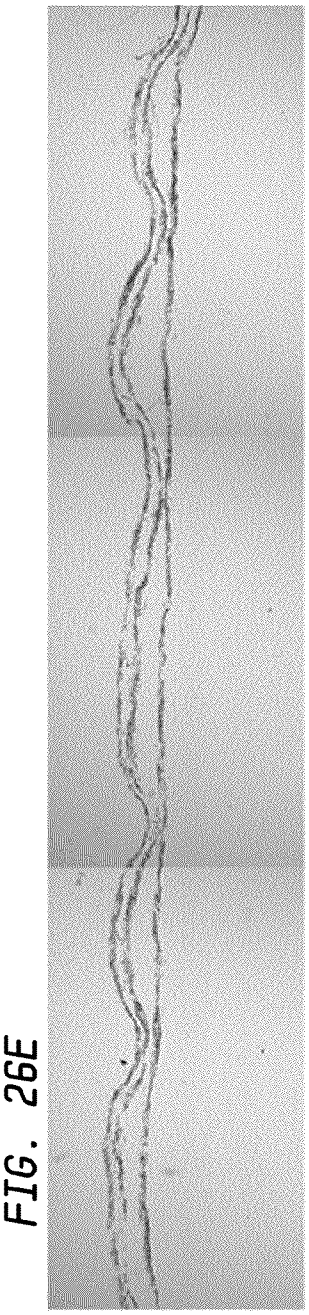
FIG. 26E

COMPARISON OF CALIPER AND GMT FOR 3-PLY ULTRA FORMATS

COMPARISON OF SENSORY SOFTNESS AND GMT FOR 3-PLY ULTRA FORMATS

Y = 0.25 SIN (3.0006X)
SINE WAVE WITH AMPLITUDE 0.5 AND WAVELENGTH 2.094

ULTRA PREMIUM BATH TISSUE

CROSS-REFERENCE TO RELATED APPLICATION

This application claims priority to U.S. Provisional Application Ser. No. 61/128,941, filed May 27, 2008. The disclosure of the foregoing application is hereby incorporated into this application in its entirety by reference thereto.

BACKGROUND OF THE INVENTION

Softness is considered quite important for sanitary tissue products as these products typically come into contact with delicate and possibly inflamed regions of the human body including nasal, oral and perineal regions. Softness of sanitary tissue products can often be improved by adopting a multi-ply construction in which, for example, a finished tissue product having a basis weight in the neighborhood of 20 or 40 pounds per 3000 square-foot ream is comprised of two or three plies of tissue, each having a basis weight of approximately 8 to 17 pounds per ream. However, in many cases, the ply bonding technology used to integrate the plies into a single sheet of tissue prevents the full potential of the multi-ply technique from being realized. In some cases, as when adhesive is used for ply bonding, the effect can be to harshen the sheet, forcing the designer to adapt a compromise between effective ply bonding and softness. In other cases, as when plies are joined by embossing them together, one side of the resulting embossed structure will often be considerably harsher than the other, again at least partially defeating the intent of adopting a multi-ply construction.

Often sanitary tissue products having commendable softness can be obtained by combining either separately embossed plies or embossed and less highly embossed (possibly unembossed) plies such that any points or protrusions created by embossing are inwardly directed toward the center of the resulting multi-ply structure. Using these techniques, tissue products having a velutinous or velvety surface feel can be obtained; as the technique, in effect, shields the harsh points in the interior of the sheet. However, a great deal of the potential gain in softness achievable by this technique can be lost in those cases in which the plies are joined by adhesive.

Accordingly, in some commercial embodiments of this technique, plies have been joined to each other by knurled ply-bonding which avoids both the potential harshness entailed by liberal use of adhesives as well as the asperities created when embossed points are not concealed within the sheet. In a typical spot glassining operation, the tissue is spot glassined as it is rewound into the form of a "log"13 tissue wound onto the core upon which it will be sold, but before the individual rolls have been cut from the log. Accordingly, the "log" is of about the same diameter as a finished roll but is several feet in length, often 10 or more. Typically, two knurled ply-bonding wheels are allocated for each finished roll to be cut from the log. In typical operations, most of the cylindrical face of the knurled ply-bonding wheel is employed in forming a line of spot glassining; and, so, use of these conventional knurled ply-bonding wheels typically results in a very good, tight ply bond along the two highly compressed lines created when the previously unbonded multi ply structure is passed between the knurled ply-bonding wheels and anvil roll. As it can be somewhat difficult to control precisely where the marks left by the knurled ply-bonding wheels will fall relative to the ends of finished rolls; heretofore, this process has, in many cases, left an unfortunate, non-symmetrical "railroad track" appearance on the roll which some consumers find aesthetically unappealing, particularly if the spot glassining lines are not centered on the sheet, rolls having somewhat un-centered spot glassining lines being more common than perfectly balanced rolls.

We have discovered that it is possible to conceal, obscure or disguise the spot glassining lines in a multi-ply tissue product. In one method, we accomplish this by using knurled ply-bonding wheels of rather greater thickness than normal having spicules projecting from the cylindrical face thereof arranged in a sinuous or meandering path on the cylindrical face of the knurled ply-bonding wheel. By use of this technique: a plurality of spot embosses can be formed joining the plies together; the "railroad track" appearance of conventional spot glassining can be obviated; and the spot glassined pattern concealed, disguised or obscured in the embossed pattern. In the preferred embodiments, the plies are glassined together at the point of many of the spot embosses forming a tenacious bond that is quite durable, making it possible to achieve effective ply-bonding with a very small number of glassined spot embosses which have the further benefit of not creating asperities on either side of the multi-ply tissue product as the glassined tissue areas recede into the tissue away, from both surfaces.

In an alternative spot glassining technology, the knurled ply-bonding wheel has projections shaped to avoid formation of sharp discontinuities at the edges of the spot glassined regions. In preferred embodiments, we use a generally cylindrical knurled ply-bonding wheel that has a slight barrel shape, the peripheral cylindrical face bowing outwardly a slight amount, perhaps 10 to 50 mils, the shoulders sloping inwardly at about 10° to 25°, with the emboss elements being figuratively formed by transverse cuts tangent to the cylindrical face made through the bowed face at an angle of between 15° and 65°, preferably about 20° to 50°, with respect to the axis of the cylinder. In practice, it is more expedient to form the elements by taking a cylindrical wheel, grinding or turning away about 10 to 50 mils of the shoulders at an angle around 10° to 20 from the axis to form the bowed face, then knurling grooves into the bowed face and finally grinding away the very tips of the knurls to leave a thin planar plateau. The resulting emboss elements have a plateau region which is from about 3 to 12 mils in width as measured in the direction perpendicular to the cut and having a length of between about 20 to about 70 mils in the direction parallel to the cut. The preferred area of the peak is about 50 to 1000 square mils. The shoulders of the emboss peak fall off at an angle between about 10° and 25° and widen toward the periphery of the lateral face of the knurled ply-bonding wheel. We have found that if the shoulders of the emboss glassining area fall off gradually, say under about 30°, preferably under 20° and most preferably under 15°, the formation of a visually distinct sharp edge can be avoided on the tissue greatly diminishing the visibility of the line of knurls. It is further preferable that the long axes of the plateaus form a helical angle with respect to the axis of the knurled ply-bonding wheel of between about 15° and 45°.

Ultra premium bath tissue has become an important segment of the bath tissue market. An increasing portion of the population prefers bath tissue which is thicker, heavier in weight and more opaque. And, as always, ever-increasing levels of softness are preferred. In North America, the overall bath tissue market has heretofore been largely dominated by either single ply, particularly in the case of through air dried products, or double ply bath tissue, while the European market has had many entrants with three or more plies, primarily in the stronger grades, preferred in parts of that market. However, even with two ply products, consumers often experience problems with ply separation leading to difficulties in removing the desired quantity of product from the roll.

We have discovered that a 3 ply bath tissue largely meeting these demands can be formulated by the process of embossing two plies of bath tissue basesheet together, and mechanically combining these two plies with a third generally planar, or less heavily embossed, backing ply by either of the above described spot glassining procedures which glassine the layers together either with a number of spot embosses lying on a meandering path obscured in the embossing pattern on the embossed sheets or with very narrow glassined regions with indistinct ends which are far less visible than more sharply defined spot embosses. Typically the glassined spot embosses will be confined to only a very small area of the overall surface of the tissue. By use of this technique, a plurality of spot embosses can be formed joining the plies together; the "railroad track" appearance of conventional spot glassining can be obviated; and the spot glassined pattern concealed, disguised or obscured in the embossed pattern. In the preferred embodiments, the plies are glassined together at the point of many of the spot embosses forming a tenacious bond that is quite durable. After the log is formed, the tissue is preferably tail sealed by folding the exterior tail of the tissue back upon the roll and joining the resulting folded tail structure to the underlying layer of tissue with a controlled penetration adhesive such that a folded double-thickness tail is provided to the consumer for starting the roll.

In those embodiments in which maximum softness is desired, the first two plies of bath tissue may be embossed together with a pattern comprising groups of large emboss elements interspersed among a plurality of smaller emboss elements, the plies may be separated, one of these plies displaced relative to the other such that the groups of large emboss elements partially overlap, the embossed plies being subsequently combined with a third generally planar backing ply to provide a sheet have greatly increased caliper capable of imparting a sense of improved protection and thickness. In many of these embodiments, the width of the embossing nip (in the MD) used may somewhat exceed the width of the embossing nip which would normally be used for embossing two comparable plies together as the process of separating the plies tends to soften the emboss definition. It is preferred that the emboss pattern have a combination of groups of large emboss elements interspersed in a plurality of micro emboss elements and the displacement between the two heavily embossed plies be selected such that the groups of large emboss elements partially overlap, imparting an exaggerated puffiness to the appearance of these emboss elements making them appear billowy as compared to conventional emboss elements.

We have found that, by proper choice of the emboss patterns, parameters and substrates, we can achieve extremely high levels of consumer acceptance without requiring use of very high levels of softeners, debonders, conditioners or lotions as found in some current ultra premium bath tissue products. Not only can this simplify the manufacturing process considerably while removing a significant item of expense, it can also obviate concerns due to presence of high levels of chemicals in such products.

To achieve the foregoing advantages and in accordance with the purpose of the invention as embodied and broadly described herein, there is provided, in one embodiment of the invention, a three-ply tissue product formed by embossing together two heavily embossed plies with a third ply which is, at most, lightly embossed. The two heavily embossed plies are formed by an embossing process in which the two plies are embossed together then optionally separated. One of the two plies is then displaced, preferably longitudinally, relative to the other such that the groups of large elements on the two highly embossed plies only partially overlap and the plies are bonded to the third ply to provide an ultra bulky, low sidedness, soft three ply tissue. Preferably, the embossed plies are provided with a reticulated, tessellated emboss pattern, forming a pattern of cells with at least some of the cells being partially filled with a macro signature emboss comprising a group of large emboss elements. More preferably, a large portion of the void or unembossed areas remaining in the cells are filled with a micro pattern, the height of the elements forming the micro pattern being no more than about 60% of the height of the predominant elements in the macro pattern. In the most preferred embodiments, the third ply constitutes a lightly embossed or unembossed backing sheet masking the projections from the innermost sheet of said first and second plies. Surprisingly high softness can be achieved using this construction without requiring extensive use of eucalyptus or ultra-premium quality fibers.

In accordance with another aspect of the present invention, there is provided a multi-ply tissue product formed by embossing a first ply with a second ply, the embossed plies having groups of large scale embosses, an embossed area of at least about 2%, preferably more than 4%, more preferably greater than 8%, then ply-bonding by spot glassining the embossed plies together with a backing ply covering the projecting emboss elements on the intermediate embossed ply to form a multi-ply tissue product, wherein the multi-ply tissue product exhibits a plurality of emboss elements, said multi-ply tissue comprising: an upper embossed ply bearing a plurality of groups of large emboss elements interspersed among a plurality of smaller emboss elements; an intermediate ply bearing a substantially similar emboss pattern to said upper ply, and a generally planar backing ply joined thereto, said three ply sheet of cellulosic bath tissue exhibiting: a basis weight of at least about 25 pounds per 3000 sq ft ream; an opacity of at least about 72; a caliper of at least about 4.2 mils per eight sheets per pound of basis weight; a geometric mean of the mean deviation in the mean coefficient of friction of no more than about 0.8; and a geometric mean modulus of less than about 60; and a geometric mean tensile strength of less than about 35 g/3" per lb. of basis weight.

In accordance with another embodiment of this invention, there is provided a roll of 3-ply sheets of cellulosic bath tissue having 3 plies of tissue joined together with an exterior tail projecting from the roll, comprising: an upper embossed ply bearing emboss elements; an intermediate ply bearing a substantially similar emboss pattern to said upper ply and being mechanically joined to said upper embossed ply by an entanglement/glassined region coincident with at least some of said emboss elements; and a generally planar backing ply mechanically joined to said intermediate ply by an entanglement/glassined region extending over less than about 1% of the area of said sheet, more preferably less than 0.1% and most preferably under 0.05% of the area of said sheet, the exterior tail of said roll being folded and adhesively bonded to itself with controlled penetration at a first location overlapping the tucked in tail of the roll and to the underlying layer in said roll at a second location, the distance between the first location and the second location being less than the length of tissue in said tail between said first and second locations; a plurality of said three ply sheets of cellulosic bath tissue exhibiting: a basis weight of at least about 25 pounds per 3000 sq ft ream; an opacity of at least about 72; a caliper of at least about 4.2 mils per eight sheets per pound of basis weight; a geometric mean of the deviation in the coefficient of friction of no more than about 0.8; and a geometric mean modulus of less than about 60. This embodiment provides a 3 ply tissue which largely overcomes the major problems experienced with ply-bonding while avoiding the loss of softness attendant upon the use of large amounts of adhesive for ply-bonding.

RELATED ART

Even though methods of producing tissue with three or more plies are well-known, until very recently, none have found widespread acceptance in the North American market. Sembritzki et al., US Patent Application Publication 2004/0166290 A1, disclose a method of producing multi-ply tissues by embossing two or more plies together, separating the embossed plies, then displacing one relative to the other by a prescribed amount before recombining these plies with other embossed plies. Sembritzki et al., primarily deal with tissue comprising four plies, but see paragraph [0013] stating "On one side of the recombined tissue, the embossing protrusions will extend outward. This might slightly impair the aesthetic appearance and the haptics of the product. To avoid this, another ply, either unembossed or embossed can be joined to the laminate. In case an embossed ply is used, the embossing protrusions thereof ought to be directed inwards." Sembritzki et al., suggest adhesive, ultrasonic welding and mechanical ply bonding in an embossing nip as a method of joining plies together expressing no preference for any one over the other and without discussing how to avoid drawbacks associated with any of these techniques. Sembritzki et al., are silent concerning both desirability of and technology to be used for tail seal and is completely silent with regard to the impact of ply bonding technique on softness and the difficulty of obtaining good ply bonding while maintaining ultra premium levels of softness. Similarly, Sembritzki et al., fail to suggest the desirability of including a plurality of macro emboss elements which are partially overlapped to impart a billowy appearance to the finished tissue. Rather Sembritzki et al., suggest displacing the sheets by the lesser of no more than twelve times the height of the emboss elements or fourteen times their length, apparently assuming that all elements will have the same size and shape.

Schulz, U.S. Pat. No. 4,927,588, discloses a method for manufacturing a multi-ply tissue by combining separate unembossed fibrous webs into a multi-ply sheet, embossing the plies together, separating the plies, displacing them relative to one another in a longitudinal direction so as to preclude nesting with one another, then recombining them to form a multi-ply tissue having enhanced softness. Schulz is silent with regard to the method used in recombining the embossed and longitudinally displaced plies and similarly passes over tail-seal issues.

Dwiggins et al., U.S. Pat. No. 6,896,768, incorporated herein by reference, relates to a method of forming an ultra-soft, bulky, multi-ply tissue having low overall sidedness by combining a first ply, heavily embossed, with a second ply wherein the multi-ply tissue product exhibits an overall TMI sidedness of less than about 0.6. At column 13, line 66 through column 14, line 9, Dwiggins et al., suggest adhering the plies to each other using an adhesive either alone or in conjunction with an embossing or spot glassining pattern, stating that:

> " . . . Although the processes of the current invention have been described for two-ply structures, it should be obvious to one skilled in the art that these processes can be extended to include structures made of three or more plies. In such cases, two of the plies could be joined together prior to embossing and joining with the other ply or plies. Alternatively, one or more unembossed plies could be sandwiched between the embossed plies such that the protrusions from each embossed ply contact an unembossed ply on the inside of the sheet. Such variations are within the scope of the current invention.
>
> In one alternative embodiment, the two plies may be adhered using an adhesive either alone or in conjunction with an embossing or knurling pattern. Suitable adhesives are well known and will be readily apparent to the skilled artisan. According to this embodiment, the two plies are embossed with adhesive being applied only to the tips of the raised bosses of the product and ultimately located between the two plies of the product . . . ."

Significantly, Dwiggins, et al. fails to mention the possibility of obtaining a combination of surprising softness in a three ply structure with satisfactory ply bonding by combining knurling and a double thickness tail seal. Dwiggins, et al fail to suggest the desirability of including a plurality of macro emboss elements which are partially overlapped to impart a billowy appearance to the finished tissue and also fail to suggest any method of obscuring glassined regions used for ply-bonding.

Hu, United States Patent Application Publication 2005/0034826 A1, discloses a product having two, three or are more plies wherein hardwood layers, such as, for example, eucalyptus-containing fiber later, are provided on the outside surfaces of each ply. However, Hu is silent on the methods to be used for either ply bonding or tail seal.

Horner et al., United States Patent Application Publication 2004/0045685 A1, at paragraph [0043] suggests that:

> "Two or more plies of tissue paper are combined to form the multi-ply tissue. The plies may, optionally, be attached together by means, for example, of gluing or embossing. Gluing is less preferred because it tends to result in a stiffer, less soft product. Indeed it is preferred that no glue is used to attach the plies. Embossing may be used to attach the plies together, for example, as disclosed in EP-A 0755212 published on Jan. 29, 1997. According to the present invention the tissue has an unembossed wiping surface over a major part of the surface area of the tissue. As used herein, this means that the tissue has one or more unembossed regions and, optionally, one or more embossed regions, and that the unembossed region is at least 50%, and as much as 100%, of the surface area of the tissue. As used herein an embossed region is a region of the tissue having a plurality of embossed points. Most commonly the embossed regions lie close to the edge of the tissue (for example along two or four edges); and embossed regions may also be used for decorative purposes (for example to create a pattern or to spell out a logo or brand name). The unembossed region is the continuous region between and/or around at the embossed regions."

Significantly, Horner's only examples are of a two ply tissue "subjected to an embossing step before folding. The margin of the tissue paper product, extending about 15 mm in from the edge was embossed following the process described in WO95/27429 published on Oct. 19, 1995. The major part of the surface area of the tissue paper product (i.e. all of the surface area within the 15 mm margin) was unembossed." See paragraph [0059]. It is further significant that Horner's process is directed to a folded facial tissue product, rather than a roll, affording him the opportunity to emboss around all four edges of each sheet of tissue.

Muller, United States Patent Application Publication 2004/0163783A1, teaches mechanical ply bonding between at least two plies using mechanical ply bonding occurring at the embossing sites and suggests that "one or each of the plies . . . may comprise two or more plies which are embossed together in the respective embossing station. Thus the final paper product may have two, three or more plies . . . the plies are bonded together in points or spots by mechanical welding . . . ". See paragraphs [0027]-[0029]. Significantly, Muller fails to provide any working examples and does not address tail seal.

Theisgen et al., U.S. Pat. No. 5,882,464, suggests joining absorbent articles, particularly absorbent structures which have one of its four layers being shorter in the manufacturing direction than at least one of the other layers, by crimping. It appears that Theisgen et al. are dealing with forming a diaper rather than a tissue product.

Clark et al. U.S. Pat. No. 5,698,291, teaches that there is "a need for absorbent multiple-ply tissue laminate having desirable levels applied attachment resulting from crimp-bonding produced without the use of adhesives." . . .

> The term 'crimp bonding' refers to a form of autohesive bonding between two or more plies of fibrous cellulosic material (i.e., attachment between the constituent material of the plies without application of adhesive agents) . . . . Crimp bonding is thought to involve two stages: 1) establishing bonding contact between the plies, and 2) bond formation. Bonding content generally requires relatively high pressure distributed over a small area of the superposed plies of fibrous cellulosic material. The contact pressure, temperature, strength and modulus of the materials and/or other factors may influence how the cellulosic material is apparently deformed and momentarily transformed into what might be characterized as a viscous state . . . . Crimp-bonding is generally attributed to van der Waal's forces as well as mechanical bonding (e.g., entangled, interlocked and smashed and/or crushed fibers) which may be created when relatively high pressure loads are applied. A small portion of the crimp-bonds may be attributed to a hydrogen bonding (e.g. "paper bonding") which may be induced by the combination of high pressure loads and certain moisture levels in the fibrous cellulosic plies." [Column 3, lines 16-40].

While Clark et al. state that "it is contemplated that more than two plies may be used in the process present invention" they fail to provide any working examples with more than two plies and also fail to address the issue of tail seal.

Demura et al., U.S. Pat. No. 5,437,908, relates to a process of forming a bathroom tissue suitable for use in toilets equipped with a washing facility from a two or three layer [sic ply] structure in which a wood pulp layer (ply) is disposed adjacent a layer (ply) of mixed rayon and wood pulp. Significantly, in the examples of Demura et al., poly vinyl alcohol is included in the mixed wood pulp/rayon layers in an amount of 1.55 to 3% indicating that Demura et al. were, most likely, far more interested in achieving wet strength properties than achieving levels of softness suitable for the ultra-premium market.

BRIEF DESCRIPTION OF THE DRAWINGS

FIGS. 26A-26E are photomicrographs of three ply bath tissues wherein the plies have not been displaced relative to each other.

DESCRIPTION OF THE PREFERRED EMBODIMENT

Figure 1:
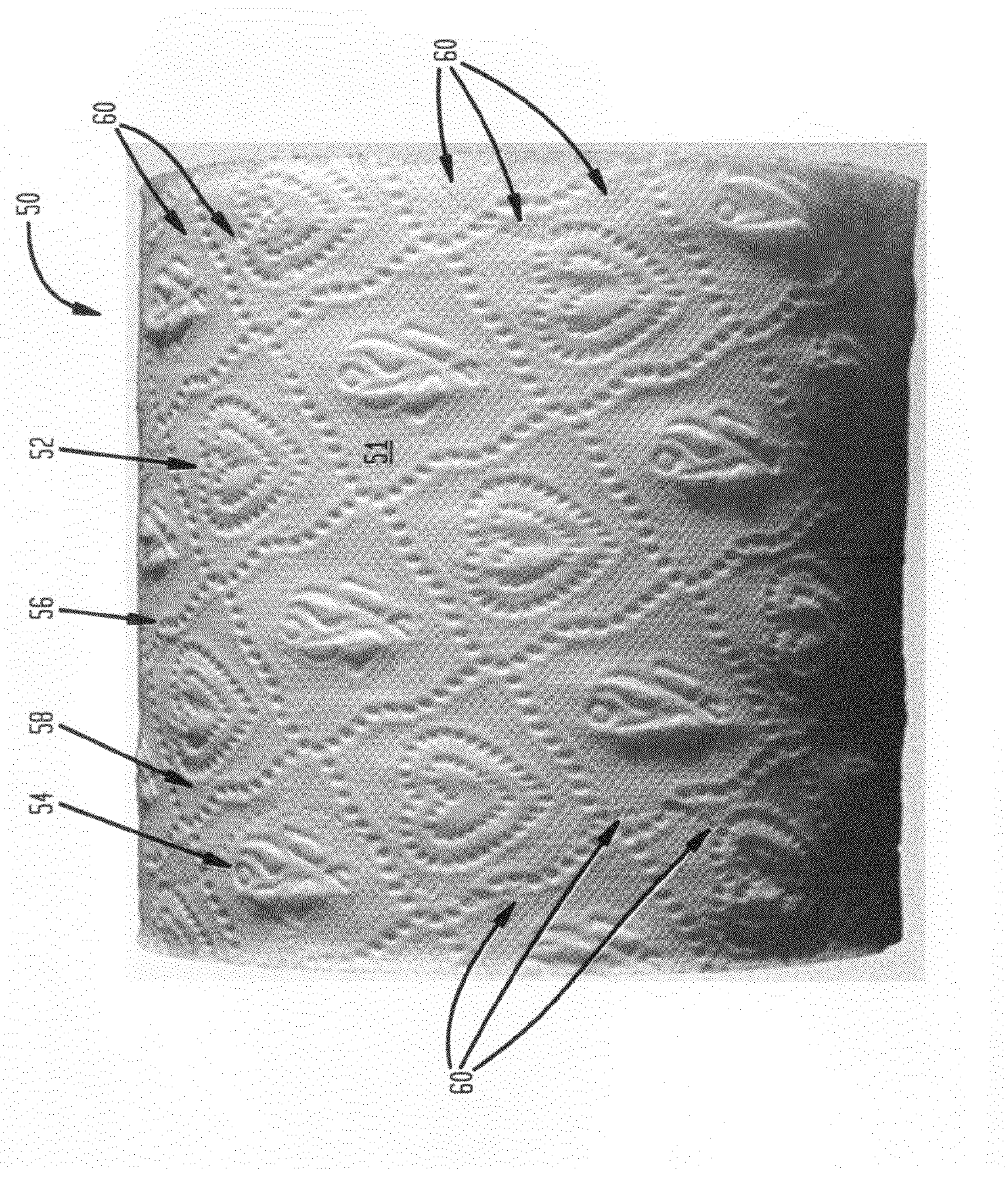
FIG. 1 is a photograph of a roll of bath tissue in which the plies are joined to each other using spot glassining according to the present invention.
Figure 2:
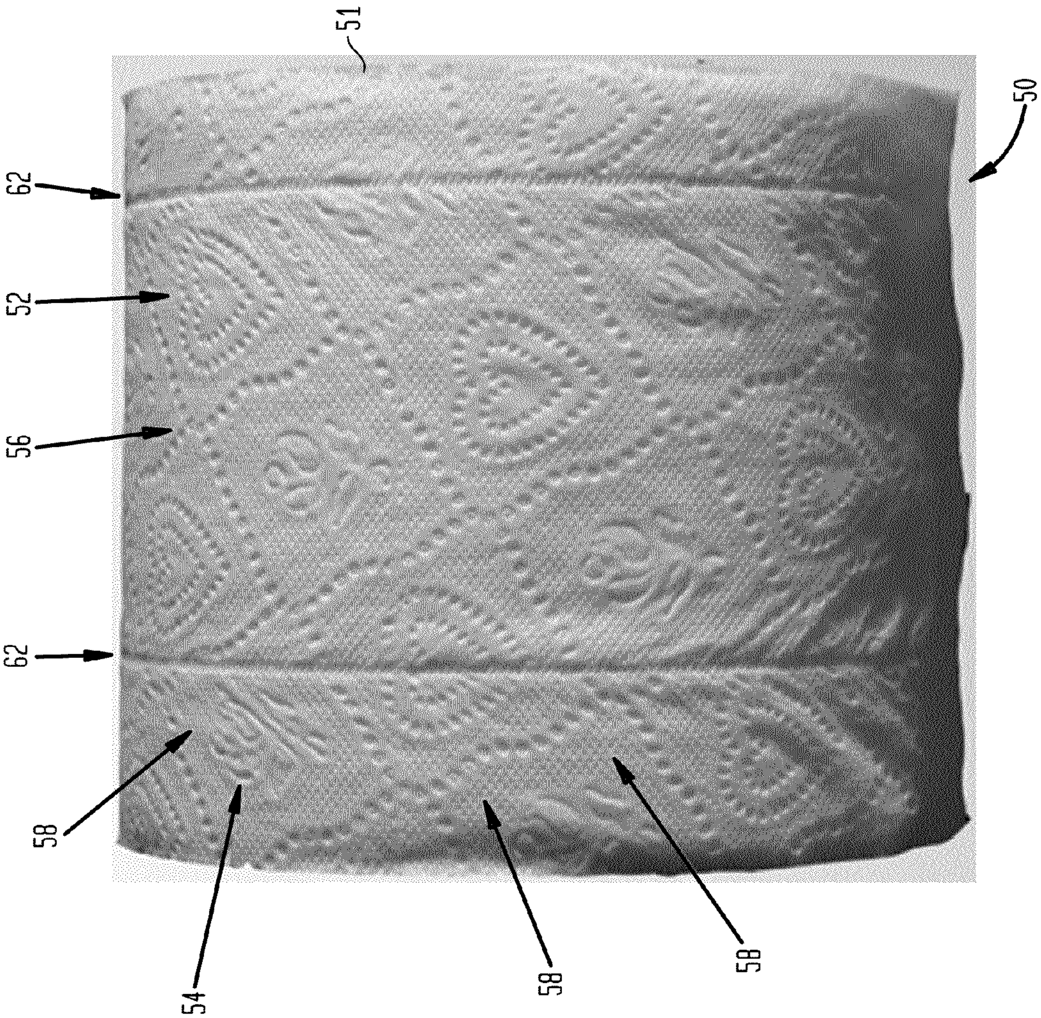
FIG. 2 (PRIOR ART)
FIG. 2 is a photograph of a roll of prior art bath tissue in which the plies are joined to each other using conventional spot glassining resulting in an unbalanced "railroad track" appearance.
Figure 3:
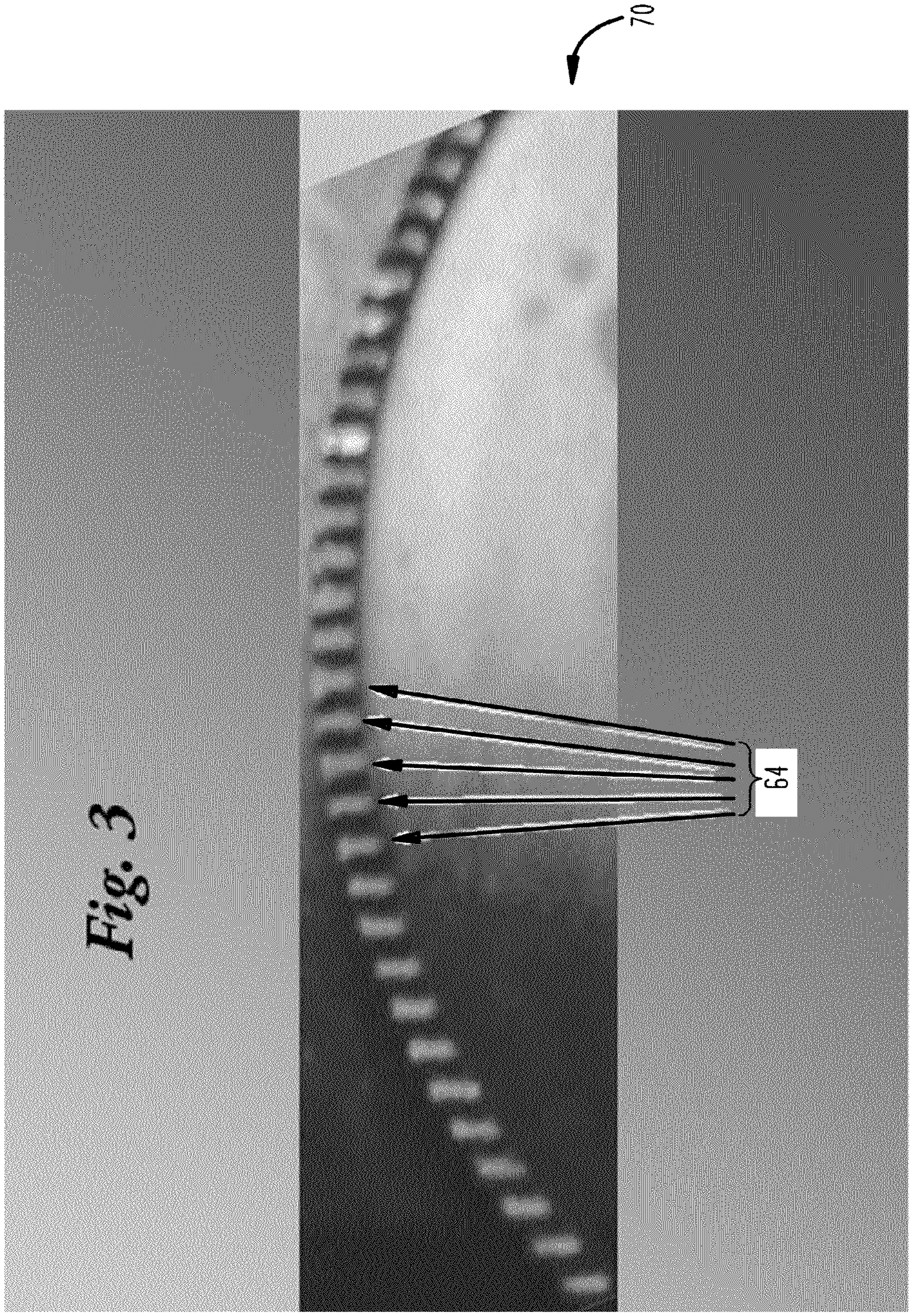
FIG. 3 is a photomicrograph of a portion of the cylindrical surface of a knurled ply-bonding wheel according to one embodiment of the present invention.
Figure 4:
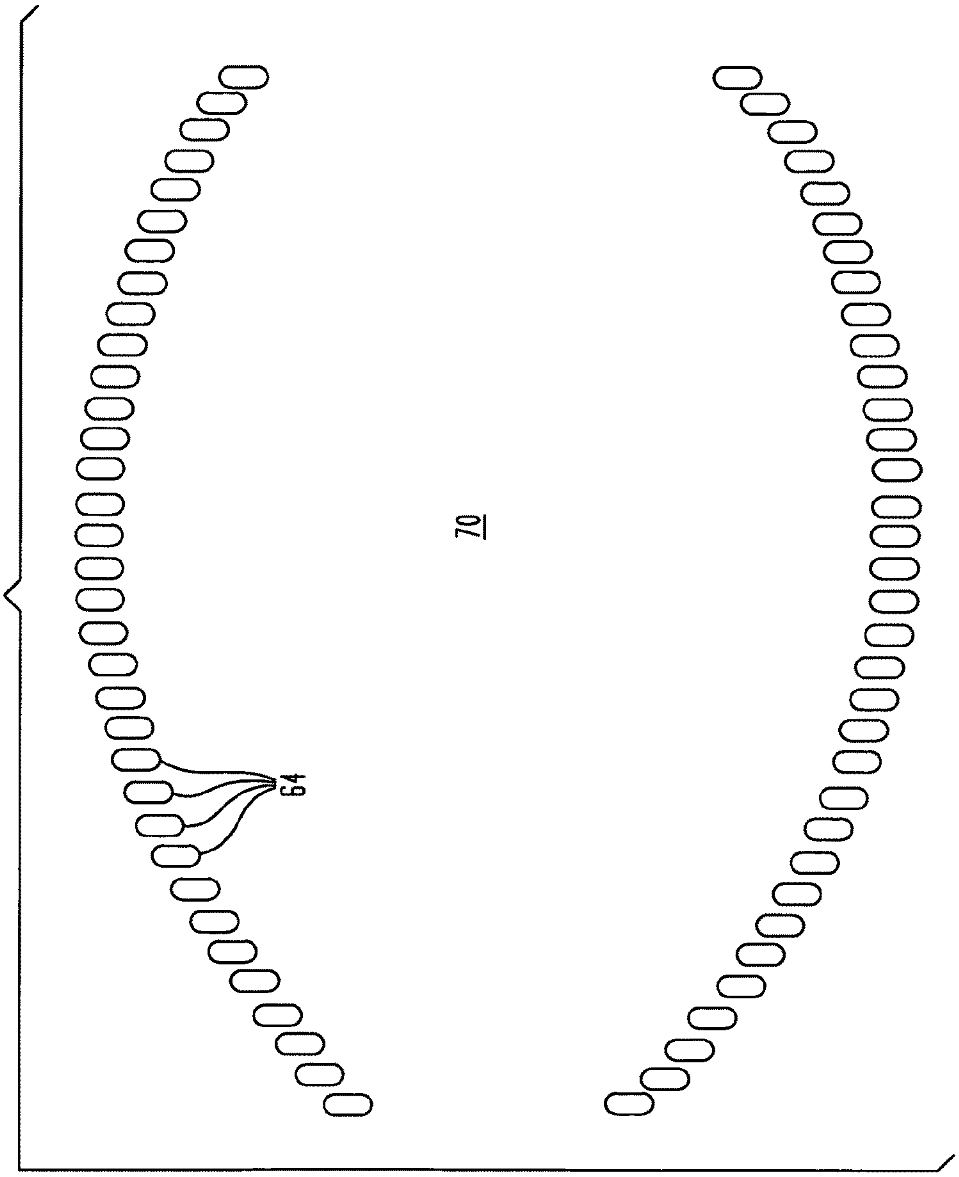
FIG. 4 is a plan view of a portion of the cylindrical surface of a knurled ply-bonding wheel according to another embodiment of the present invention.
Figure 7:
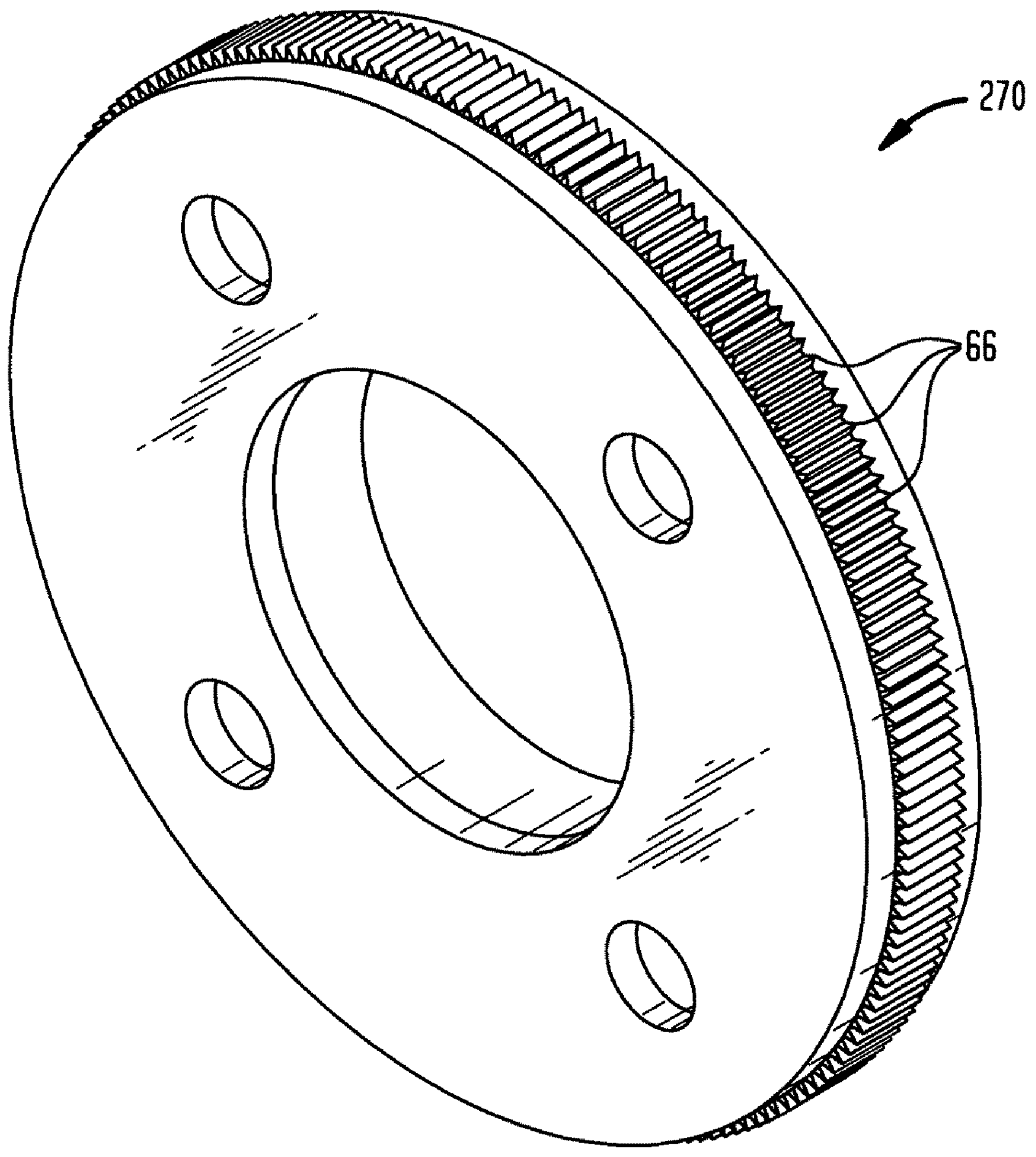
FIG. 7 (PRIOR ART)
FIG. 7 is a schematic perspective illustrating the placement of spicules on a conventional prior art knurled ply-bonding wheel.

In FIG. 1, on tissue roll 50 according to the present invention, embossed exterior tissue ply 51, having a plurality of pattern embosses 52, 54, 56 and 58 embossed thereinto, overlies unembossed interior tissue ply 53 (FIGS. 23-C, 23-E, 24-C & 24-E) to which it is joined by glassined spot embosses 60 arranged along a sinuous path formed by the use of knurled ply-bonding wheels 70 such as those illustrated in FIGS. 3-6. In FIG. 1, as only the most visible glassined spot embosses 60 on tissue roll 50 are marked with arrows, it can be observed that those unmarked glassined spot embosses 60 on tissue roll 50 are obscured in contrast to the marked unsymmetrical "railroad track" appearance of lines of spot glassining 62 observable in embossed exterior tissue ply 51 of prior art tissue roll 50 formed using conventional spot glassining techniques in FIG. 2 using a conventional prior art knurled ply-bonding wheel 270 as illustrated in FIG. 7. Accordingly, it can be seen that use of the present invention provides a method of joining two or more plies together by spot glassining without leaving an immediately visible unattractive defacement of the emboss pattern carried by the visible sheet.

Figure 8:
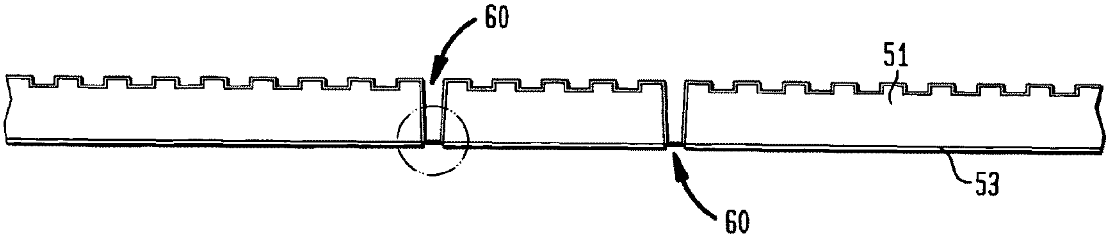
FIG. 8 is a cross-sectional view of two plies of tissue joined by the technique of the present invention illustrating the structure of a spot nested emboss element.
Figure 9:
FIG. 9 is a cross-sectional photomicrographic view of three plies of tissue joined by the technique of the present invention illustrating the structure of a glassined spot emboss element and how it recedes into the tissue.

In FIGS. 1, 8 and 9, embossed exterior tissue ply 51 having a plurality of pattern embosses embossed thereinto, overlies unembossed interior tissue ply 53 to which it is joined by spot glassined embosses 60. In each glassined spot emboss 60, it can be observed that the tissue in unembossed interior tissue ply 53 has been highly compressed and glassined into the tissue in embossed exterior tissue ply 51 thereby forming a highly tenacious bond therebetween.

Figure 10:
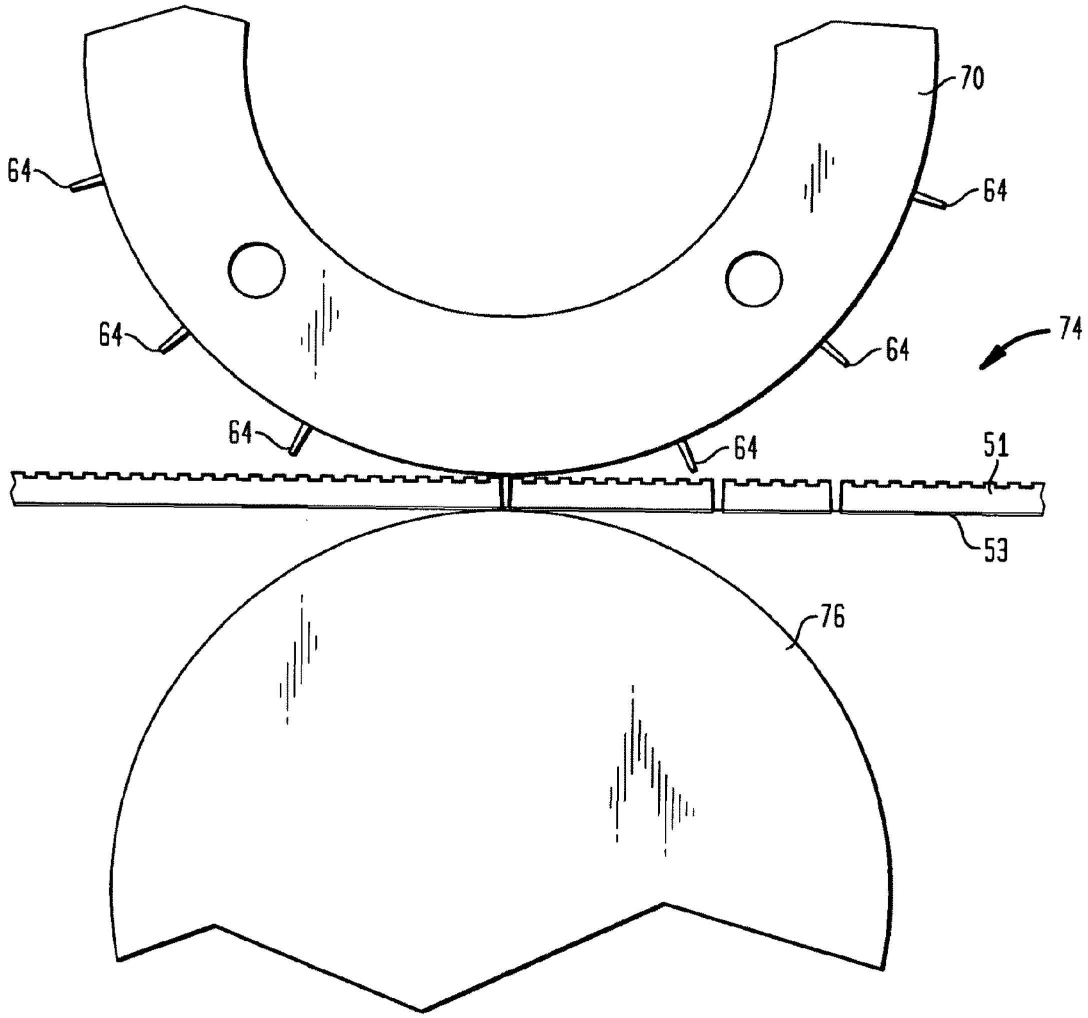
FIG. 10 is a cross-sectional schematic view of an unembossed ply of tissue and an embossed ply of tissue passing through a spot glassining nip.
Figure 11A:
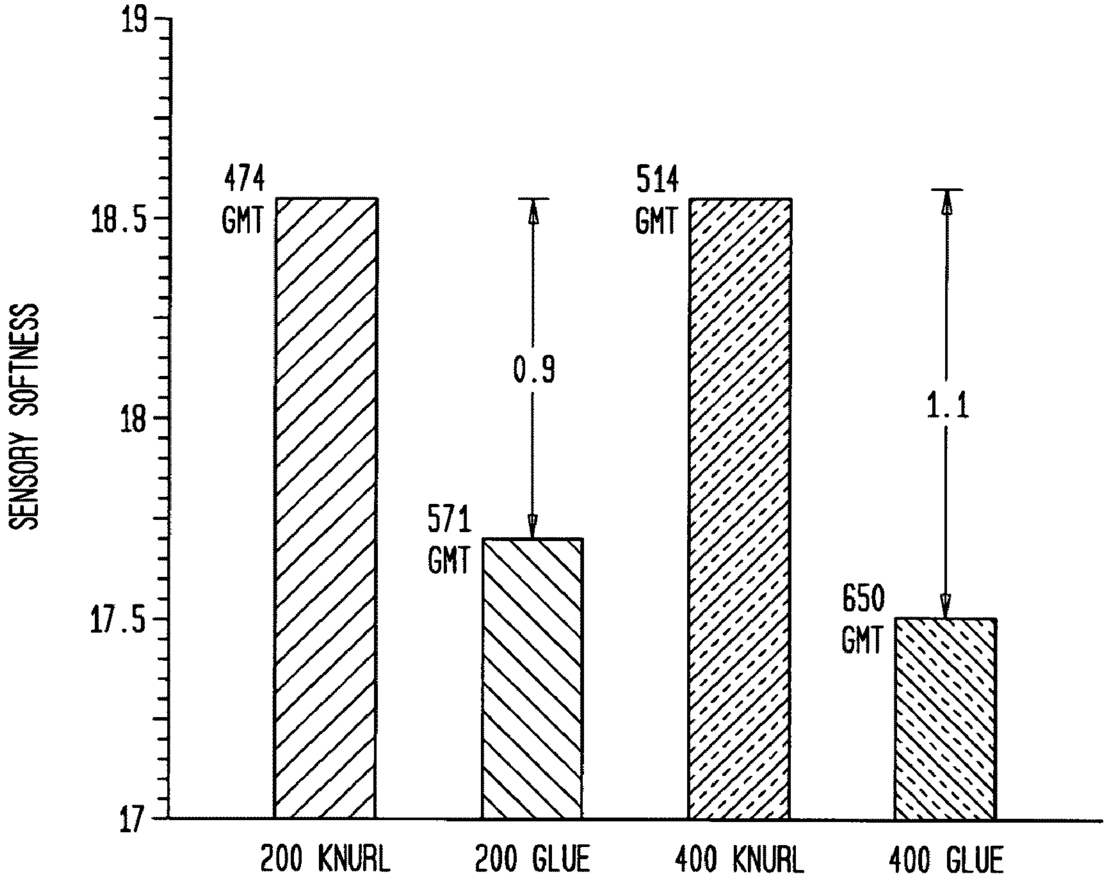
FIGS. 11A & B are graphs illustrating perceived softness of prior art multi-ply tissue products joined by glue as compared to a tissue product in which the plies are joined by a spot glassining process as measured by a trained sensory panel.
Figure 11B:
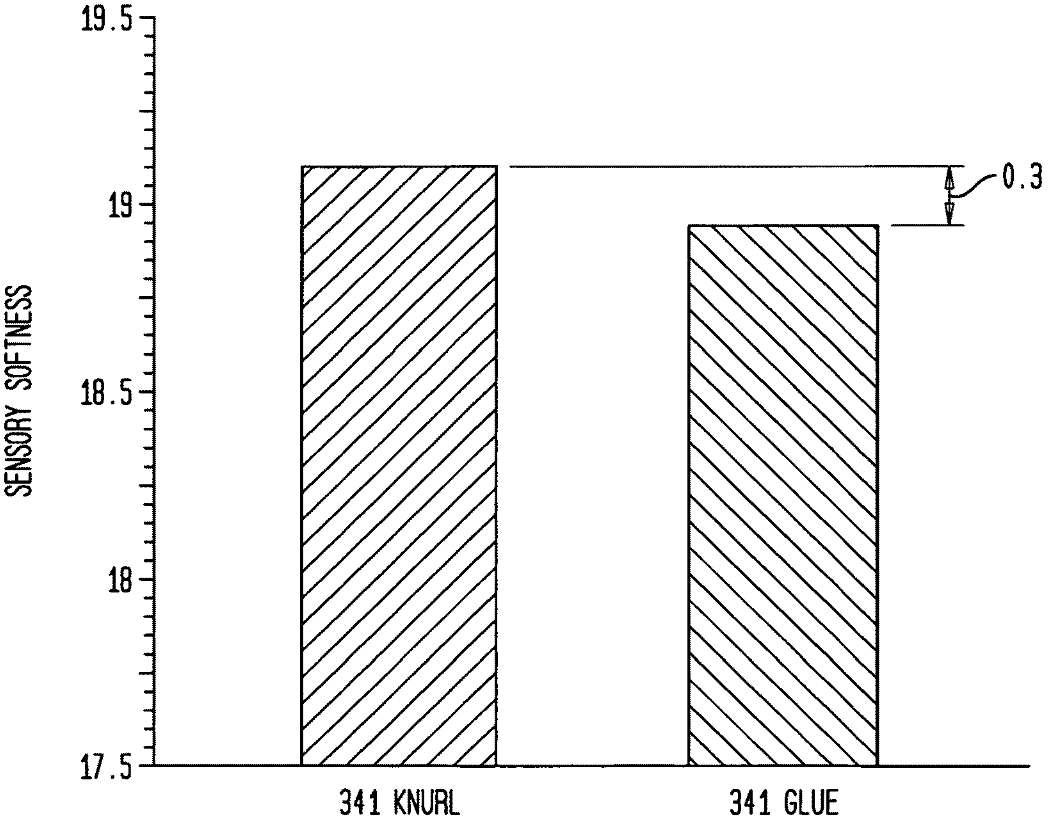
Figure 12:
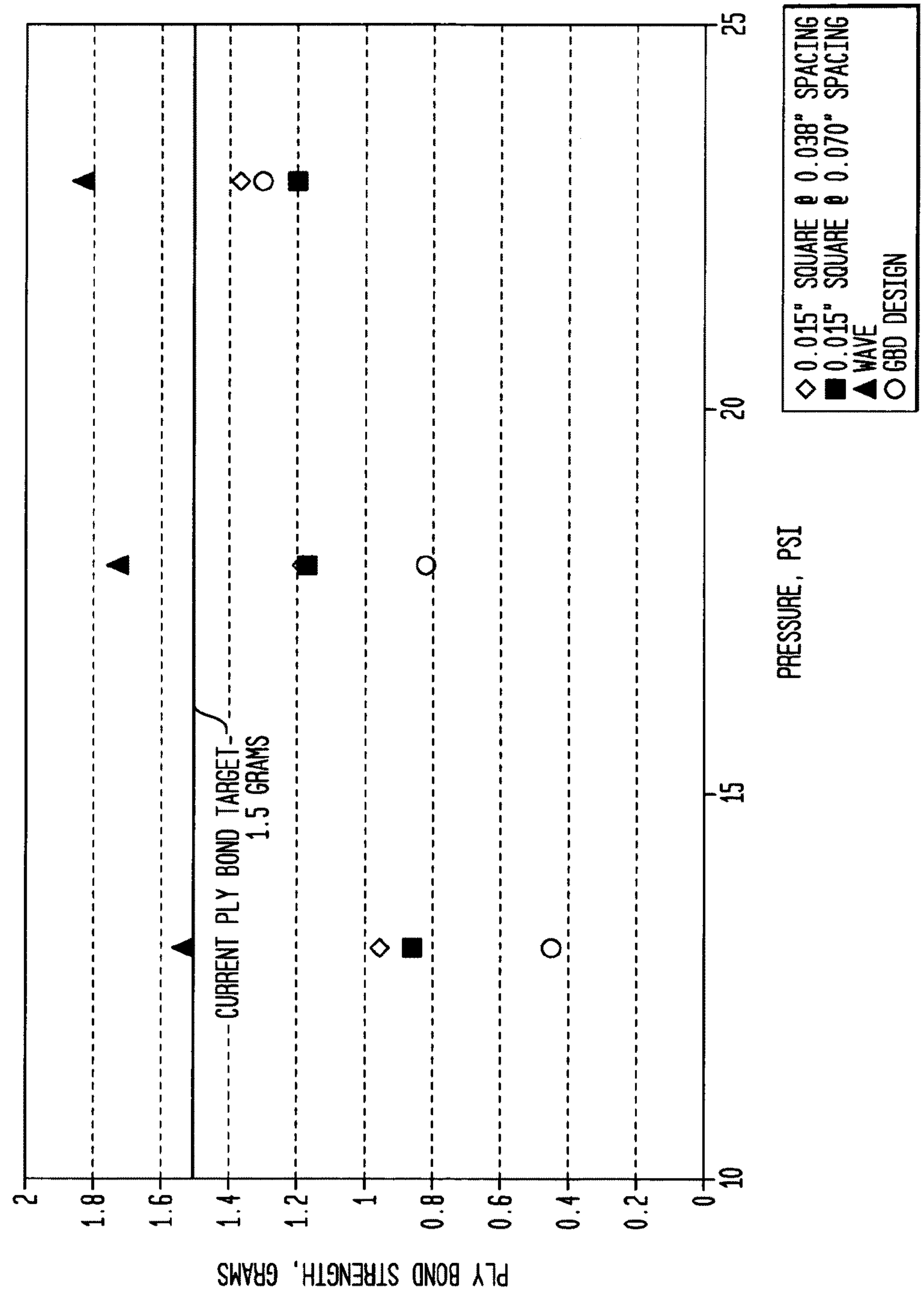
FIG. 12 illustrates the ply bond strength achievable with the spot glassining technique of the present invention as compared to that achieved using the techniques employed in ply-bonding the prior art tissues shown in FIG. 11.
Figure 13:
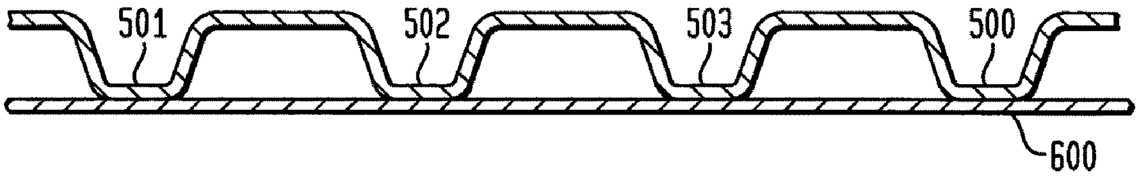
FIG. 13 (PRIOR ART)
FIG. 13 (FIG. 8 from U.S. Pat. No. 6,896,768) is a cross-sectional schematic illustration of a prior art tissue which is particularly well suited for ply-bonding according to the present invention.
Figure 14:
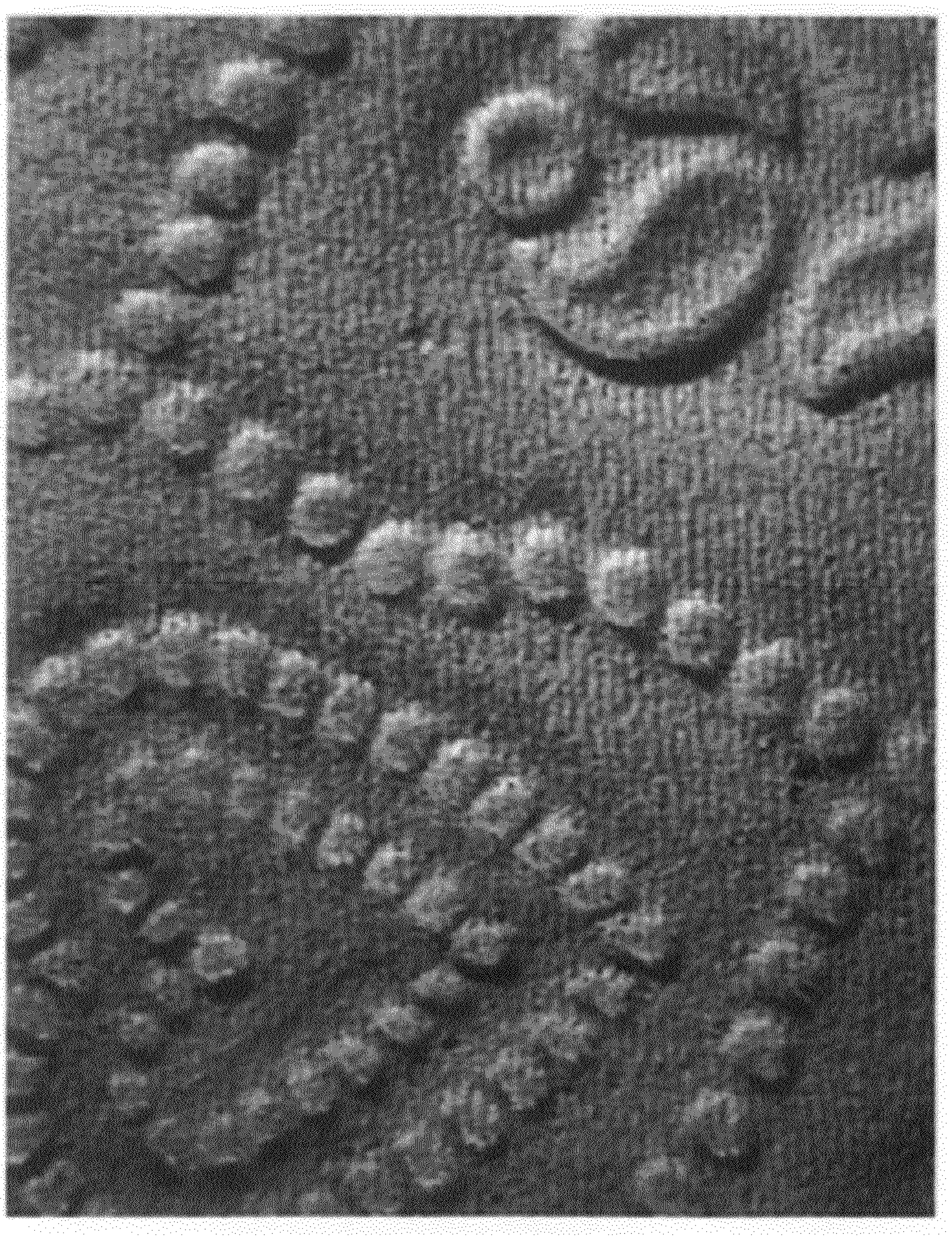
FIG. 14 (PRIOR ART)
FIG. 14 is a photomacrograph of the reverse side of a conventionally embossed prior art bath tissue illustrating the asperities resulting when plies are bonded using conventional nested emboss techniques.
Figure 15:
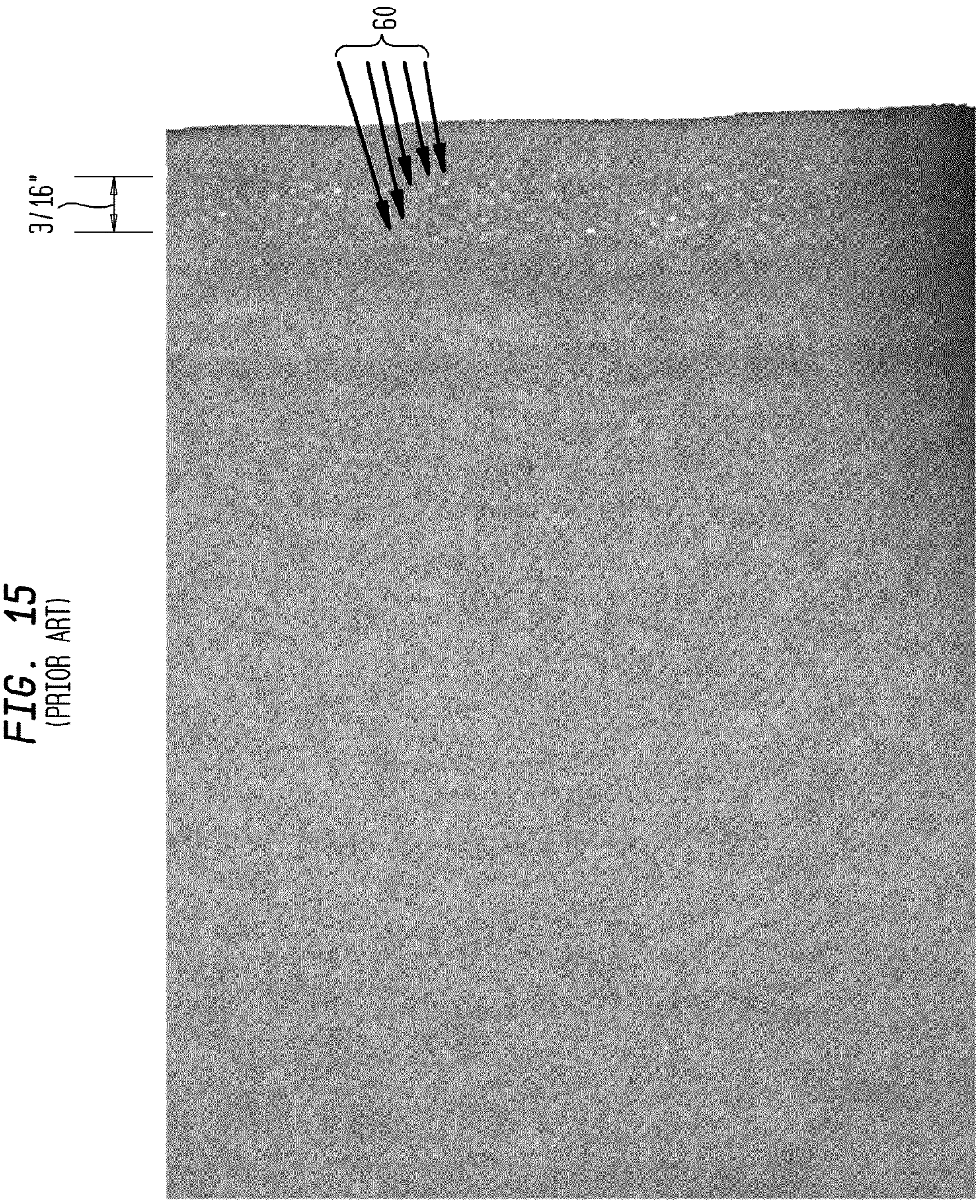
FIG. 15 (PRIOR ART)
FIG. 15 is a photomacrograph of the reverse side of a conventionally spot glassined prior art bath tissue in which the backing sheet is unembossed.
Figure 16:
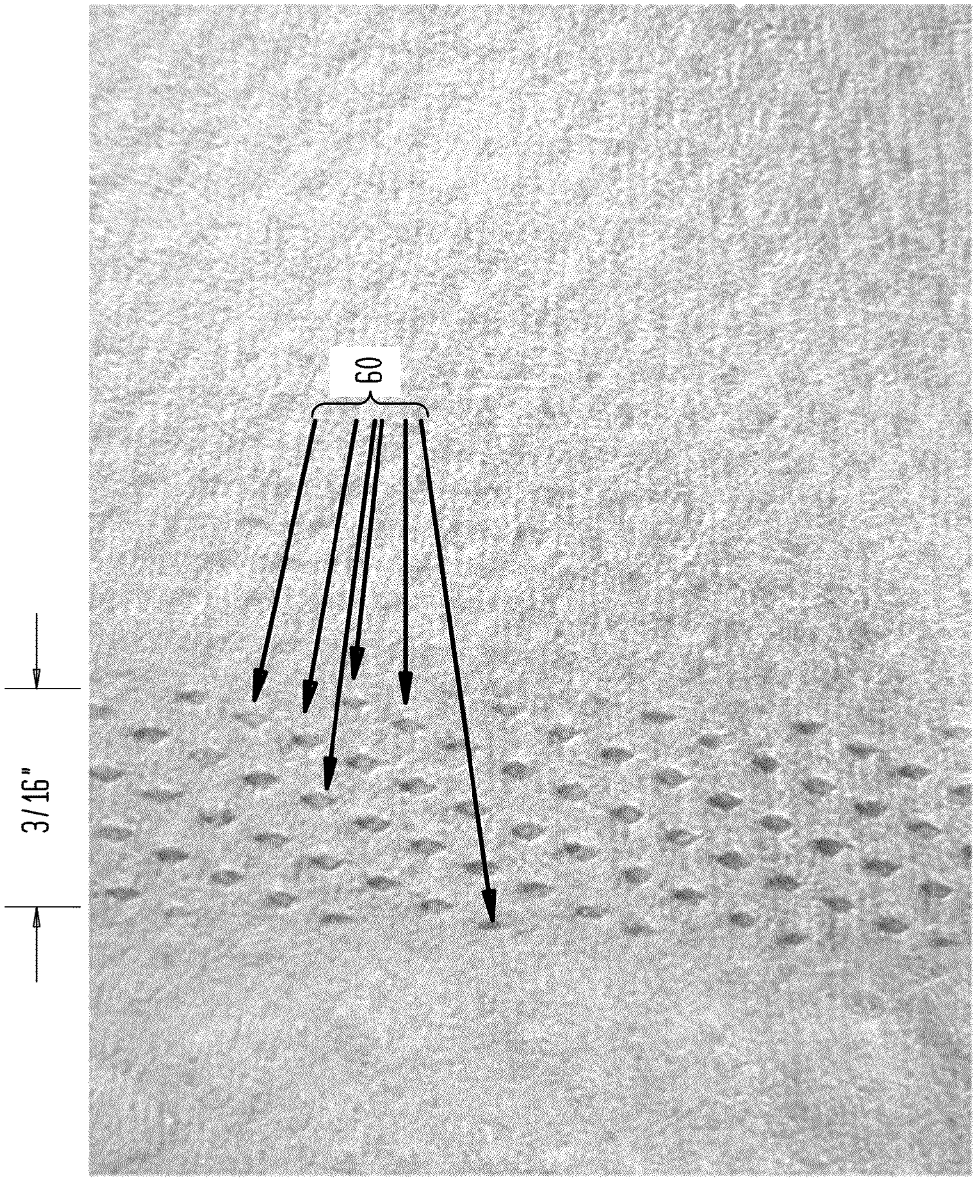
FIG. 16 (PRIOR ART)
FIG. 16 is a photomacrograph of the obverse side of a conventionally spot glassined prior art bath tissue of FIG. 15.
Figure 17:
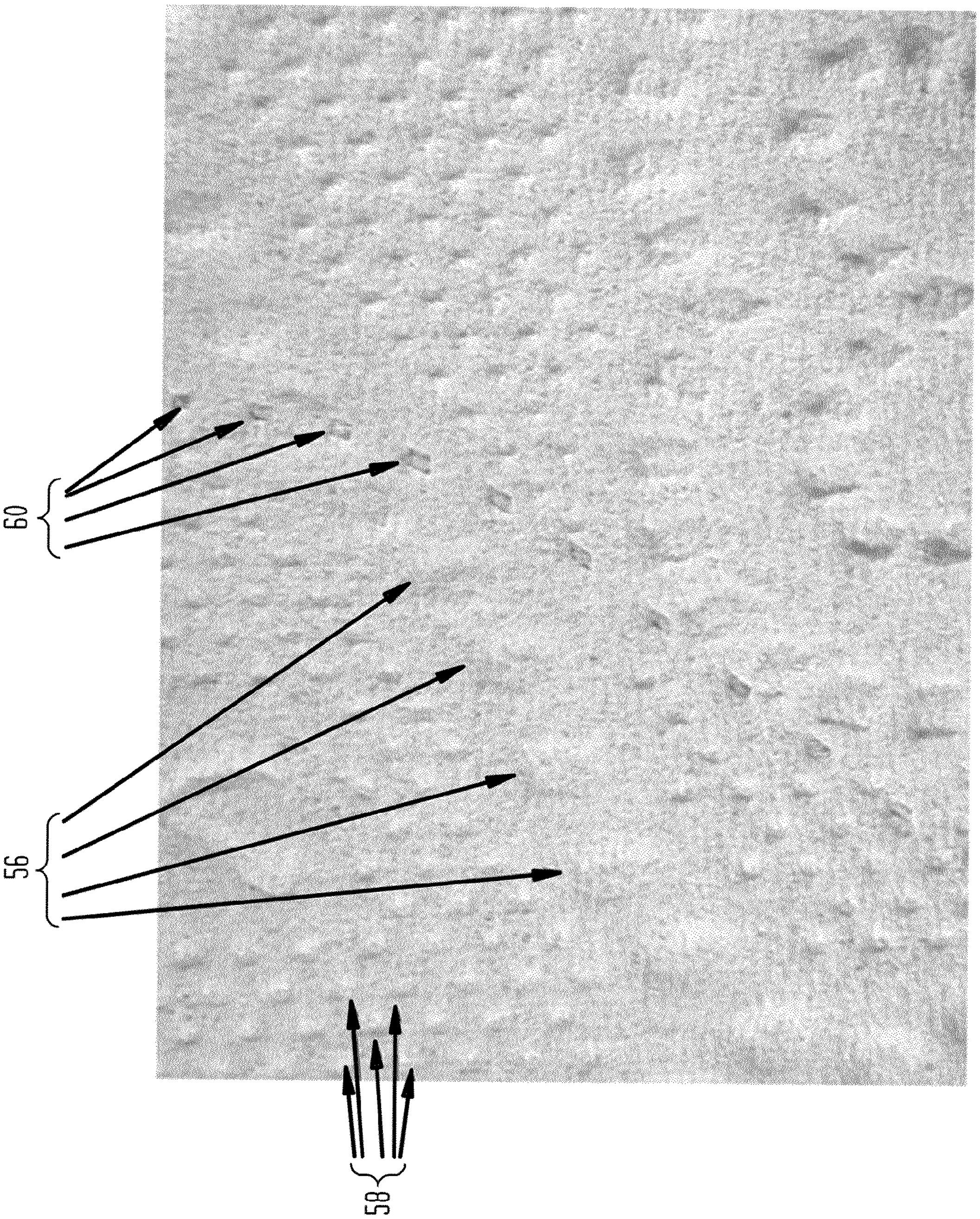
FIG. 17 is a photomacrograph of a portion the obverse side of a spot glassined bath tissue of FIG. 1.
Figure 18:
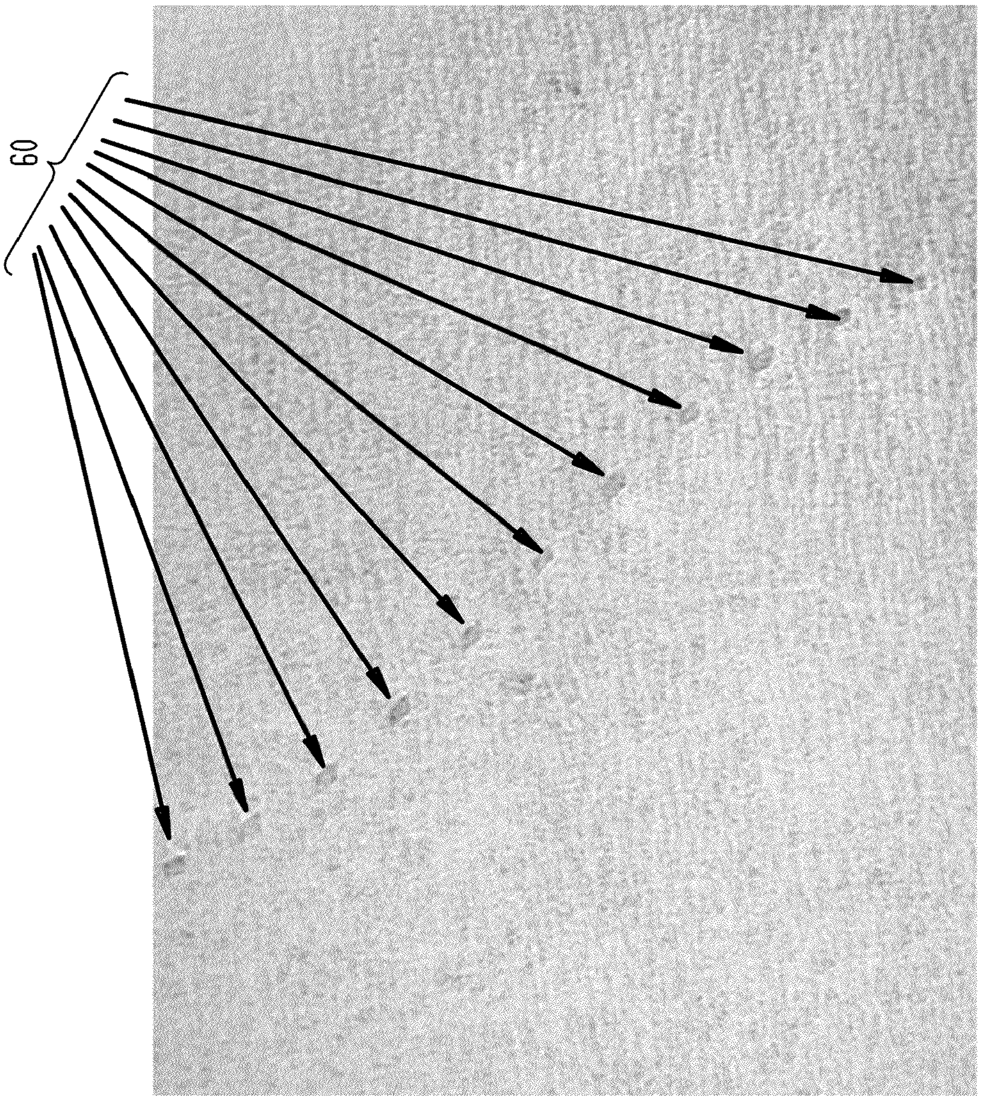
FIG. 18 is a photomacrograph of a portion the unembossed reverse side of a spot glassined bath tissue of FIG. 1.
Figure 19:
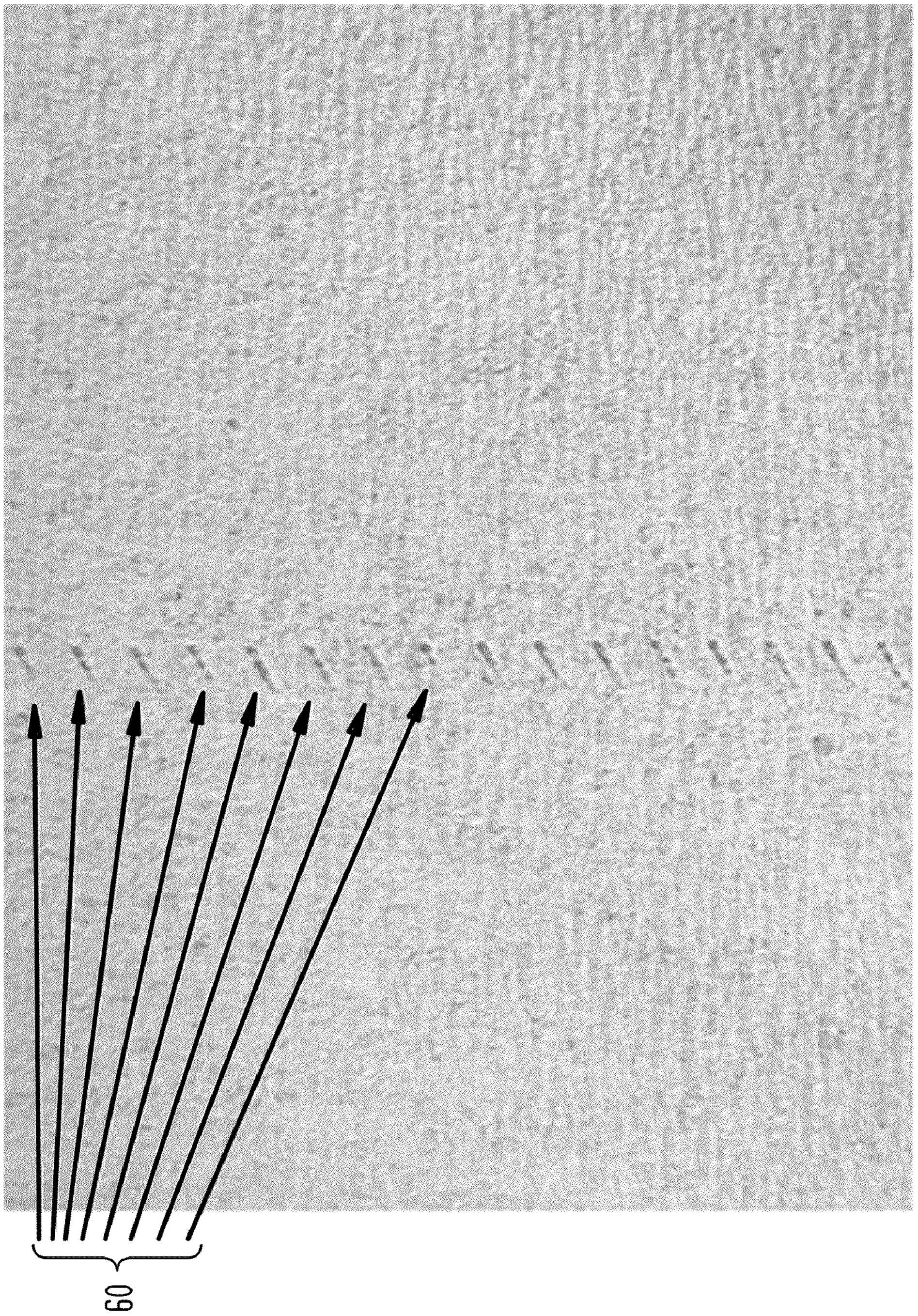
FIG. 19 (PRIOR ART)
FIG. 19 is a photomacrograph of the reverse side of another conventionally spot glassined prior art bath tissue in which the backing sheet is unembossed.
Figure 20:
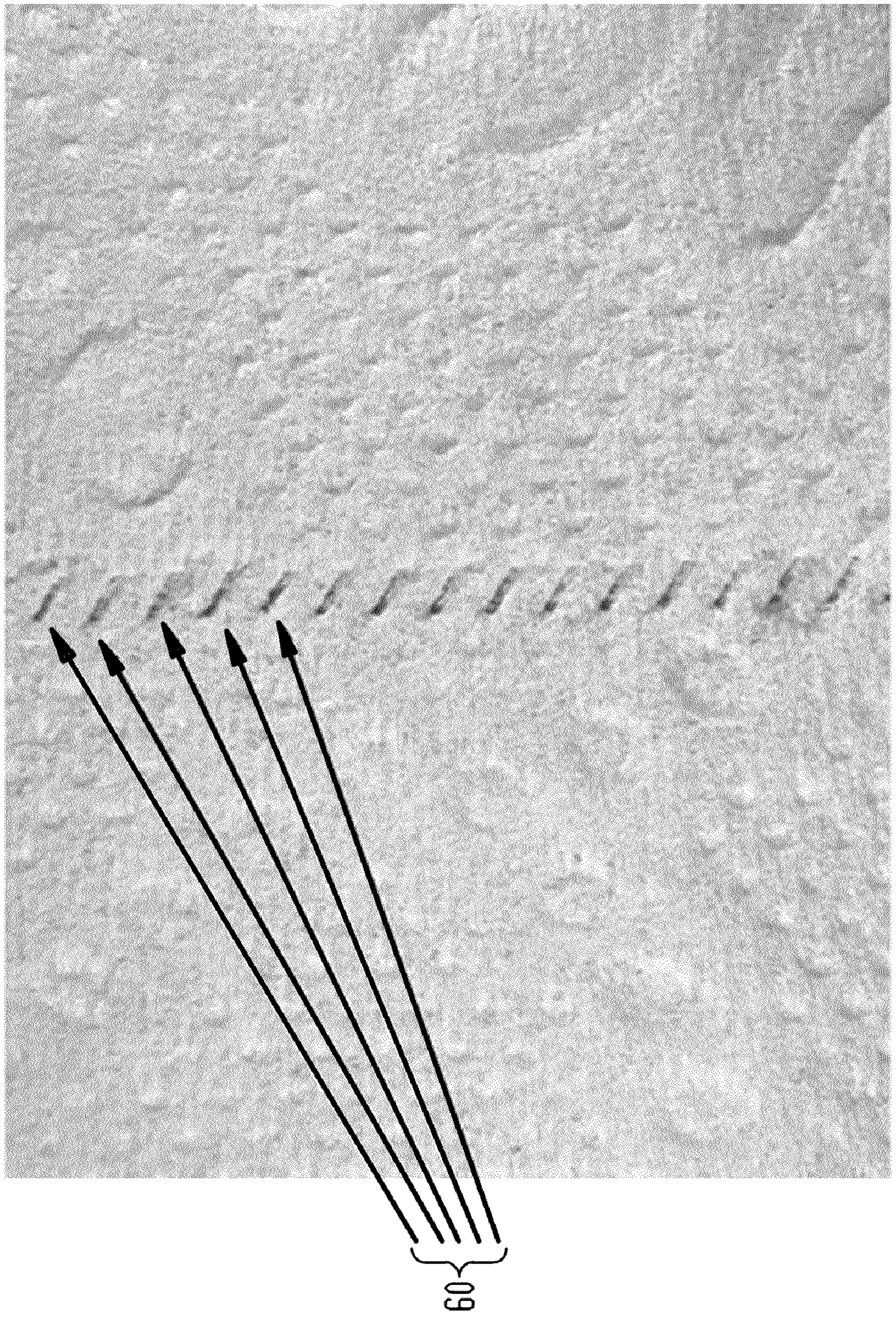
FIG. 20 (PRIOR ART)
FIG. 20 is a photomacrograph of the obverse side of a conventionally spot glassined prior art bath tissue of FIG. 19.
Figure 21:
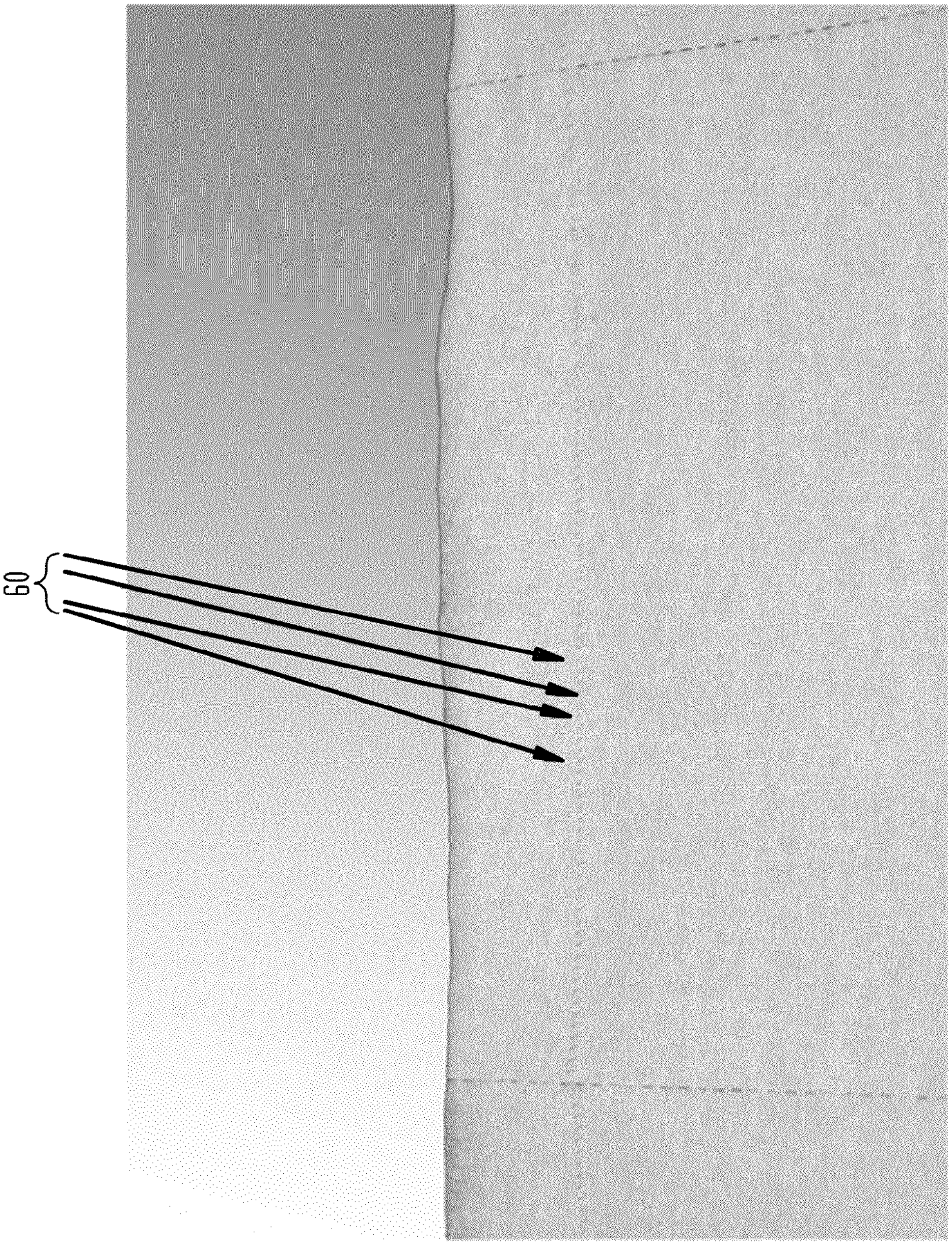
FIG. 21 (PRIOR ART)
FIG. 21 is a lower magnification photomacrograph of the reverse side of the conventionally spot glassined prior art bath tissue of FIG. 19 in which the backing sheet is unembossed.

In FIGS. 1 and 10, embossed exterior tissue ply 51, having a plurality of pattern embosses 52, 54, 56, and 58 embossed thereinto, overlies unembossed interior tissue ply 53 passing through spot glassining nip 74 created between knurled ply-bonding wheel 70 and anvil roll 76 in which spicules 64 on knurled ply-bonding wheel 70 press into embossed exterior tissue ply 51 and thence into unembossed interior tissue ply 53 against anvil roll 76, thereby joining embossed exterior tissue ply 51 to unembossed interior tissue ply 53 by glassined spot embosses 60. Knurled ply-bonding wheels of the present invention can be manufactured from any sufficiently durable material including steel; tool steel; cemented carbides (sometimes referred to as tungsten carbide; sintered carbides or hardmetal); chemical vapor deposition coated cemented carbide, ceramics, including cemented carbides with coatings of titanium carbide, titanium nitride and/or aluminum oxide with coatings having an outer layer of ceramic oxide and an intermediate layer or layers of a refractory metal carbide and/or nitride, particularly TiC, TiN, TaC and/or TaN, between the cemented carbide and the outer layer of ceramic oxide. In those cases where cemented carbides are used for the knurled ply-bonding wheels, it may be prudent to protect the anvil roll by providing cemented carbide counter rings around the anvil roll, so that the tissue webs can be glassined together at high pressure without worry of exceeding the yield strength of either the spicules on the knurled ply-bonding wheel or the anvil roll. In the case in which steel knurled ply-bonding wheels are used, careful attention should be paid to using only slightly in excess of the pressure needed for glassining so that longer life can be achieved for the wheels. In any event, the holder for the knurled ply-bonding wheel should be sufficiently massive and rigid to avoid excessive vibration which can lead to premature failure of the spicules on the knurled ply-bonding wheel.

Throughout this specification and claims, where we refer to a wheel as being "knurled" it should be understood that we mean it has a series of projecting knobs, ridges or spicules formed into it by any convenient method including hobbing, machining, milling or being rolled under pressure against a hardened tool that forms these ridges by deforming the metal. Where we refer to the process of "knurling", we mean the process of rolling under pressure against a hardened tool, whereas "knurling" as a noun means projecting knobs, ridges or spicules however formed. Where we refer to sheets of tissue as "spot-glassined", we mean that the sheets have been pressed together so firmly that a tenacious, usually translucent, bonded area has been formed therebetween, even though there may be some debate about whether the spots have truly been converted to glassine. In some cases, these sheets might also be described as having been "knurled" together or as being joined by "knurling"; and, even though objection might be made that the language is colloquial, the meaning is clear and should be understood throughout the paper industry.

Figure 5:
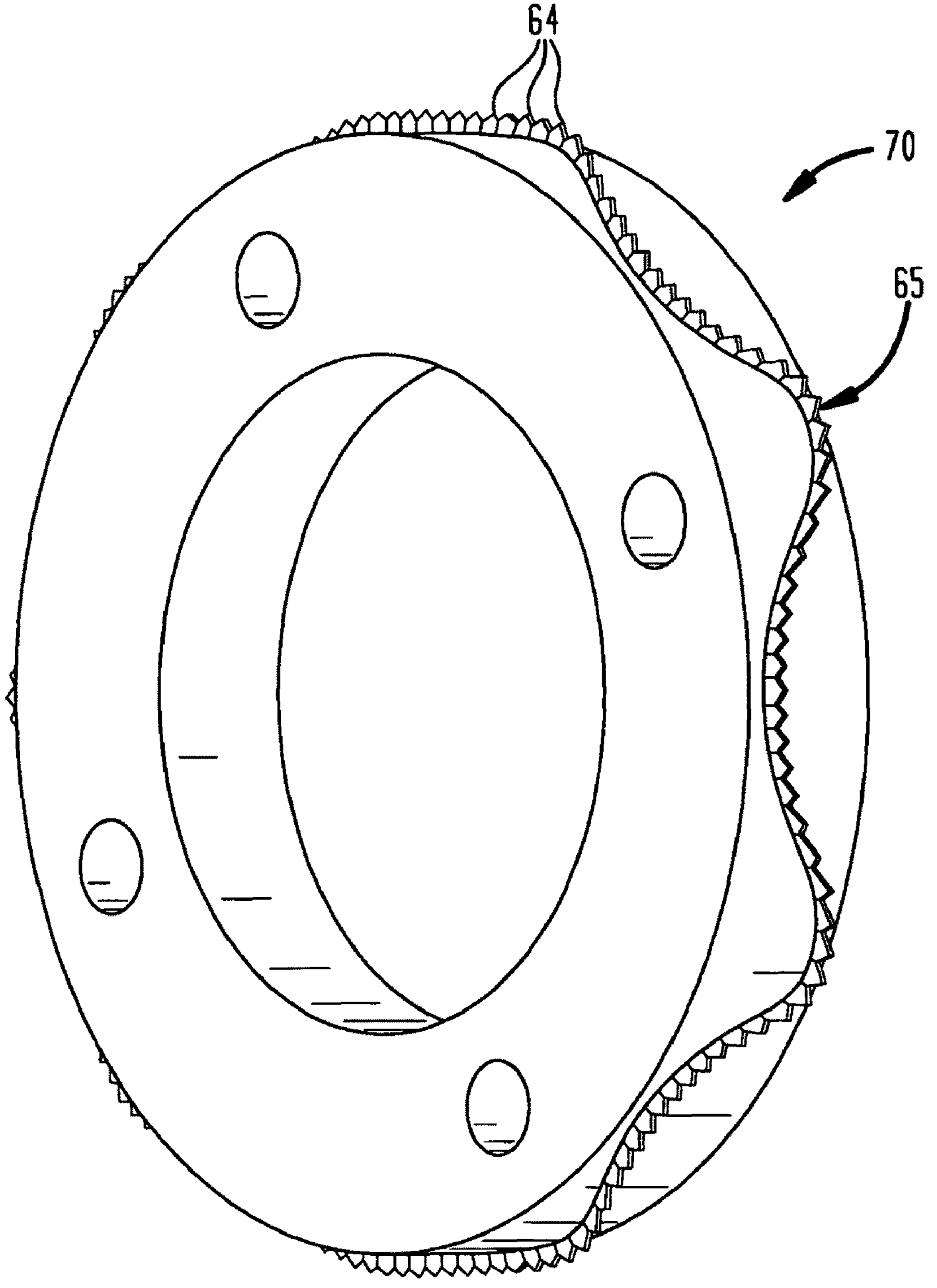
FIG. 5 is a schematic perspective illustrating the placement of spicules on the cylindrical surface of a knurled ply-bonding wheel according to an embodiment of the present invention.
Figure 5B:
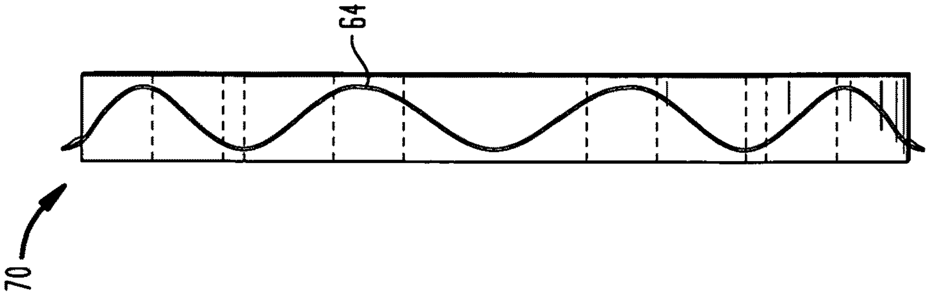
FIG. 5B is a side elevation of the knurled ply-bonding wheel of FIG. 5.
Figure 5A:
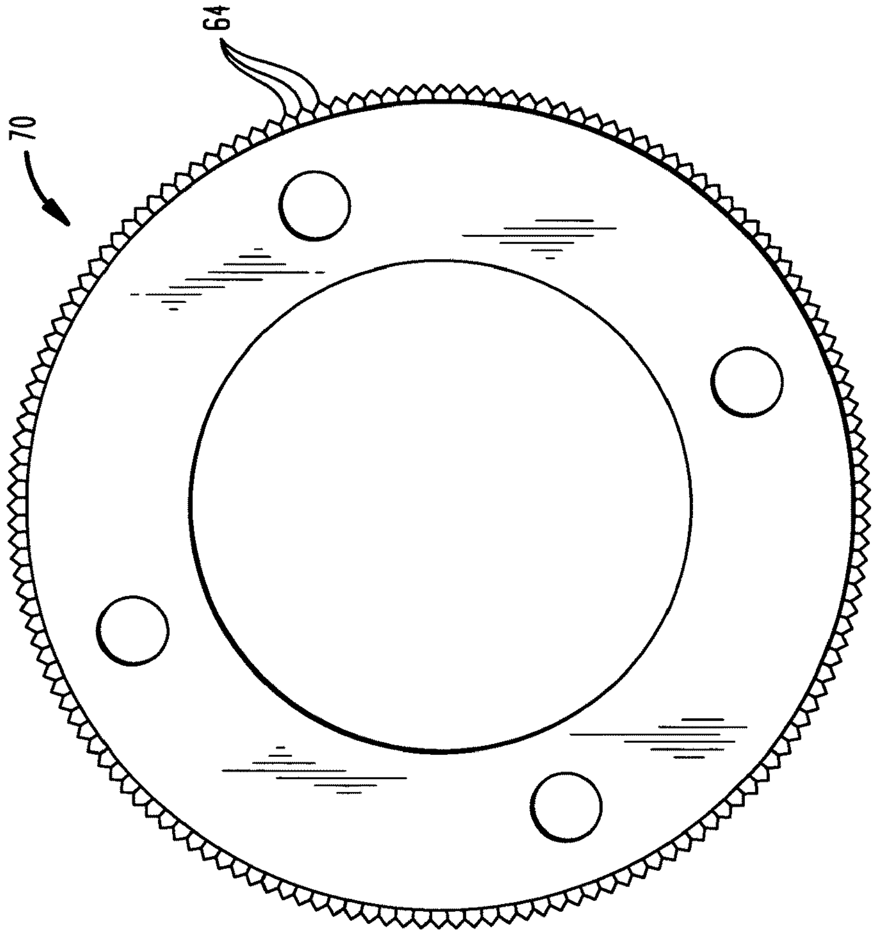
FIG. 5A is a plan view of the knurled ply-bonding wheel of FIG. 5.
Figure 6:
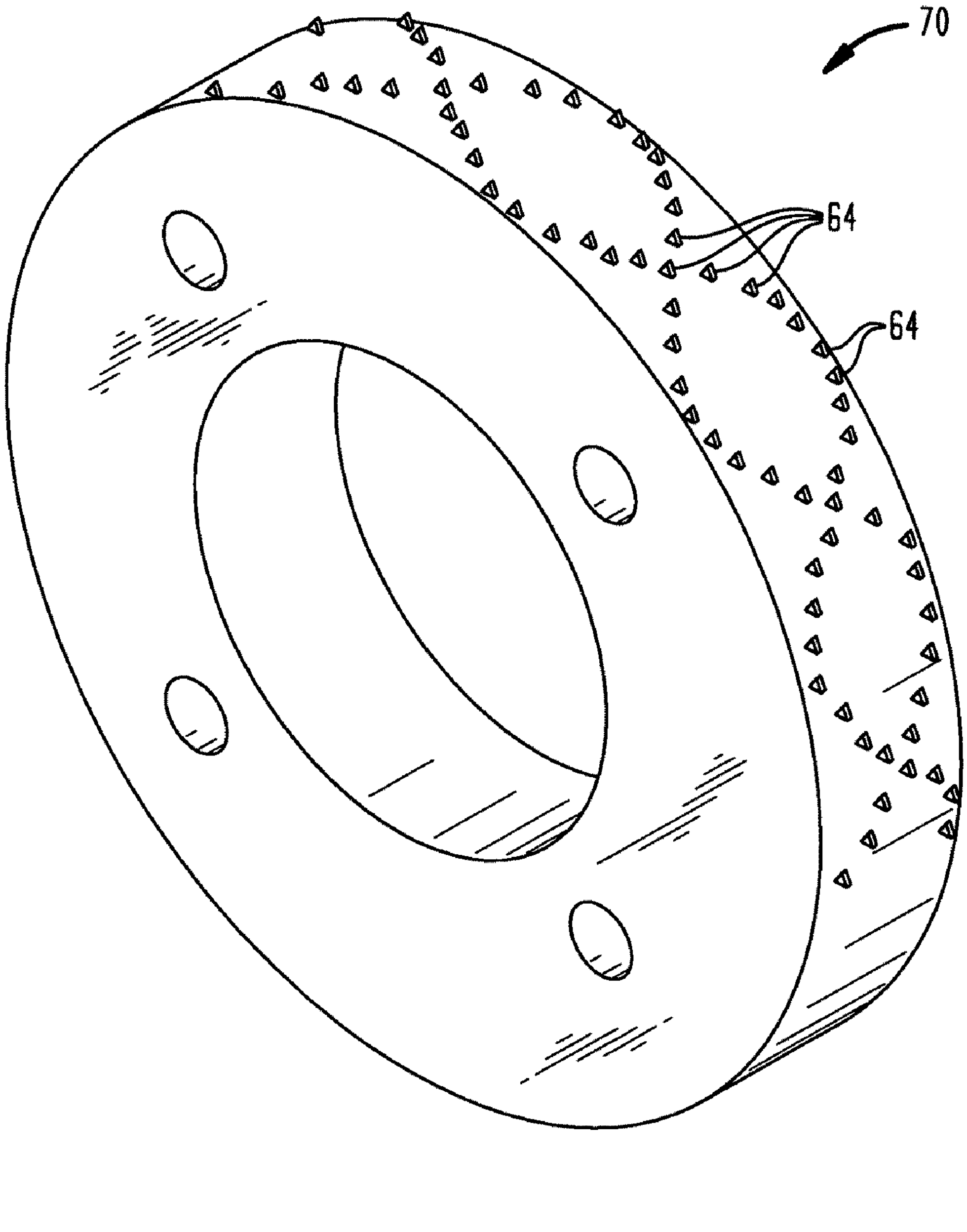
FIG. 6 is a schematic perspective illustrating the placement of spicules on the cylindrical surface of knurled ply-bonding wheel according to a balanced force embodiment of the present invention.
Figure 8A:
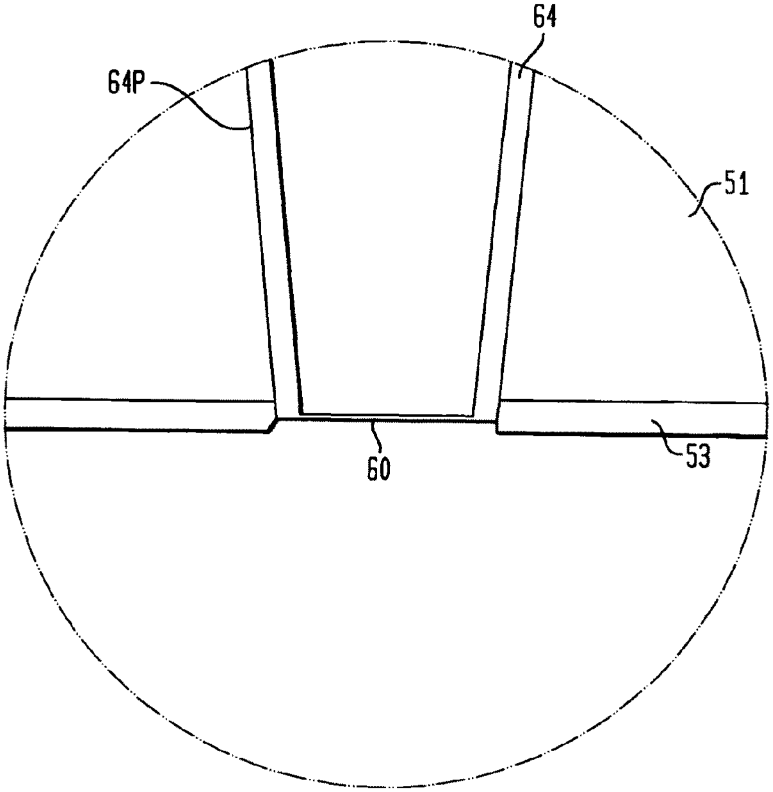
FIG. 8A is an enlarged view of a spot nested emboss element.

The configuration of knurled ply-bonding wheel 70 in FIG. 5 is considered particularly advantageous for steel rolls as it is possible to form these rolls by spot glassining the entirety of the periphery of a roll then machining away the majority of the outer peripheral surface of knurled ply-bonding wheel 70 with a conventional end mill leaving only spicules 64. In many cases, a tapered end mill will be preferable so that the shoulder of spicules 64 slope downwardly from peak 64P as indicated in FIG. 8A. In particular, we greatly prefer to use a tapered end mill with about a 30° angle so that spicules 64 are well supported and have less tendency to fold over.

In some applications, it will be advantageous that spicules 64 lie along a meandering path 65 as shown in FIG. 5 comprised of a plurality of arc segments as this is easily accomplished with relatively unsophisticated milling equipment; while in other applications, where a CNC milling machine is available, it will be convenient to retain spicules 64 on a sinuous, meandering or other path, particularly a sinusoidal path. In particular, it is believed that spot glassining the full thickness of the knurled ply-bonding wheel 70 makes it possible to obtain hardened spicules 64 by virtue of working the steel aggressively prior to machining. It also greatly facilitates forming of spicules 64 in the small sizes preferred for the practice of the present invention. The exact degree of pressure required for glassining varies with temperature and moisture content of the paper; but, in most cases, a pressure of between 40,000 and 80,000 psi is sufficient, the exact pressure in each case being difficult to measure because not only is each individual contact area very small but it is also difficult to know how many spicules 64 are fully engaged and how many only partially engaged at any given moment.

For most applications, it is preferred that the contact area or peak 64P of each spicule 64 (as seen in FIGS. 5, 8 and 10) be approximately 50 square mils ($5\times10^{-5}$ sq. in.) to 900 square mils ($9\times10^{-4}$ sq. in.) and yet retain the hardness to stand up to an embossing pressure on the order of 40,000 psi or more applied over the very small contact area of each spicule 64. In a preferred embodiment, spicules 64 will each have a contact area of between 50 square mils and 900 square mils and will be arranged on sinusoidal path 65 having an amplitude of between ¼" and 1 inch, a wavelength between ¾" and 4 inches and between 5 and 30 spicules 64 per circumferential inch (as opposed to arc length along the path of the sinewave.) In a more preferred embodiment, contact area peak 64P of each spicule 64 will be between 150 and 750 square mils, the sinusoidal path will have an amplitude of between ⅜ inch and ¾" and a wavelength between 1 inch and 3 inches with between 10 and 28 spicules per circumferential inch. In the most preferred embodiment, contact area peak 64P of each spicule 64 will be between 150 and 600 square mils, the sinusoidal path will have an amplitude of between ⅜" and ¾", a wavelength of between 1½ and 2½ inches with between 12 and 25 spicules per circumferential inch. Anvil rolls 76 will typically be comprised of steel having a hardness of at least about 65 on the Rockwell "C" scale. In all cases, care should be exercised to be sure that the stress on spicules 64 does not exceed the limits that the particular shape chosen for spicules 64 can withstand over the required life of knurled ply-bonding wheel 70. It is particularly preferred that the contact area peaks 64P of spicules 64 be rounded possibly generally cylindrical in configuration with the axis of the cylindrical contact area being parallel to the axis of anvil roll 76. When conventional steels are used, particular care should be exercised to properly shape the contact area and control the imposed load, particularly the vibrational load, as the number of cycles that spicules 64 can endure will generally be expected to decrease with increasing stress. In many cases, depending on the steel used for knurled ply-bonding wheel 70, it will be preferable to form spicules 64 by a combination of hobbing and milling and milling rather than knurling and milling, depending largely upon how well the steel responds to the strain involved in knurling. In many cases, a conventional gear hob can be used advantageously as the resulting involute shape provides spicules with strong support at the base.

One intriguing embodiment of the present technology enables manufacture of a tissue combining premium quality softness with ultra-high bulk and ultra-high resiliency from furnish which is of less than premium quality. Accordingly, the ability to utilize medium to mid-high grade furnish to produce high softness is considered to be an important aspect of this embodiment of the present invention. Of course, for the very highest levels of softness, a preponderance of fibers such as Northern hardwood Kraft and eucalyptus is desirable at least in those portions of the tissue contacting the user; but surprisingly high softness can be attained with medium to mid-high grade furnishes as well as with overall furnish mixes containing significant amounts of lower quality fiber.

The present invention relates to the production of a billowy, high softness, embossed three-ply tissue typically having a basis weight of about 25 or more lbs. per 3000 sq ft ream. As used herein, high-softness products are those having low values of tensile stiffness, friction deviation, and more preferably, both. These products generally have tensile stiffness of values of about 1.5 gram/inch/% strain per pound of basis weight or less, preferably about 1.0 gram/inch/% strain per pound of basis weight or less, the friction deviation of being usually no more than about 0.6, preferably about 0.55 or less In one embodiment of the present invention, the following aspects are especially important: (i) the embossing pattern chosen produces protuberances predominantly on the harsher side of the exterior embossed sheets, preferably exclusively or almost exclusively on the harsher side of the sheets (usually the air side, unless creping is performed with a biaxially undulatory blade—then the Yankee side is typically the harsher side); and (ii) the pattern exhibits coverage of less than about 30%, preferably, less than about 20%, and more preferably between about 2% to about 15%. The term "coverage" is defined as being the percentage of the total area of the sheet which is deflected from the base plane of the sheet by more than 0.002". In the most preferred embodiments, the pattern will be a micro/macro pattern. When the embossed plies are combined with a backing sheet to form the multi-ply product, the protuberances of the embossed plies should be disposed to the interior of the finished multi-ply product. Creping can also be performed with an undulatory type blade on the unembossed sheet to produce a basesheet which we refer to biaxially undulatory. In such case, the side of the sheet having the resultant machine direction undulations or ridges (the Yankee side) as well as the protuberances resulting from the embossing process is preferably disposed to the interior of the finished multi-ply product.

The present invention in one embodiment provides a novel multi-ply tissue having desired high caliper and opacity by heavily embossing two plies of the three ply product without being saddled with a large difference in the sidedness of the three-ply tissue.

Until recently, high softness products have been made primarily from fiber blends which were very rich in very low-coarseness hardwoods and softwoods. Very low-coarseness hardwoods include those fibers having a coarseness value (as measured by the OP Test Fiber Quality Analyzer) of about 10 mg/100 meters or less. Examples of low-coarseness hardwoods include various species of Eucalyptus and Northern hardwood fibers, such as those obtained from maple and aspen. Low-coarseness softwoods have coarseness values in the 15 to 20 mg/100 m range and include Northern softwoods such as fir and spruce. A high softness tissue product made from such fibers will have an overall coarseness value of about 11 mg/100 m or less. These fibers typically produce tissues having excellent softness properties; however, they tend to be considerably more costly than their Southern and Western counterparts. Further, typical CWP products made exclusively from low-coarseness fibers may often be perceived by users as relatively thin.

A major advantage of one embodiment of the current invention is that it allows the use of fair amounts of coarser hardwoods and softwoods to produce high-softness tissues. Hardwoods having coarseness values of up to about 15 mg/100 m and softwoods with a coarseness of up to about 35 mg/100 m may be employed in the furnish, though, of course, lower-coarseness pulps may also be included in the furnish advantageously. Coarser fibers not only have the advantage of low cost, but also produce tissues which are perceived by consumers as being thicker and stronger than similar tissues made from only low-coarseness fibers. The product of the present invention will preferably include from about 30 to about 85 percent of a first fiber, typically a hardwood, preferably eucalyptus and/or Northern hardwood, having a coarseness of about 15 mg/100 m or less and a fiber length of from about 0.8 to about 1.8 mm, more preferably having a coarseness of about 13.5 mg/100 m or less and a fiber length of from about 0.8 to about 1.4 mm. and most preferably having a coarseness of about 12 or less and a fiber length of from about 0.8 to about 1.2 mm. The product will also preferably include from about 15 to about 70% of a second fiber, typically a softwood having a coarseness of no more than about 35 mg/100 meters and a fiber length of at least about 2.0 mm, more preferably a coarseness of not more than about 30 mg/100 meters and a fiber length of at least about 2.2 mm and most preferably a coarseness of no more than about 25 mg/100 meters and a fiber length of at least about 2.5 mm.

Other fibers including recycled fiber and non-woody fibers may also be included; however, if present, they would typically constitute no more than about 70%, preferably no more than 50%, of the total furnish. Recycled fibers, if included, would preferably replace both hardwood and softwood in an about 3/1 to about 4/1 HW/SW Ratio. The coarseness of the total furnish on a fiber weight average basis would preferably fall in the range of from about 7 to about 18 mg/100 meters.

The product of the current invention may be prepared from either homogenous or a stratified plies. If stratified plies are used, each ply would typically be composed of at least two layers. The first layer would constitute from about 20 to about 50 percent of the total sheet and would be made chiefly or entirely of the lower coarseness fibers described above. If the plies are formed by the conventional wet press technology, this layer would often be on the side of the sheet that is adhered to the Yankee dryer during papermaking and would appear on the outside of the final embossed product. The remaining layers of the sheet can be composed of coarser fibers described above or blends of the fine and coarser fibers. Optionally, other fibers or fiber blends such as recycled fiber and broke, if present, can be included. If such fibers are present, they are usually located chiefly or exclusively in the non-Yankee-side, i.e., air-side, layers. Of course, the grades of fiber employed in the interior ply of the three-ply structure may be considerably lower in quality than those used in the outer plies and layers. Surprisingly, it appears that it makes only a minuscule difference in terms of bulk generation whether the intermediate ply is calendered before it is spot glassined to the upper ply, particularly when bulk and caliper are measured after converting. Accordingly, if the mill prefers not to stock both calendered and un-calendered parent rolls, the bulk of the three ply sheet made with a calendered interior ply can be surprisingly close to the bulk of an equivalent sheet made with an uncalendered interior ply.

In accordance with one embodiment of the process of the present invention, a first nascent web is formed from the pulp. The web can be formed using any of the standard configurations known to the skilled artisan, e.g., crescent former, suction breast roll, twin-wire former, etc. Similarly, the web can be dewatered and dried using any known drying technology including those involving compactive dewatering as well as processes avoiding any process in which the sheet is pressed while wet, such as TAD and UCTAD. Once the web is formed, it preferably has a basis weight, under TAPPI Lab Conditions, of at least about 9 lbs/3000 sq ft ream, preferably at least about 10 lbs/3000 sq ft ream, more preferably at least about 11-14 lbs/3000 sq ft ream. TAPPI Lab Conditions refers to TAPPI T-402 test methods specifying time, temperature and humidity conditions for a sequence of conditioning steps.

In the conventional wet press process, the nascent web is formed then dewatered such as by an overall compaction process. The web is then preferably adhered to a Yankee dryer and dried, typically to a moisture content of 8% or less. Any suitable art recognized adhesive may be used on the Yankee dryer. Suitable adhesives are widely described in the patent literature. A comprehensive but non-exhaustive list includes U.S. Pat. Nos. 5,246,544; 4,304,625; 4,064,213; 4,501,640; 4,528,316; 4,883,564; 4,684,439; 4,886,579; 5,374,334; 5,382,323; 4,094,718; and 5,281,307. Typical release agents can be used in accordance with the present invention.

The dried web is then creped from the Yankee dryer and optionally calendered. Creping is preferably carried out at a creping (pocket) angle of from about 70° to about 88°, preferably about 73° to about 85° and more preferably at about 80° using a blade having a bevel of from about 5° to about 15°. The present description of the invention herein in the context of CWP technology is illustrative only and it is to be understood that such examples are not meant to limit the invention. Furthermore, various changes and modifications that may become apparent to those skilled in the art from this detailed description are to be considered within the purview of the spirit and scope of the invention.

The more preferred products according to the present invention are at least three-ply products, at least the backing ply of tissue being adhered to the others by a glassining/entangling process, preferably by the use of knurled ply-bonding wheels which emboss and glassine the plies together over relatively minimal areas, and/or the use of adhesives. In the most preferred embodiments, use of adhesive is eschewed (except for tail seal if any) with all plies being joined to each other by entangling/glassining processes such as resulting from embossing, perforating and/or spot glassining of the plies so that they remain joined to each other without requiring substantial amounts of adhesive which can harshen the sheet, particularly if used as the principal method of ply-bonding. It is particularly preferred that the ply-bonding process used is one of the above described spot glassining processes wherein glassined spot embosses 60 are obscured in the emboss pattern on the embossed exterior ply 51 of the tissue product as in FIG. 1. Glassined spot embosses 60 can be obscured by being placed on a meandering path 65 as in FIG. 5, or by the use soft shouldered emboss elements 66 having soft shoulders 66S tapering away from their central contact area 66P, preferably comprising generally linear central contact areas 66P disposed at an angle with respect to the machine direction of the sheet as illustrated in FIGS. 44A-D and FIGS. 45A and 45B. In those embodiments in which the embossed plies are not shifted relative to each other, the embossing parameters will preferably be in the range normally used for embossing of two ply tissue. In the embodiments in which the embossed sheets are separated and displaced relative to each other, the embossing parameters will often be in the high end of the range normally used or even a little higher as some of the apparent emboss definition is lost when the sheets are separated. For example, in many cases, depending on machinery and emboss pattern, an embossing nip having a width (in the machine direction) of 1⅞" would be used for embossing two 11 lb/ream plies together. However, if the plies are to be separated, it would often be preferable to use a 2" or even 2⅛" embossing nip which requires far higher embossing pressure.

Figure 22:
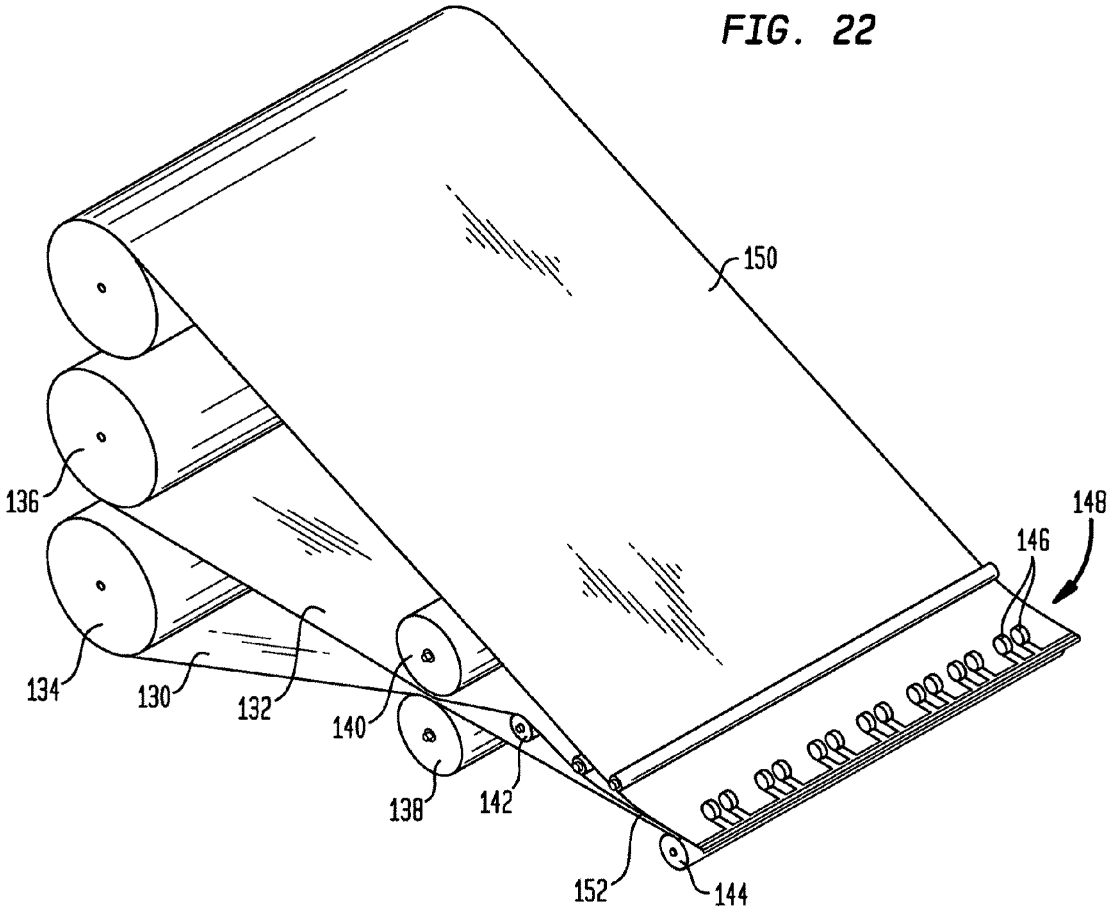
FIG. 22 is a schematic isometric perspective view of the converting process for tissue products of one embodiment of the present invention.
Figure 39:
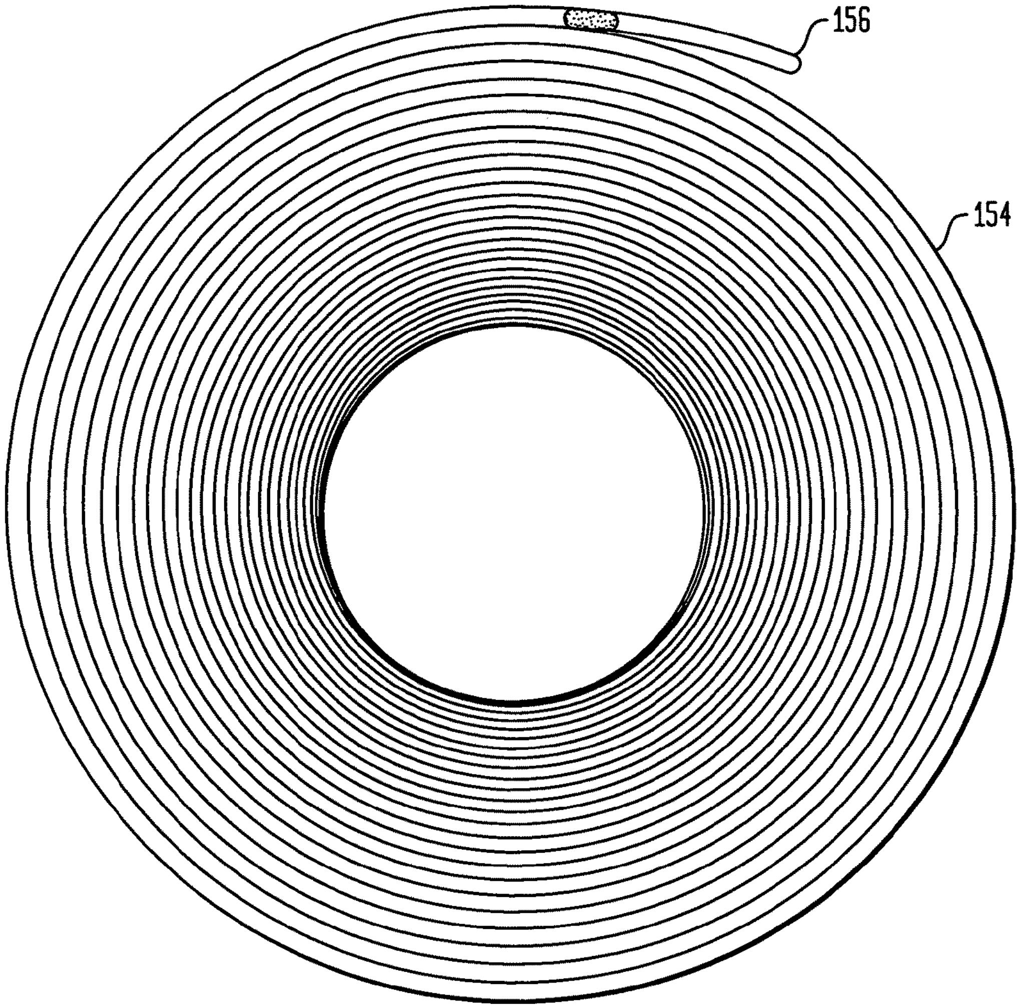
FIG. 39 is a schematic end view of a roll of tissue having a folded over tail-tab.

One embodiment of the present invention uses an emboss/ply-bonding process as shown in FIG. 22. In this process, two cellulosic webs 130 and 132, supplied from parent rolls 134 and 136, are embossed between emboss roll 138 and rubber backing roll 140 forming two embossed plies disposed such that the protrusions transferred to the cellulosic webs 130 and 132 face upwardly in FIG. 22. After embossing, cellulosic web 132 is separated from cellulosic web 130 and displaced longitudinally therefrom as it passes over separating roll 142 prior to passing between anvil roll 144 and knurled ply-bonding wheels 146 in spot glassining nip 148 in which relatively planar backing sheet 150 is ply-bonded to now embossed cellulosic webs 130 and 132. Even though the two embossed cellulosic webs 130 and 132 were embossed together, after they have been separated and displaced from each other, it is necessary to ply-bond them together to keep them from separating during use. It is preferred that this ply-bonding be done by passing combined three ply web 152 through spot glassining nip 148 as shown in FIG. 22. Typically, there is a plurality of knurled ply-bonding wheels arranged across the width of three ply web 152 so that all individual tissue rolls that are cut from the finished log will have at least two knurls or meandering regions of spot glassining holding the plies together. Typically the combined three ply web 152 may be perforated to make it easily separable into sheets and/or calendered (not shown, on papermachine-calendering being preferred) prior to being wound onto finished roll 154 shown in FIGS. 39 and 40 as having folded sealed tail tab 156 projecting therefrom.

Figure 27:
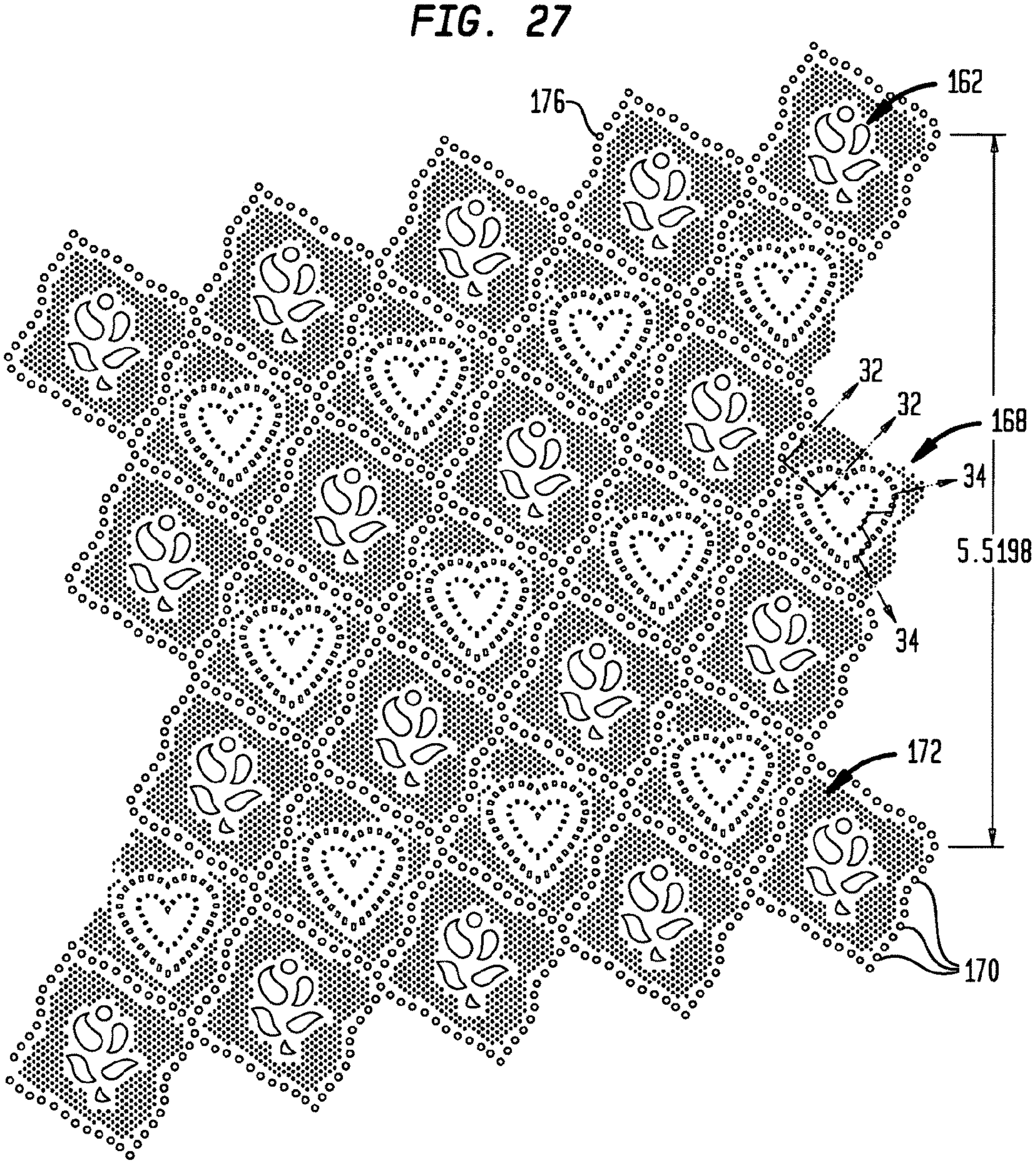
FIG. 27 illustrates an emboss pattern which is suitable for the product of the present invention.
Figure 28:
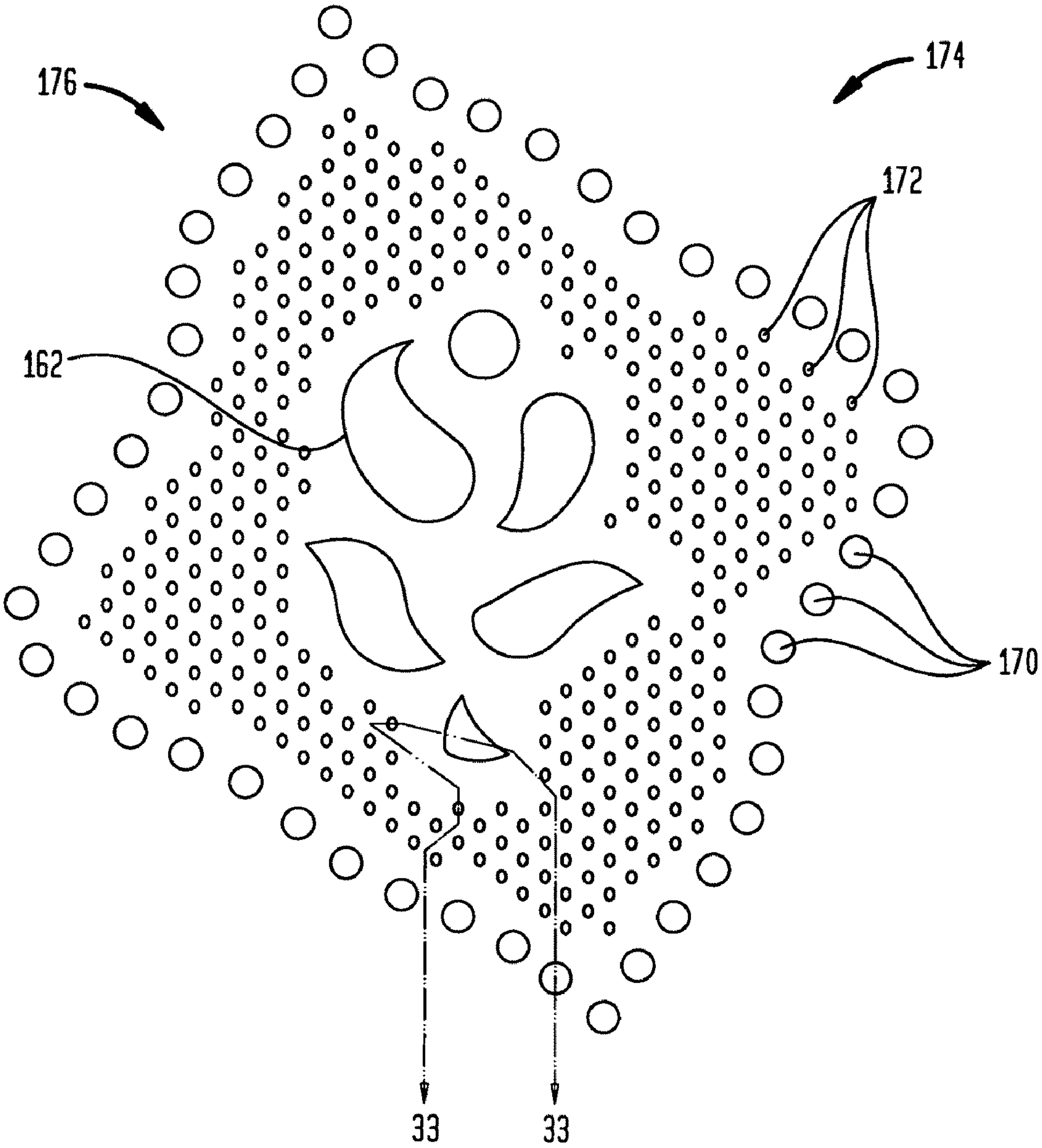
FIG. 28 is a detail view of a portion of FIG. 27 illustrating a grouping of large emboss elements.

Other methods of joining the plies together may also be used, such as adhering the plies to each other adhesively preferably at widely spaced spot locations, for example on only the tips of some or all bosses. In most cases, use of adhesive for ply bonding will entail significant loss of softness unless the adhesive is used with considerable restraint. In those cases where adhesive is used to marry plies together, the amount of adhesive used is preferably strictly controlled such that, as discussed hereinafter, the amount of adhesive used for plybonding each sheet of tissue ply is only a small fraction of the amount used for forming tail tab 156 on finished roll 154. In some applications where an embossing pattern such as disclosed in FIGS. 27 and 28 is used, surprising results can be obtained if ply-bonding adhesive is applied only to the tips of stitchlike emboss elements 170 defining the overall wavy diamond pattern. This is easily accomplished if stitchlike emboss elements 170 are the deepest of the bosses used in forming the pattern. Typically, if adhesive is applied to stitchlike emboss elements 170; the height thereof should be at least 10 mils, preferably 20 mils greater than the bulk of the other bosses.

Figure 23D:
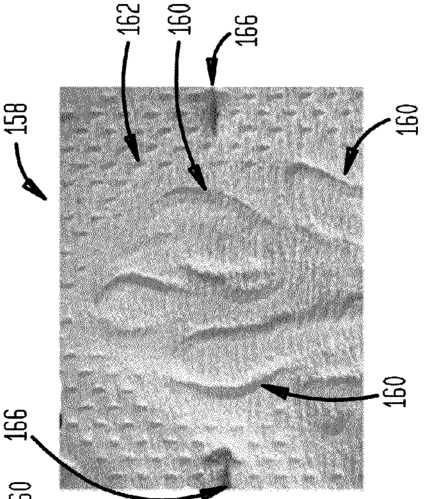
FIGS. 23A-23E are photomicrographs of three ply bath tissues of the present invention in which the embossed sheets have been displaced relative to each other by about 50% of the MD length of the group of large emboss elements making up the flower signature emboss.
Figure 23B:
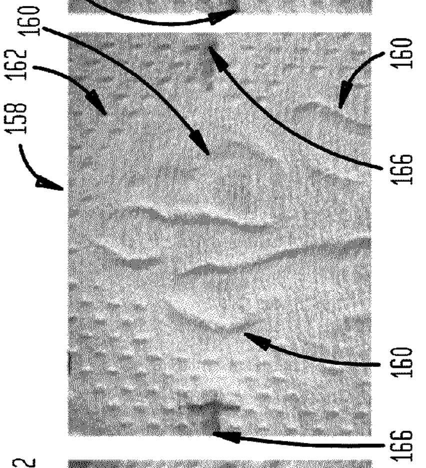
Figure 23A:
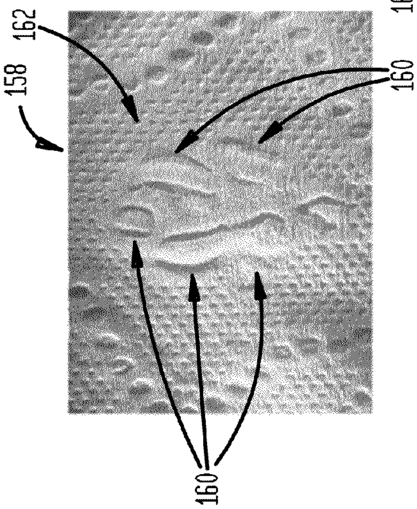
Figure 23C:
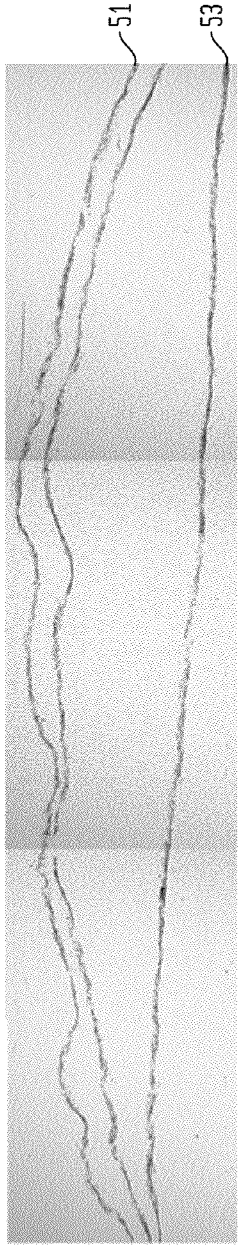
Figure 23E:
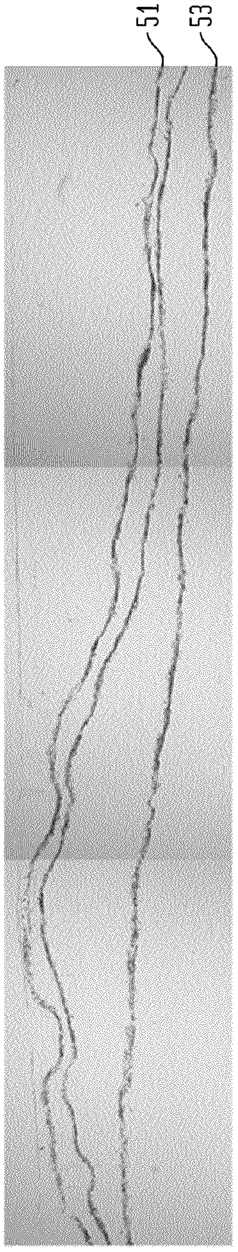
Figure 24D:
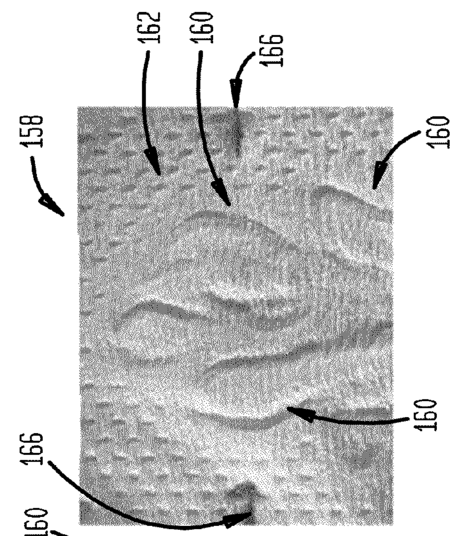
FIGS. 24A-24E are photomicrographs of three ply bath tissues of the present invention in which the embossed sheets have been MD displaced relative to each other by about 90% of the MD length of the group of large emboss elements making up the flower signature emboss.
Figure 24B:
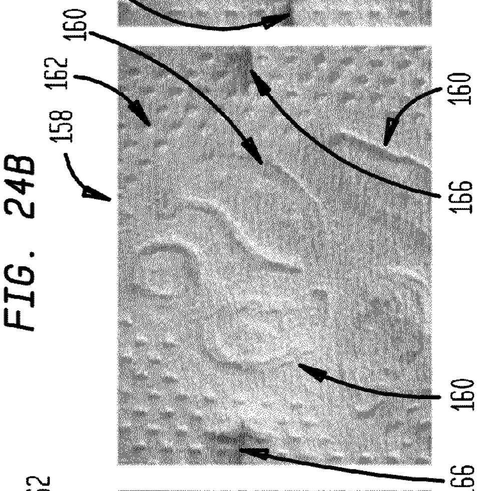
Figure 24A:
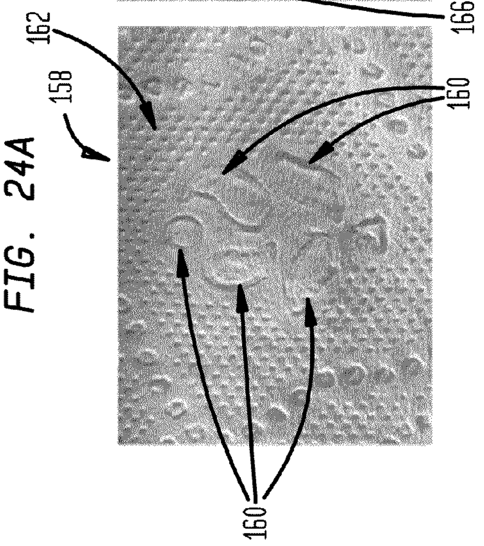
Figure 24C:
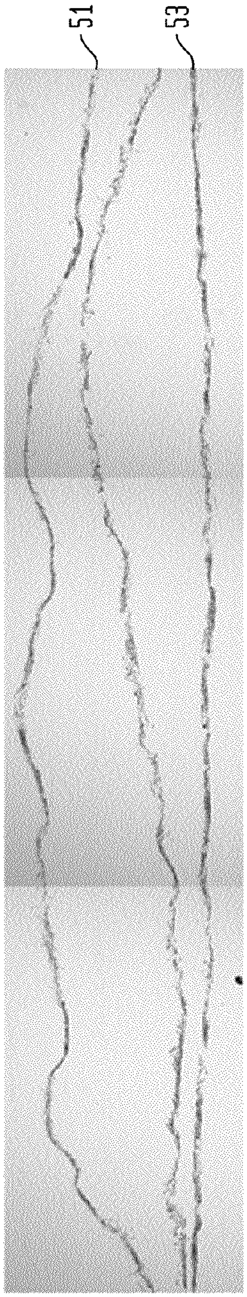
Figure 24E:
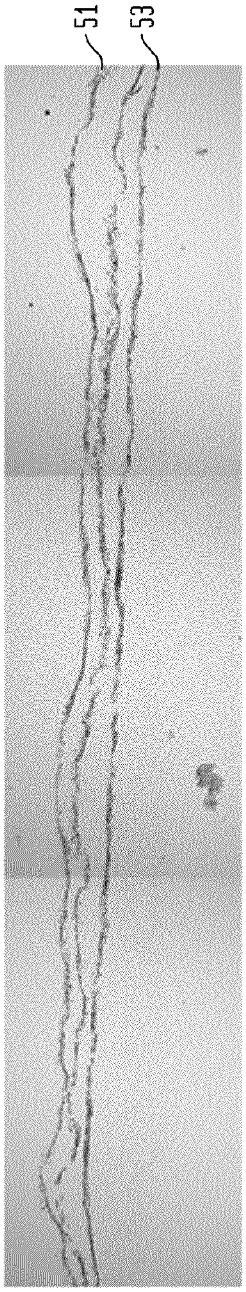
Figure 25A:
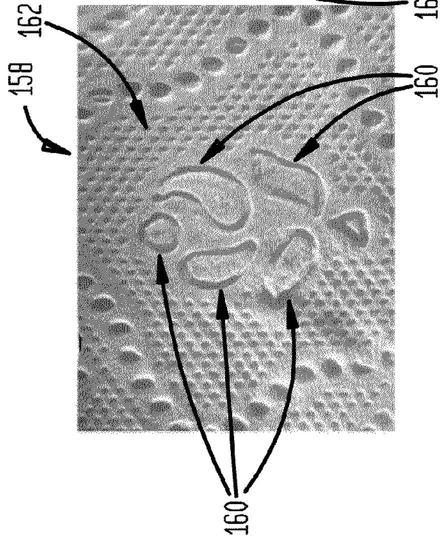
FIGS. 25A-25E are photomicrographs of three ply bath tissues of the present invention in which the embossed sheets have been CD displaced relative to each other by about 50% of the CD length of the group of large emboss elements making up the flower signature emboss.
Figure 25B:
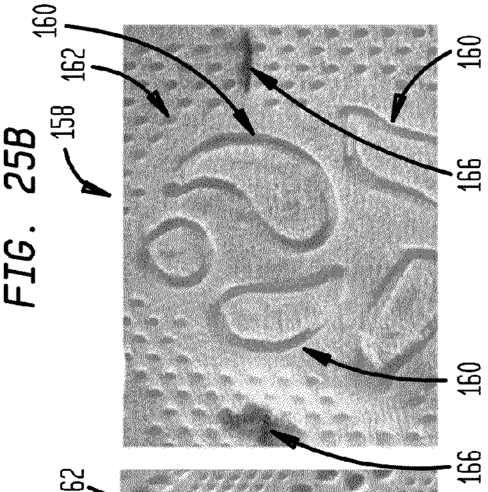
Figure 25C:
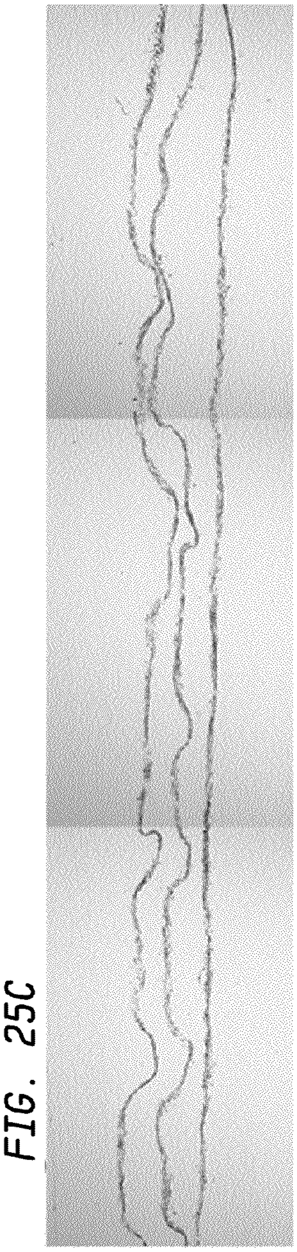
Figure 25D:
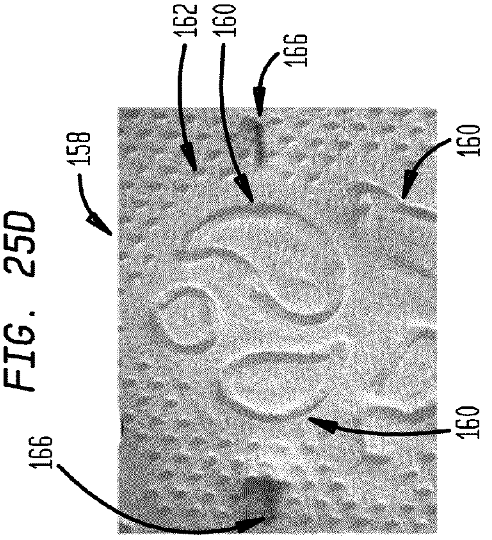
Figure 25E:
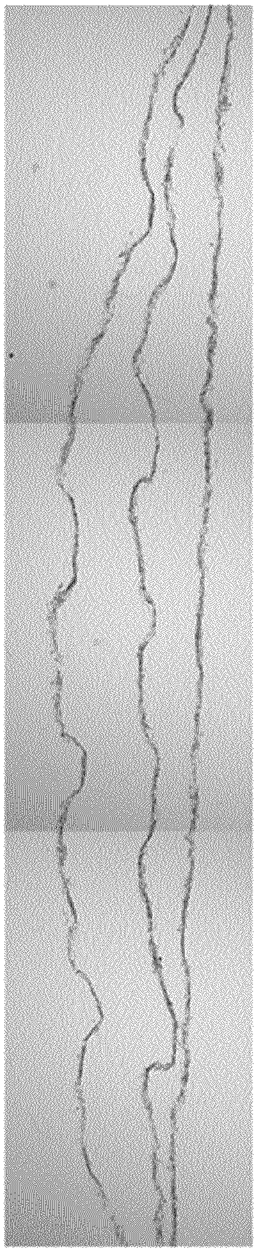

FIGS. 23A-23E are photomicrographs illustrating the billowy nature of the signature bosses on the cellulosic web 130 of three ply web 152 as formed in FIG. 22 when groupings 158 of large emboss elements 160 constituting flower signatures 162 only partially overlap with the matching grouping on intermediate cellulosic web 132. FIG. 23A is an overall view of signature of the present emboss when groupings 158 of large emboss elements 160 making up flower signature 162 longitudinally overlap by about 40 to 60% of the length of flower signature 162. FIGS. 23B and 23D are enlargements of portions of FIG. 23A with hash marks 166 illustrating the lines upon which the sectional views shown in FIGS. 23C and 23E were taken. In FIGS. 23C and 23D, it can be seen that the large emboss elements 160 in groupings 158 making up flower signatures 162 are displaced so that they only partially overlap. No significance should be attached to the vertical separation between the plies as the embedding procedure used to prepare these sections tends to increase the separation between the plies. In FIGS. 23A, B and D, the length of groupings 158 is about 18 mm while the width is approximately 13 mm.

FIGS. 24A-24E are photomicrographs analogous to FIGS. 23A-23E illustrating the billowy nature of the signature bosses when groupings 158 of large emboss elements 160 making up flower signatures 162 are displaced longitudinally so that the partially overlap by about 40 to 60% of the length of flower signatures 162.

FIGS. 25A-25E are photomicrographs analogous to FIGS. 23A-23E illustrating the billowy nature of the signature bosses when groupings 158 of large emboss elements 160 making up flower signature 162 are displaced longitudinally so that the partially overlap by about 40 to 60% of the length of flower signatures 162.

FIGS. 26A-26E are photomicrographs analogous to FIGS. 23A-23E illustrating the billowy nature of the signature bosses when groupings 158 of large emboss elements 160 making up flower signatures 162 are displaced longitudinally so that they partially overlap by about 40 to 60% of the length of flower signatures 162.

Embossing

The typical tissue embossing process relating to multi-ply tissues involves the compression and stretching of the flat tissue base sheets between a relatively soft (perhaps around 40 Shore A) rubber roll and a hard roll which has a pattern of relatively large "macro" signature emboss elements projecting therefrom, in some cases interspersed in a field of smaller "micro" emboss elements forming a background. This embossing not only improves the aesthetics of the tissue and the structure of the tissue roll but also may be formed in any a wide variety of distinctive patterns that aid the consumer in identifying the source of the tissue even when it is unwrapped. However, the thickness of the base sheet between the signature emboss elements is actually reduced. This lowers the perceived bulk of a CWP product made by this process. Also, in conventional products, this process makes the tissue two-sided; as the male emboss elements create protrusions, asperities or knobs on only one side of the sheet.

Smaller, closely spaced "micro" elements added to the emboss pattern can improve the perceived bulk of the embossed product. However, this often results in a relatively harsh product in conventionally embossed products. This is because small elements in a rubber to steel process create many small, relatively stiff protrusions on one side of the tissue, resulting in a high roughness. However, in the practice of the present invention, the small stiff protrusions are concealed between the plies of the finished product, obviating this problem. Advantageously, the micro-embosses are similar in size and shape to the glassined spot embosses formed on a meandering path by the more preferred spot glassining processes of the present invention and, therefore, tend to largely obscure the spot glassining path in the finished product providing an enhanced appearance.

According to one embodiment of the process of the present invention, two plies of the tissue are embossed between an emboss roll and a rubber backup roll, then separated and displaced longitudinally with respect to each other. The other web can also be embossed between an emboss roll and a rubber backup roll or can be unembossed. The webs are then combined in a manner so as to dispose the embossed side(s) having protrusions to the interior of the finished multi-ply product.

The emboss pattern used to produce the patterns in the current invention may be any convenient pattern with at least the predominant visual elements being chosen and shaped so that their contours in the plane of the tissue define an arbitrary, visually recognizable image possibly having trademark significance quite apart from the tactile properties imparted by the details of the embossing process, it being understood that an extremely large number of patterns can impart the same tactile and other functional benefits as the patterns shown. Preferably, the pattern contains at least macro and micro elements and in particular contains groupings of large elements, typically referred to as a signature with the large elements defining a recognizable shape having gross dimensions of from about 7 to 20 mm.

FIGS. 27 through 34 illustrate the details of the emboss pattern used to produce the tissues shown in FIGS. 23A-26E.

Figure 29:
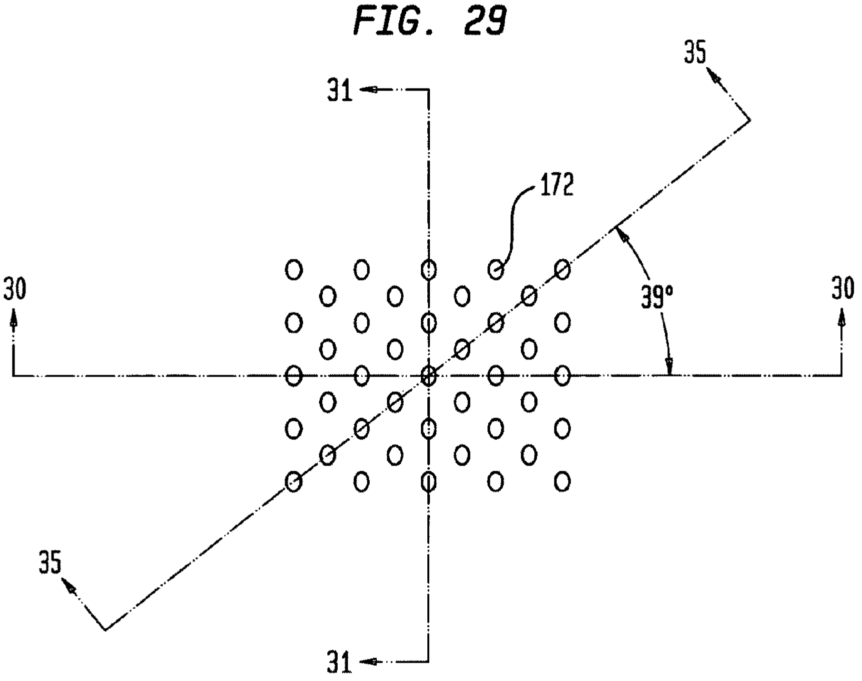
FIG. 29 is a detail view of a portion of FIG. 27 illustrating a grouping of micro emboss elements.
Figure 30:
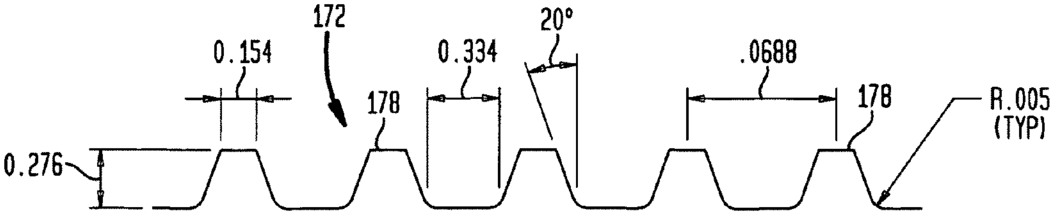
FIG. 30 is a sectional view of the grouping of micro emboss elements of FIG. 29 taken along line 30-30.
Figure 31:
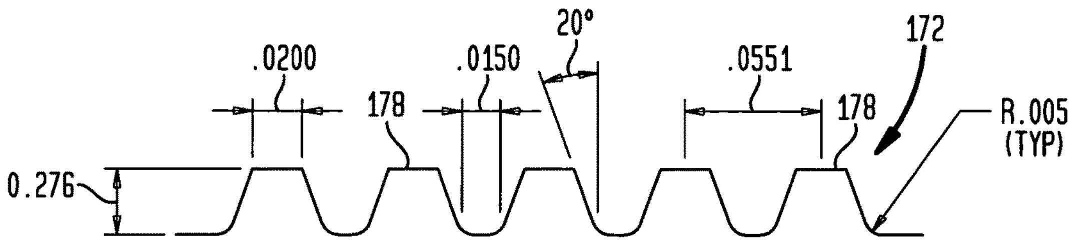
FIG. 31 is a sectional view of the grouping of micro emboss elements of FIG. 29 taken along line 31-31.
Figure 32:
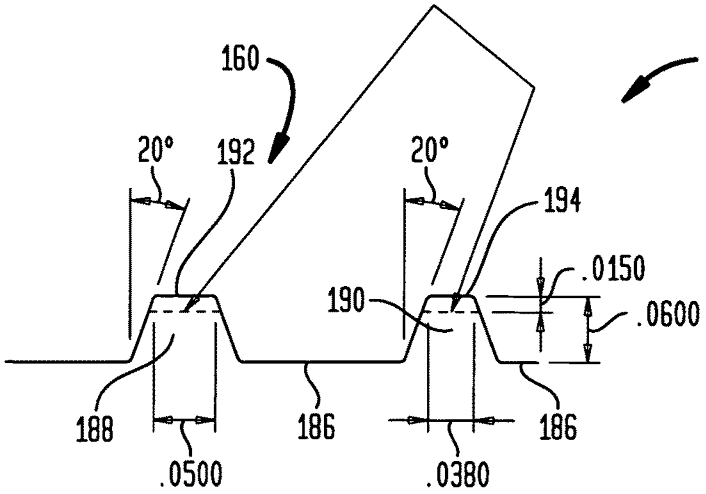
FIG. 32 is a sectional view of the grouping of large emboss elements of FIG. 27 taken along line 32-32.
Figure 33:
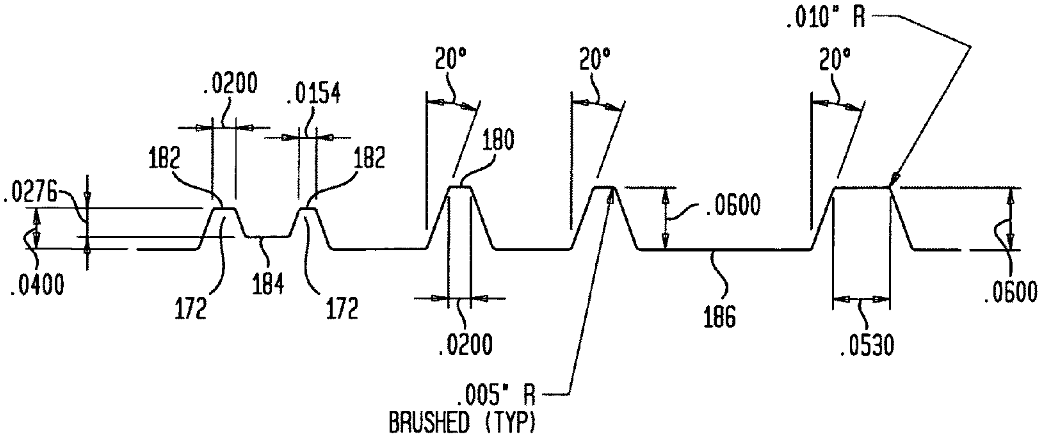
FIG. 33 is a sectional view of the grouping of large emboss elements of FIG. 28 taken along line 33-33.
Figure 34:
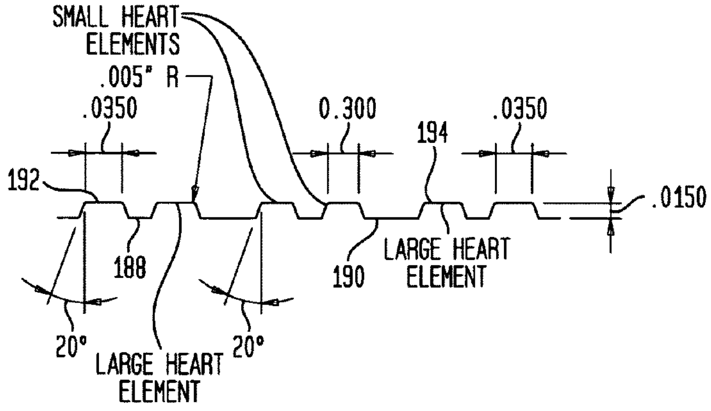
FIG. 34 is a sectional view of a grouping of large emboss elements of FIG. 27 taken along line 34-34.
Figure 35:
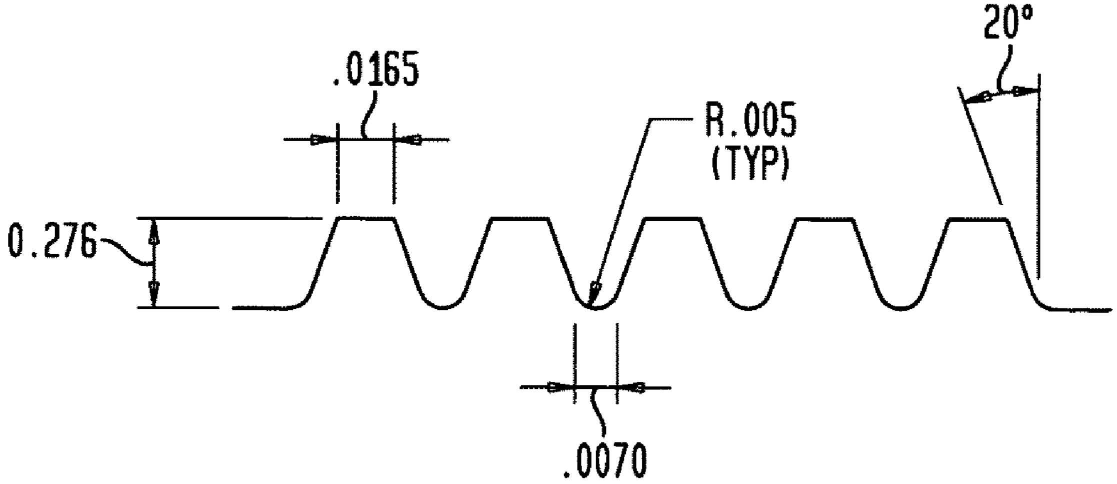
FIG. 35 is a sectional view of a grouping of micro emboss elements of FIG. 29 taken along line 35-35.
Figure 36:
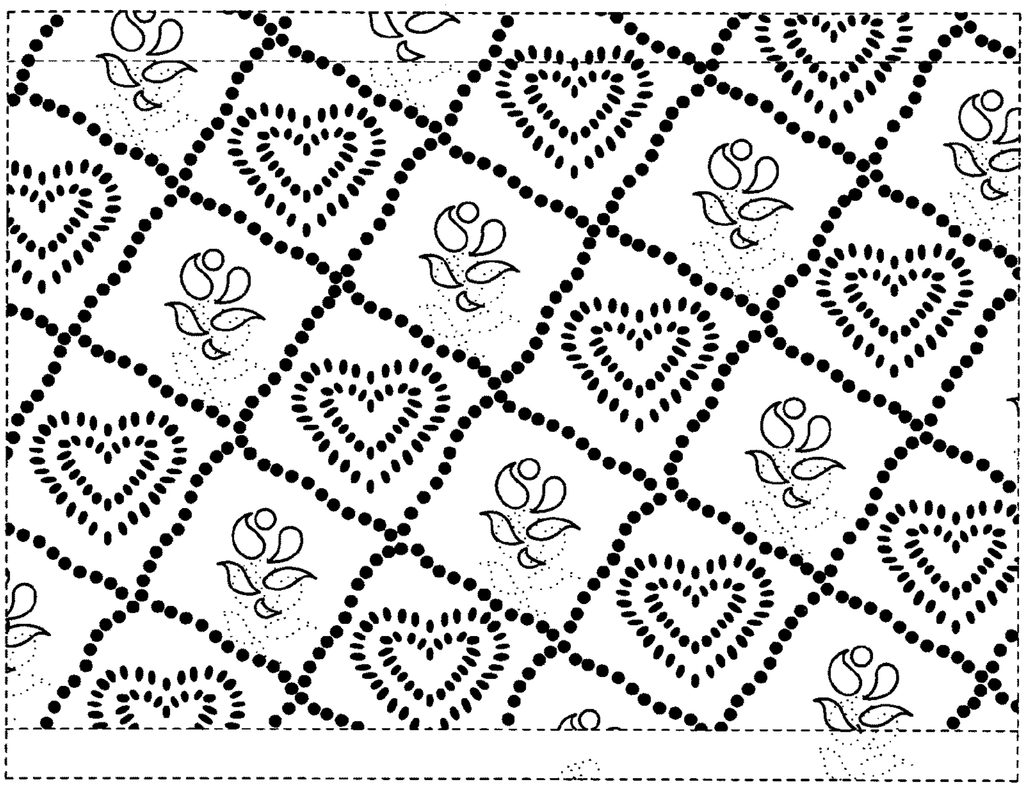
FIG. 36 illustrates the offset between large emboss element groups of two embossed layers of a tissue made in accordance with the present invention.
Figure 37:
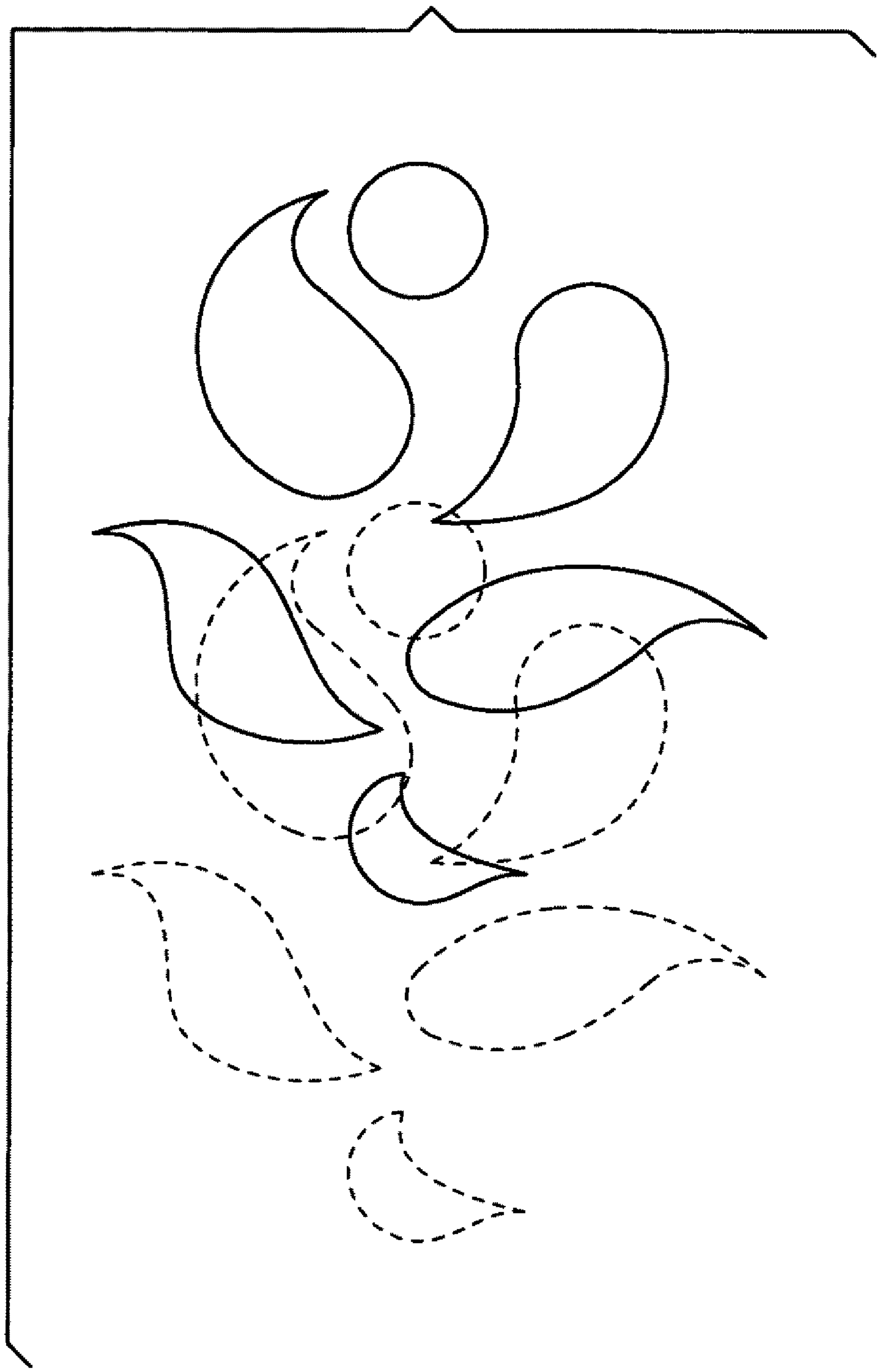
FIG. 37 illustrates a single cell of FIG. 15 demonstrating the offset between large emboss element groups of two embossed layers of a tissue made in accordance with the present invention.
Figure 38:
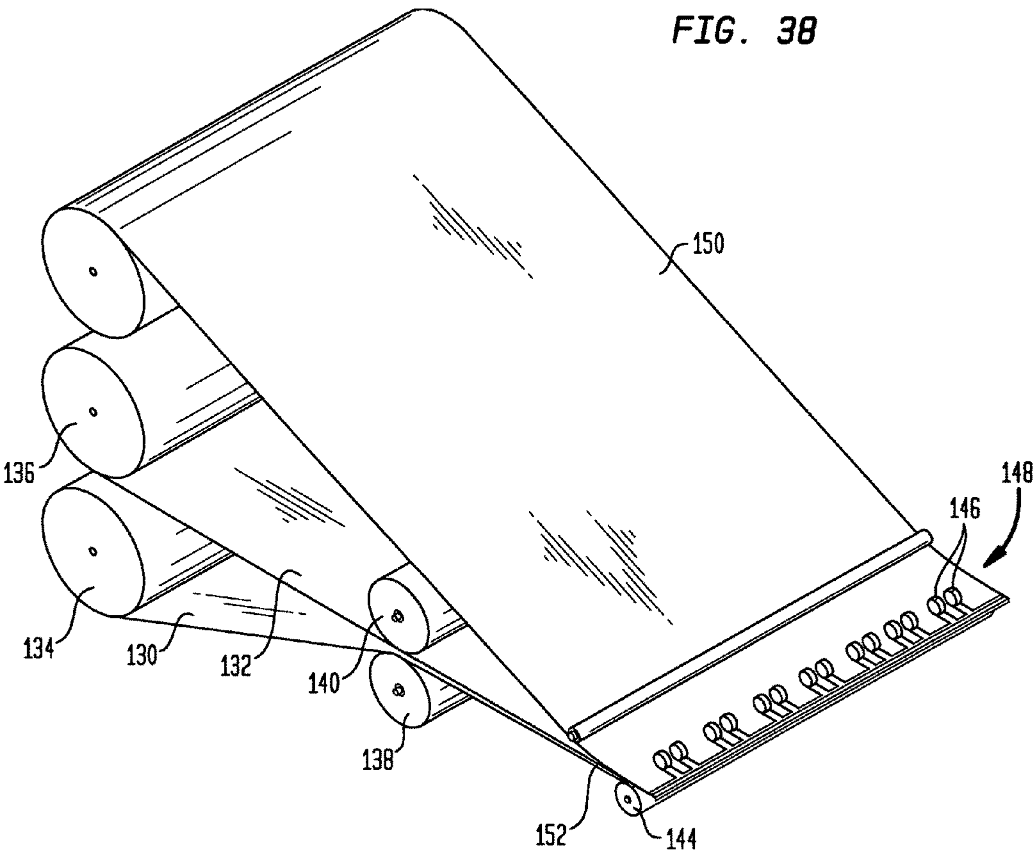
FIG. 38 is a schematic isometric perspective view of the converting process for tissue products of another embodiment of the present invention.

In the case of the design illustrated in FIG. 27 of the present application, the overall emboss pattern has a repeat of about 5.5" defined by hearts and flower signatures 168 and 162 respectively, stitchlike emboss elements 170 and micro emboss elements 172. Signatures 162 and 168 are centrally located in and partially fill cells 174 defined by intersecting wavy lines 176 of stitchlike emboss elements 170. Micro emboss elements 172 are disposed in regular arrays around signature 162 and 168 largely filling the remainder of cells 174 surrounding signature bosses 162 and 168. Micro emboss elements 172 will generally be more numerous and of finer scale and lower in height than the macro elements typically used in conventional embossing patterns. Typically, a micro-emboss pattern will have at least 30 to 40 element/$cm^2$ each having an area of about 1 $mm^2$ or less. Preferred micro-emboss elements will have an area of about 0.10 to 0.20 $mm^2$. As shown in FIGS. 28 and 29, stitchlike emboss elements 170 have a depth of approximately 60 mils, a table 178 (FIGS. 30 and 31) of 53 mils in diameter and are brushed to break the corners thereof giving stitchlike emboss elements 170 a softer rounder appearance, while, as shown in FIG. 33, large elements 160 of flower signature 162 have a height of 60 mils and table 180 of about 20 mils in width with micro emboss elements 172 being approximately 15 mils in width and 20 mils in length while rising to a height of 40 mils above base plane 186 of the tissue and spaced widthwise approximately 69 mils between centers as shown in FIG. 30 and lengthwise about 55 mils between centers as shown in FIG. 29. As shown in FIG. 33, plateau region 184 between micro emboss elements 172 is about 28 mils below tables 182 of micro emboss elements 172 and about 12 mils above base plane 186 of the tissue. Typically, sidewall angle θ of all emboss elements will be approximately 20°. Large elements 160 forming heart signature 168 will preferably have crenellated or crenulated structure as described in Dwiggins, et al., U.S. Pat. No. 6,033,761, Soft, Bulky Single-Ply Tissue Having Low Sidedness And Method For Its Manufacture, Mar. 7, 2000 in which, as shown in FIGS. 32 and 34 hereof, inner crenels 188 and outer crenels 190 are raised approximately 45 mils above base plane 186 of the tissue with inner merlons 192 and outer merlons 194 extending an additional 15 mils further, inner crenels 188 having a width of about 50 mils while outer crenels 190 have a width of about 38 mils. Outer merlons 194 have a length of about 35 mils while inner merlons 192 have a length of about 30 mils. If plies are to be joined using adhesive, it is very advantageous to ensure that stitchlike emboss elements 170 have a height of at least about 70 mils or at least about 10 mils greater than the height of any other elements making it convenient to apply very small amounts of adhesive to only stitchlike emboss elements 170.

It should be noted that, although the embossed webs are joined during the embossing process, in some embodiments, they are thereafter separated and displaced relative to each other longitudinally such that the groups of large elements defining the signature bosses only partially overlap each other. If the size of groups making up the signature bosses is in the range of from 7 to 20 mm, a longitudinal overlap of from about 10% to about 18 mm will impart an especially billowy appearance to flower signature bosses 162 (as shown in FIG. 27) on uppermost cellulosic web 130 (as shown in FIG. 22). A longitudinal overlap of from about 40% to about 60% is more preferred.

Although the processes of the current invention have been described for three-ply structures, these processes can not only be used for two ply structures but can be extended to include structures made up of four or more plies. In any case, plies can be joined together prior to embossing and joining with the other ply or plies. Alternatively, one or more unembossed plies could be sandwiched between the embossed plies such that the protrusions from each embossed ply contact an unembossed ply on the inside of the sheet. Such variations are within the scope of the current invention. Similarly, high bulk webs are particularly suitable for the interior layers of these structures, especially those made by such techniques as through air drying, creped or uncreped, or fabric creping techniques in which fibers in a medium consistency web are rearranged as they are fabric creped from a moving transfer surface as disclosed in the following patent publications: US 2004/023813581, Edwards, et al.; US 2005/0217814, Super et al.; US 2005/0241787, Murray, et al.; US 2006/0000567, Murray, et al.; US 2005/0279471 Murray, et al.; US 2005/0241786, Edwards, et al.; US 2006/0237154, Edwards et al.,; US 2006/0289134, Yeh et al.; US 2006/0289133, Yeh et al. and US 2008/0029235, Edwards et al.

Figure 40:
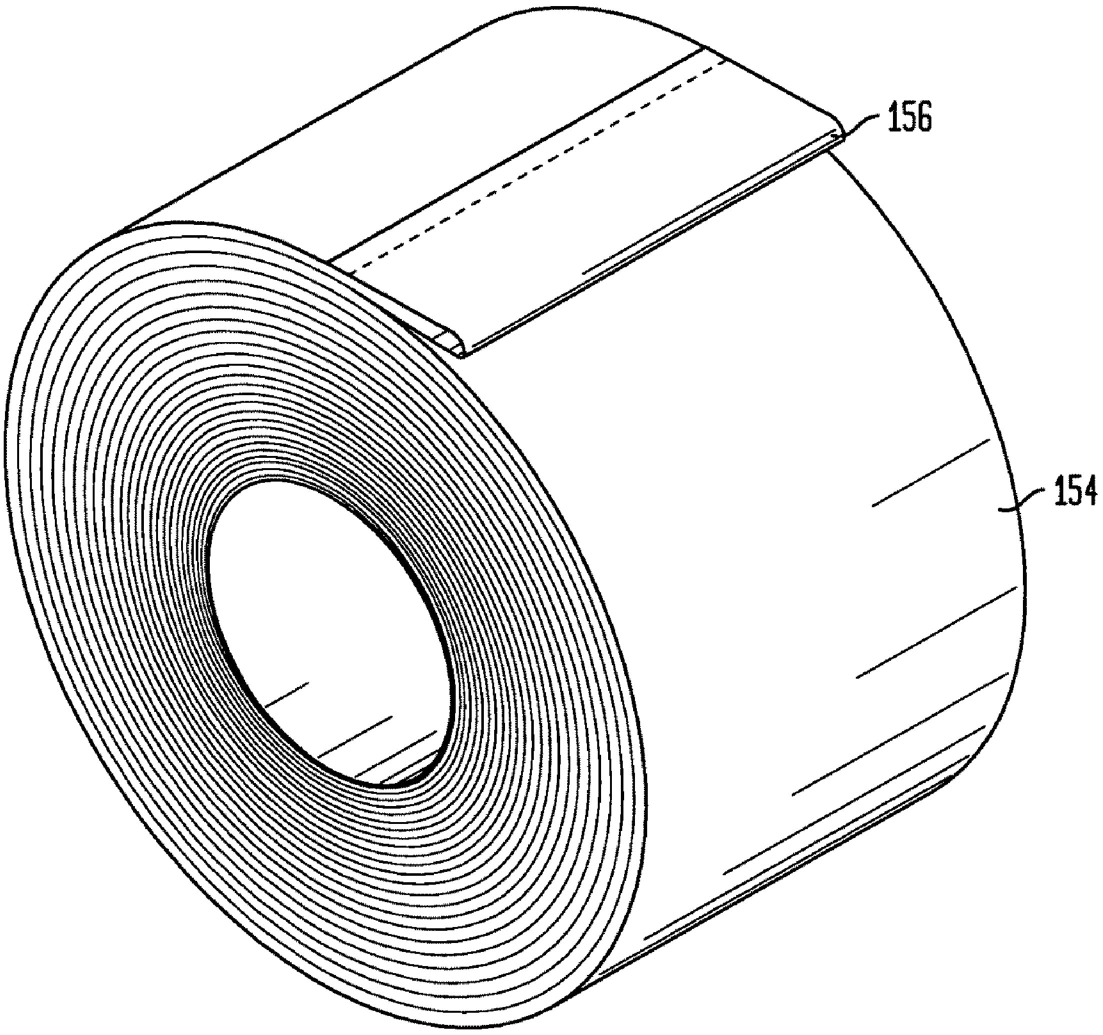
FIG. 40 is a schematic isometric perspective view of the tissue roll of FIG. 39.
Figure 41:
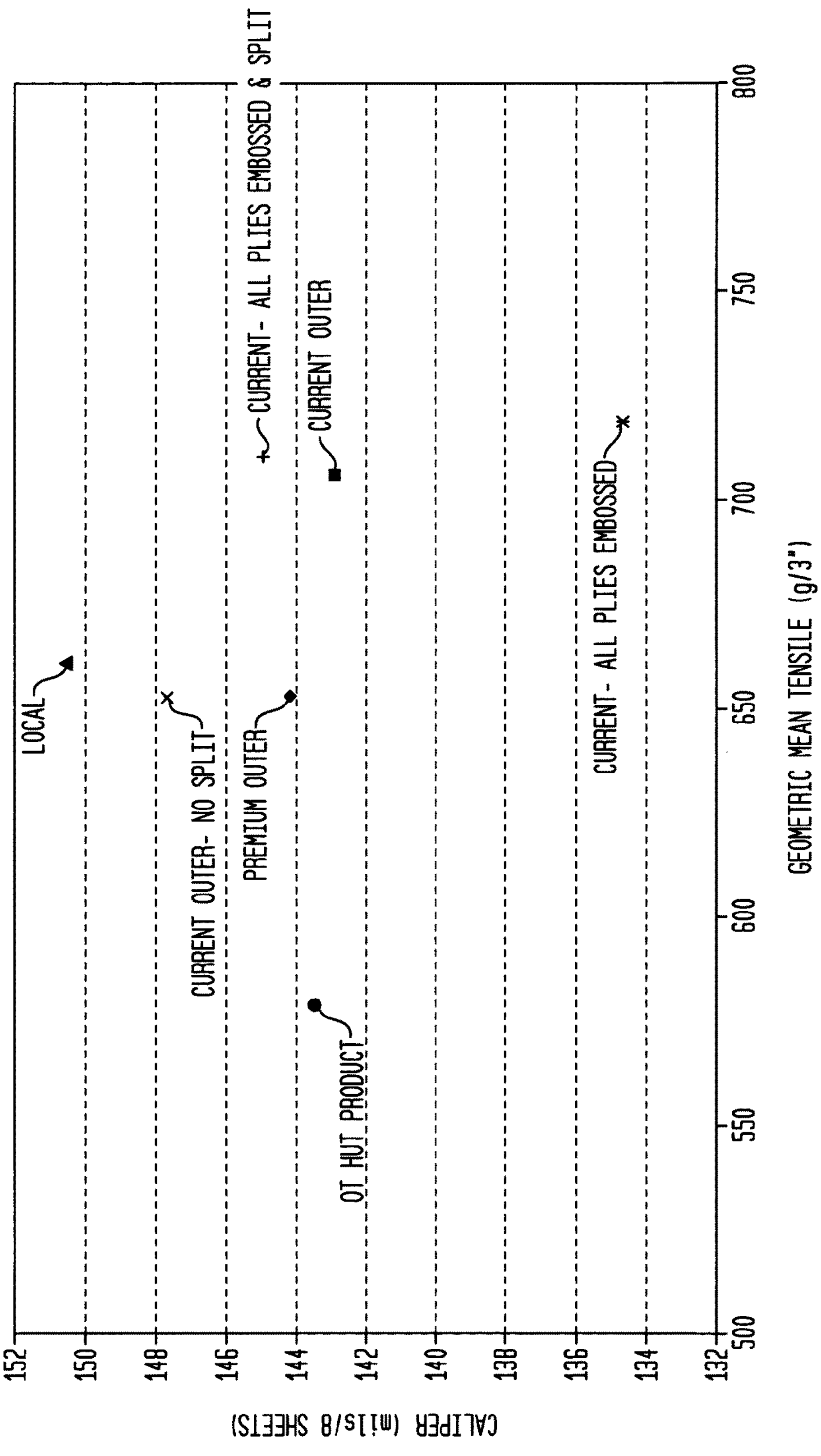
FIG. 41 is a graph comparing the caliper and geometric mean tensile strength of a variety of 3-ply products.
Figure 42:
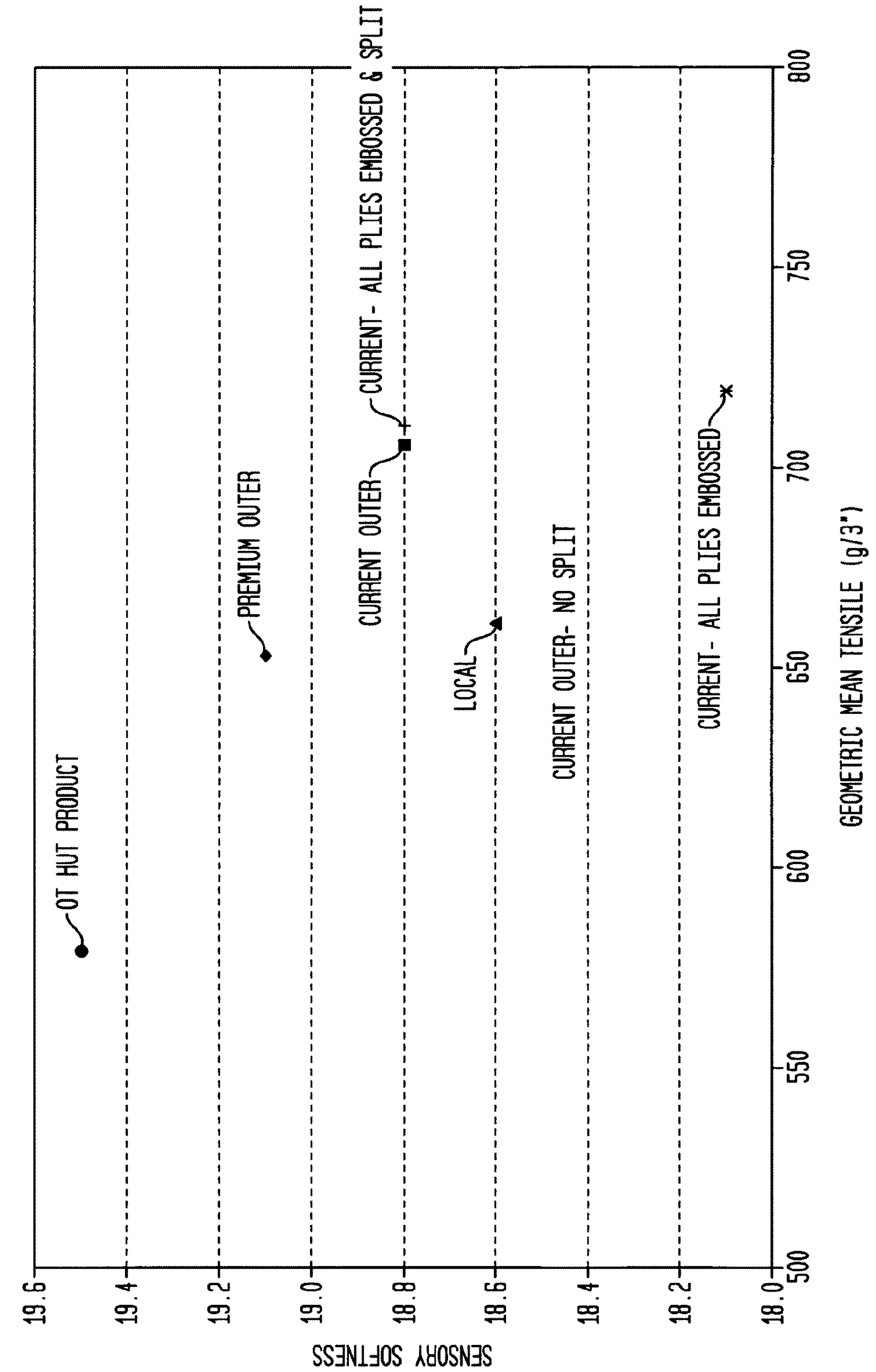
FIG. 42 is a graph comparing the sensory softness and geometric mean tensile strength of a variety of 3-ply products.
Figure 43:
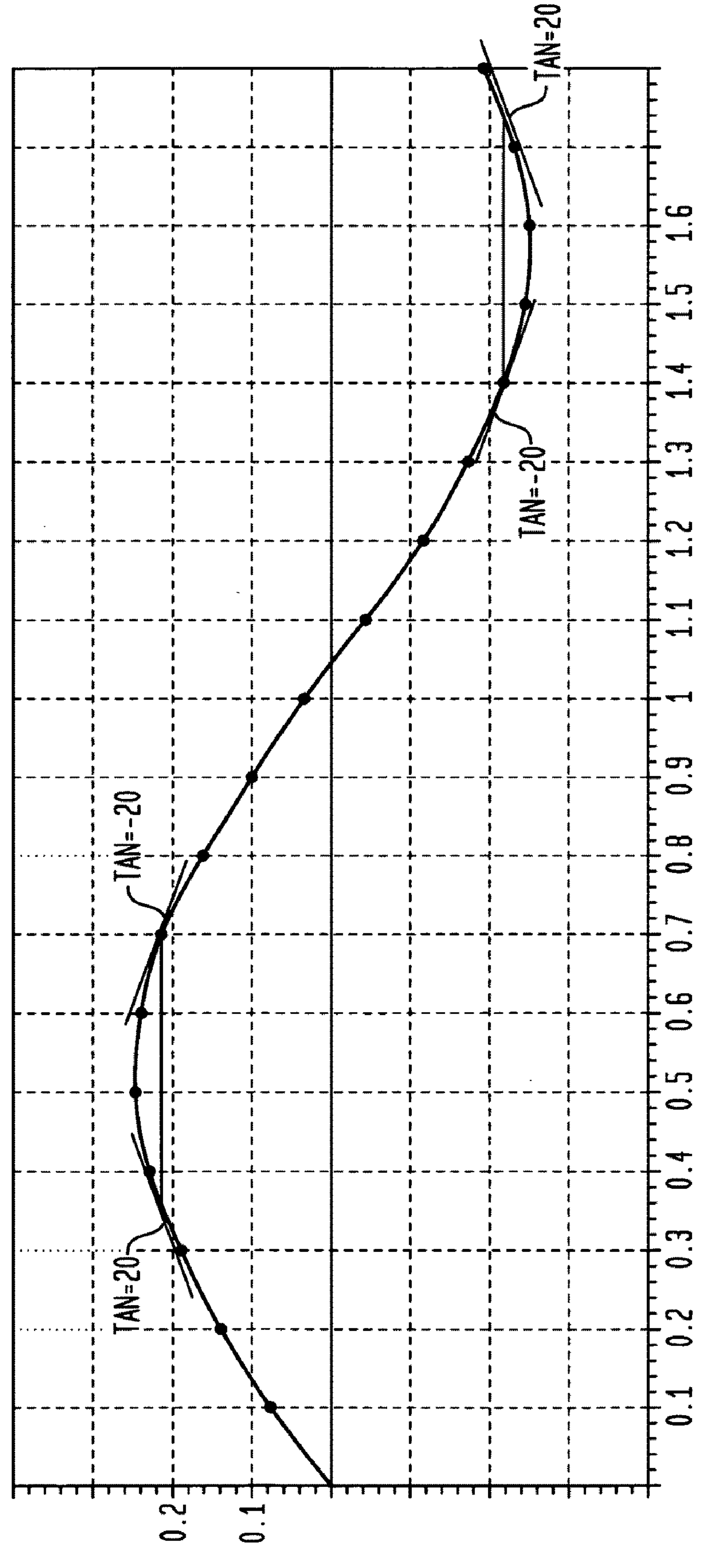
FIG. 43 is a graph of the path the glassined spot embosses meander along in a preferred embodiment of the invention illustrating that, for approximately 70% of the circumferential length of the path, the tangent thereto is offset from the machine direction by at least about 20°.
Figure 44B:
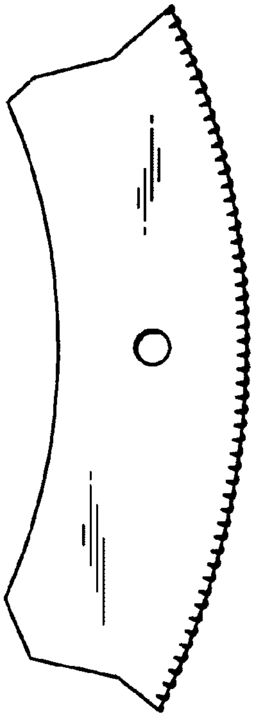
FIGS. 44A-E illustrate the overall configuration of a knurled ply-bonding wheel suited for hidden plybonding.
Figure 44A:
Figure 44C:
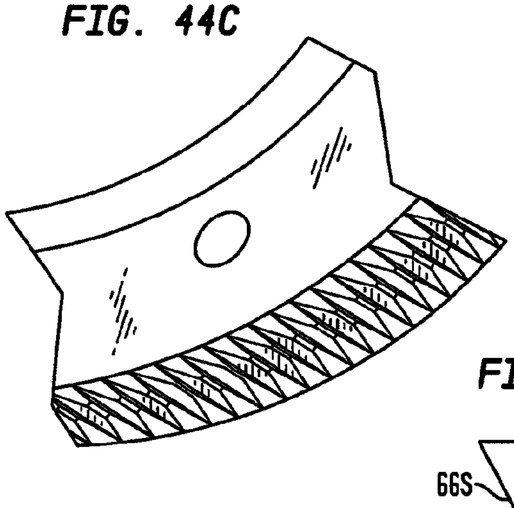
Figure 44D:
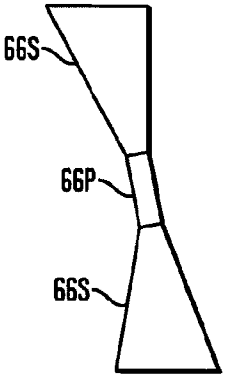
Figure 44E:
Figure 45B:
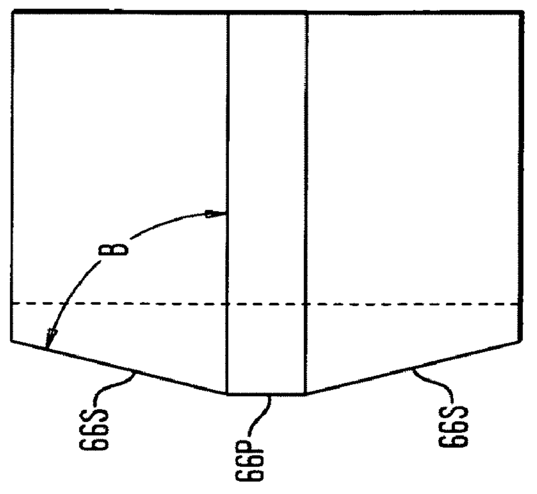
FIGS. 45A & B illustrate the dimensions and contours of the knurled ply-bonding wheel of FIGS. 44A-C.
Figure 45A:
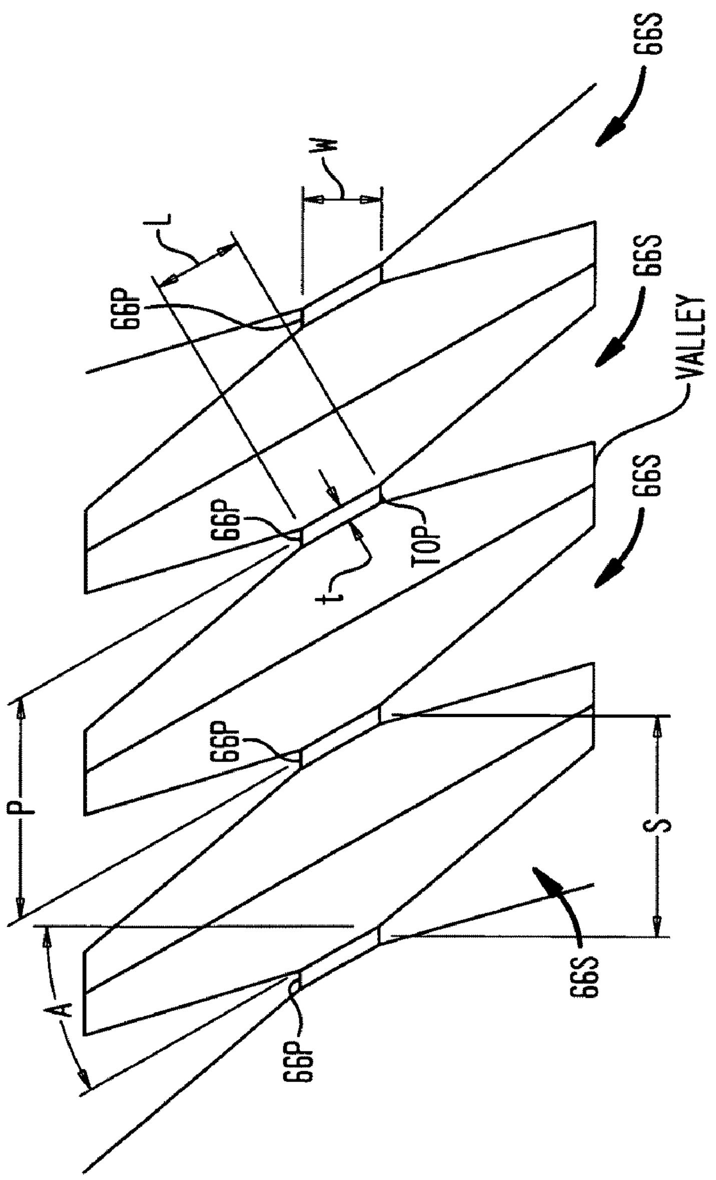
Figure 46:
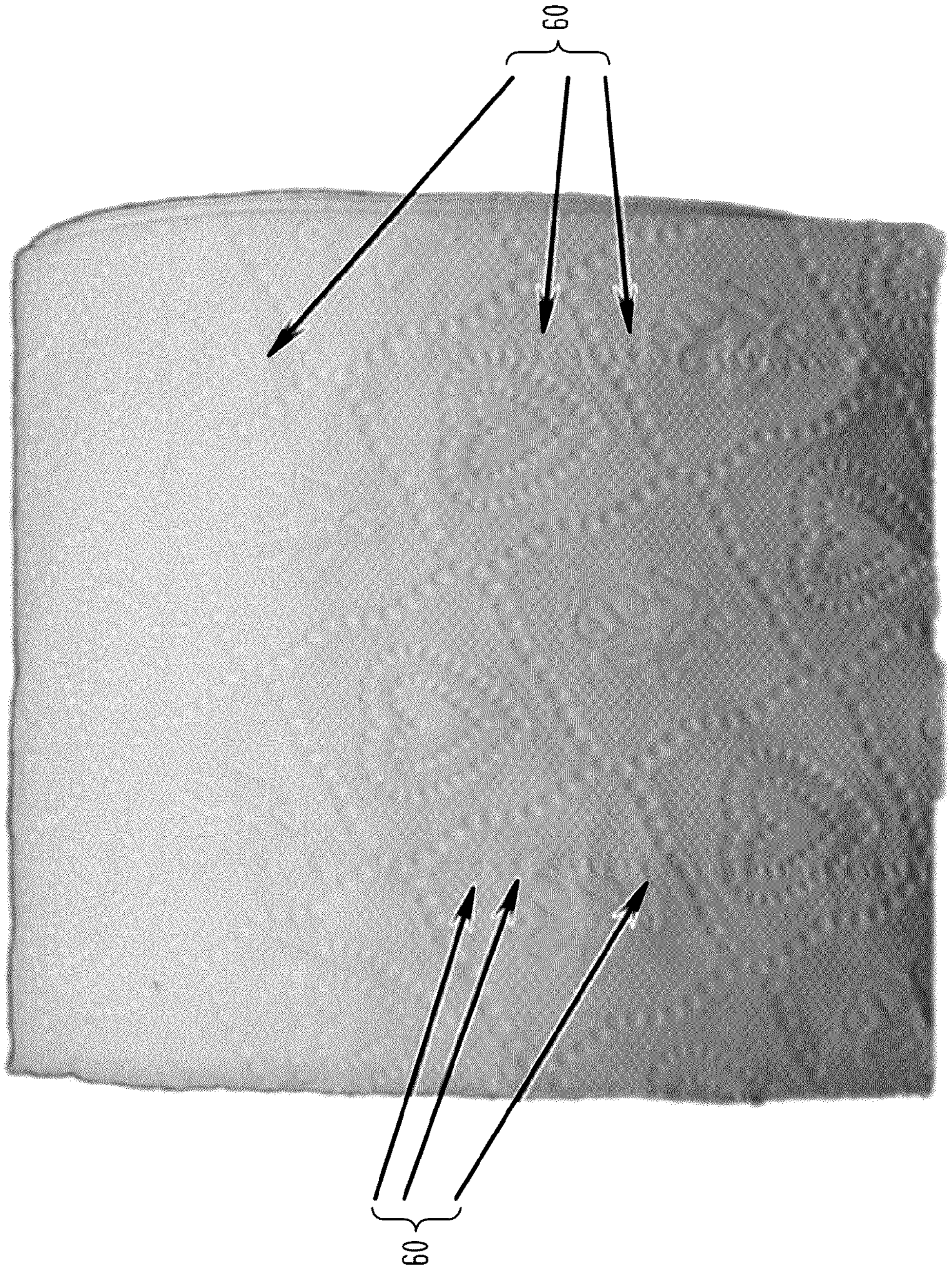
FIG. 46 illustrates a roll of bath tissue having soft-shouldered plybonding knurls.
Figure 47:
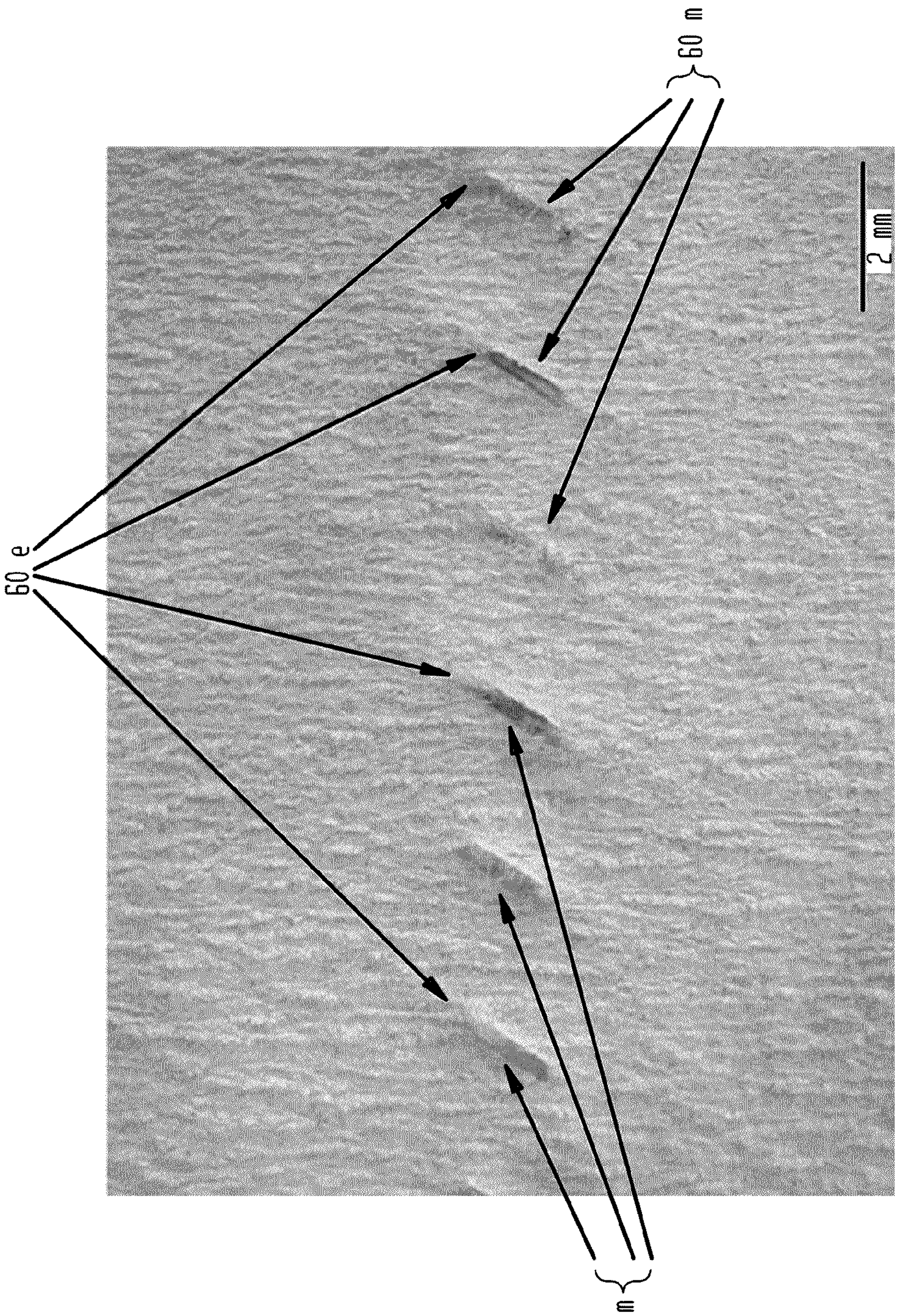
FIG. 47 is a photomicrograph illustrating soft-shouldered glassined spots on the reverse of an unembossed ply of a roll of bath tissue.
Figure 48:
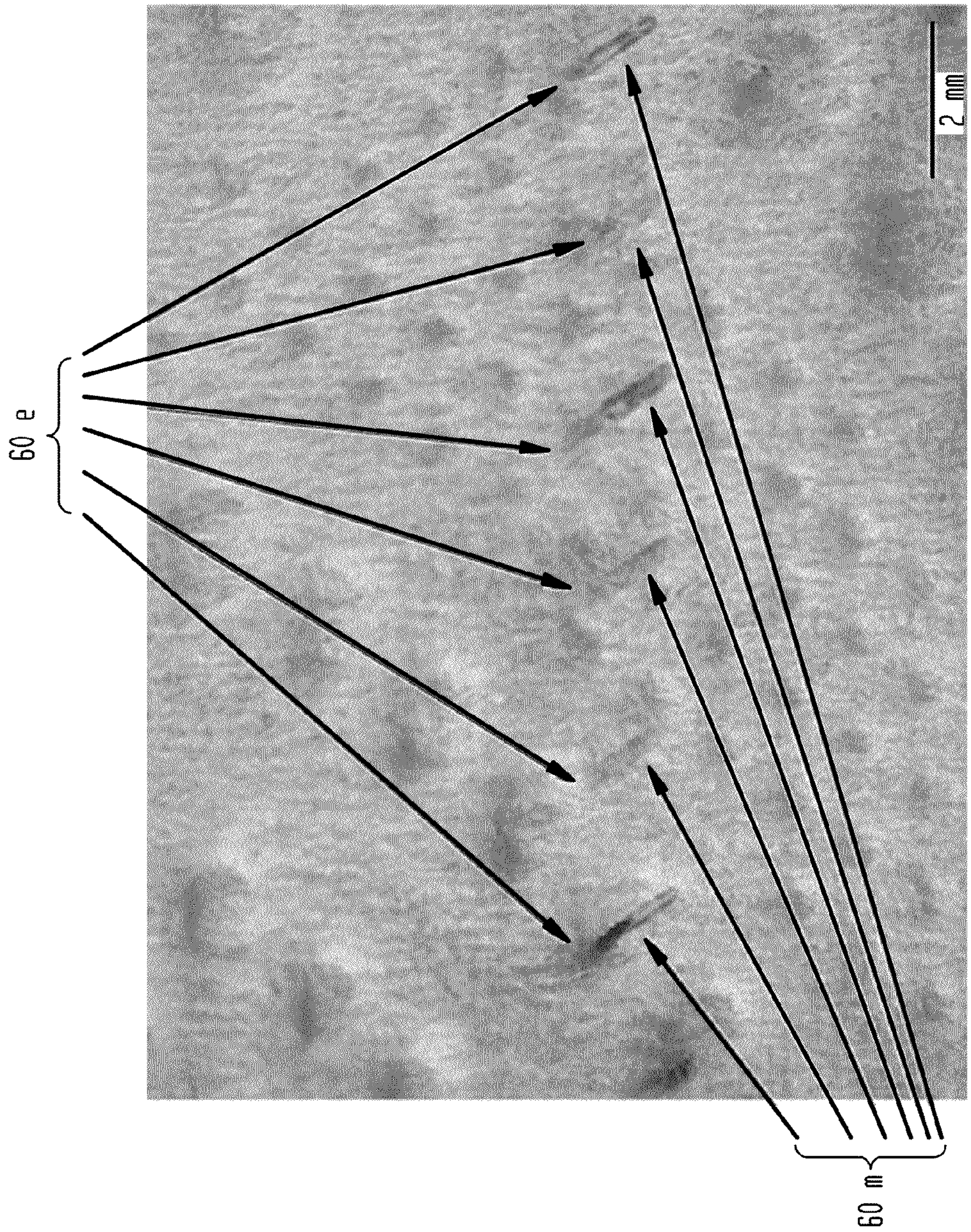
FIG. 48 is a photomicrograph illustrating soft-shouldered glassined spots on the obverse of an embossed ply of a roll of bath tissue.
Figure 49A:
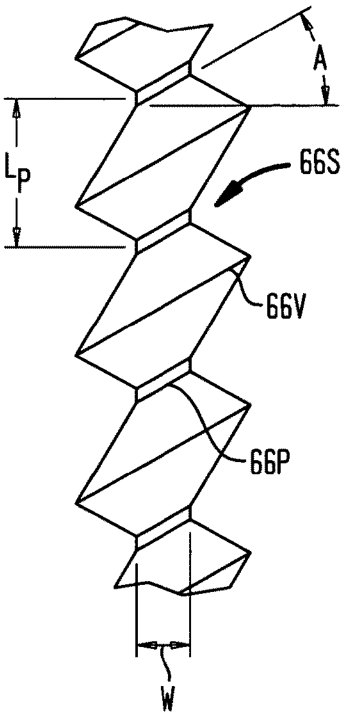
FIGS. 49A-C illustrate the method of formation of a knurled ply-bonding wheel suited for hidden plybonding.
Figure 49B:
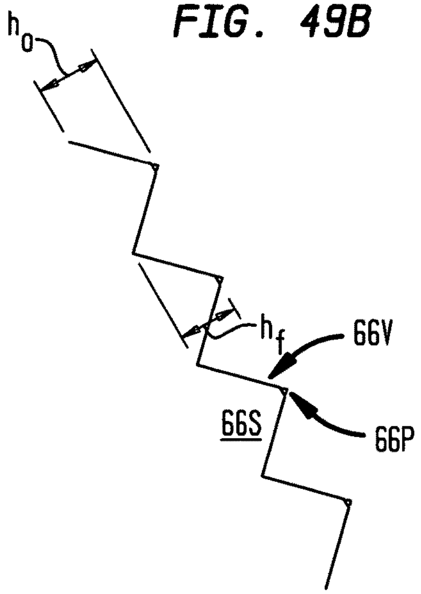
Figure 49C:
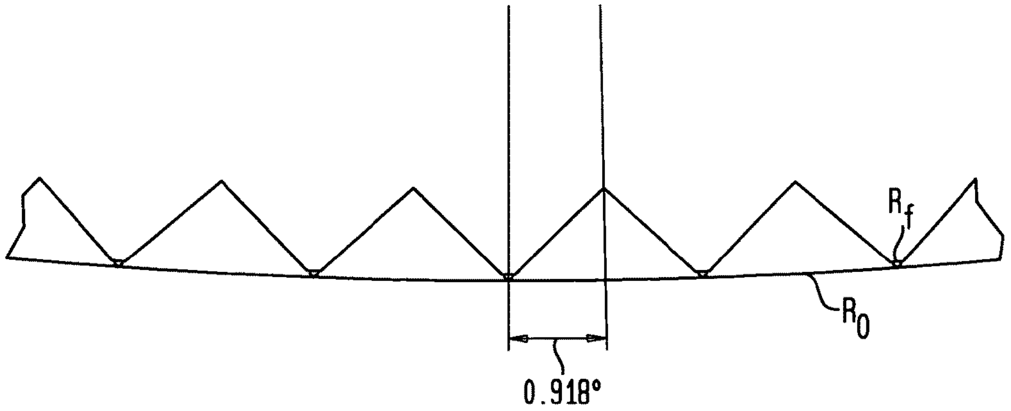

It is strongly preferred that ply bonding is accomplished through mechanical means involving glassining and/or fiber entanglement procedures limited to very small areas of the tissue as we have found that the greatest softnesses have been achieved thereby. In one alternative embodiment, the plies may be adhered using an adhesive either alone or in conjunction with an embossing or spot glassining pattern, with the amount of adhesive being zealously limited to avoid undue decreases in the softness of the resulting ply-bonded tissue. Suitable adhesives are well known and will be readily apparent to the skilled artisan. According to this embodiment, the two plies are embossed with adhesive being applied only to the tips of widely separated raised bosses of the embossed plies, preferably to the tips of stitchlike emboss elements 170 (as shown in FIG. 27), which tips are ultimately located between the plies of the product. As disclosed in US Published Patent Application 2005/0045267, Muvundamina, foamed adhesives can be especially advantageous as both the amount of water and the amount of adhesive solids applied can be greatly reduced. So-called "pinch perfing" as disclosed in Schulz, et al., Method and Apparatus For Pinch Perforating Multiply Web Material, U.S. Pat. No. 5,755,654, can make a considerable contribution to ply bonding especially when combined with spot glassining, embossing and spot/glassining fiber entanglement and/or glassining processes effecting ply-bonding principally through mechanical means. To a larger extent, ply-separation issues can be largely ameliorated if tail tabs 156 are formed at the tail of finished rolls 154 of the present invention (as shown in FIG. 40) according to the procedures described in Redmann, et al.; Reduced Ply Separation Tail Seal, WO 2005/089342, as well as US 2005/0199759; US 2005/0199761; US 2007/0095461 and US 2008/0053598 all of which are incorporated herein by reference. By controlling adhesive penetration, bond strength and bond location (both radially and in relation to the perf lines in the roll), particularly by ensuring that both the distal and proximal ends of the initial sheet are secured to the body of the roll, either by applying a single band of adhesive overlapping the distal end of the initial sheet or by spacing out the adhesive tail seal bonds over several separated regions encompassing the distal end of the initial sheet in the roll to form a folded over tail tab, the tendency for the leading plies to become undesirably separated can be largely overcome. In view of the even greater possibilities for mishaps with 3-ply products, use of this technology is very highly desirable for those products to ensure that the initial sheets taken off of the roll comprise exactly three plies. Once this is accomplished, the likelihood of problems with ply separation is considerably reduced.

Embossing and calendaring of the webs is preferably controlled such that the ensemble of plies combines to form a three-ply web having a specific caliper of the three-ply web of at least about 3.5 mils/8 sheets/lb of basis weight, more preferably from at least about 4 mils/8 sheets/lb of basis weight, still more preferably from about 4.25 to about 5.5 mils/8 sheets/lb of basis weight and most preferably from about 4.5 to about 5 mils/8 sheets/lb of basis weight. There is little reason to avoid calendering the interior plies of the product if that is otherwise convenient in the manufacturing control scheme employed in the manufacturing location in which the basesheets are produced, for example if the same grade of basesheet is used to make both the interior ply of the present product and an exterior ply of another, mill management might well prefer to avoid having to inventory calendered and uncalendered parent rolls of the same base sheet.

Description of Ply Bond Strength Measurement

Ply bond strengths reported herein are determined from the average load required to separate the plies of two-ply tissue, towel, napkin, and facial finished products using TMI Ply Bond Lab Master Slip & Friction tester Model 32-90, with high-sensitivity load measuring option and custom planar top without elevator available from: Testing Machines Inc. 2910 Expressway Drive South Islandia, N.Y. 11722; (800)-678-3221; www.testingmachines.com. Ply Bond clamps are available from: Research Dimensions, 1720 Oakridge Road, Neenah, Wis. 54956, Contact: Glen Winkler, Phone: 920-722-2289 and Fax: 920-725-6874.

Samples are preconditioned according to TAPPI standards and handled only by the edges and corners care being exercised to minimize touching the area of the sample to be tested.

At least ten sheets following the tail seal are discarded. Four samples are cut from the roll thereafter, each having a length equivalent to 2 sheets but the cuts are made ¼" away from the perf lines by making a first CD cut ¼" before a first perforation and a second CD cut ¼" before the third perforation so that the second perforation remains roughly centered in the sheet. The plies of the each specimen are initially separated in the leading edge area before the first perforation continuing to approximately 2" past this perforation.

The sample is positioned so that the interior ply faces upwardly, the separated portion of the ply is folded back to a location ½" from the initial cut and ¼" from the first perforation, and creased there. The folded back portion of the top ply is secured in one clamp so that the line contact of the top grip is on the perforation; and the clamp is placed back onto the load cell. The exterior ply of the samples is secured to the platform, aligning the perforation with the line contact of the grip and centering it with the clamp edges.

After ensuring that the sample is aligned with the clamps and perforations, the load-measuring arm is slowly moved to the left at a speed of 25.4 cm/min, the average load on the arm (in g.) is measured and recorded. The average of 3 samples is recorded with the fourth sample being reserved for use in case of damage to one of the first three.

Fiber

In almost all cases, it can be economically advantageous to use a slightly coarser furnish in the intermediate ply or plies. In particular, the proportion of premium fibers, particularly eucalyptus and/or Northern hardwood, in the outer plies will advantageously be increased relative to the content in the intermediate ply while the softwood content of the intermediate ply or plies will exceed that of the exterior plies. In general, we prefer that the coarseness to length ratio of the interior ply in terms of weight average $C/L_Z$ exceeds that of the exterior plies by at least about 0.2.

Fiber Coarseness and Length

TAPPI 401 OM-88 (Revised 1988) provides a procedure for the identification of the types of fibers present in a sample of paper or paperboard and an estimate of their quantity. Fiber length and coarseness can be measured using the model LDA96 Fiber Quality Analyzer, available from OpTest Equipment Inc. of Hawkesbury, Ontario, Canada. These parameters can be determined using the procedure outlined in the instrument's operating manual. In general, determination of these values involves first accurately weighing a pulp sample (10-20 mg for hardwood, 25-50 mg for softwood)

taken from a one-gram handsheet made from the pulp. The moisture content of the handsheet should be accurately known so that the actual amount of fiber in the sample is known. This weighed sample is then diluted to a known consistency (between about 2 and about 10 mg/l) and a known volume (usually 200 ml) of the diluted pulp is sampled. This 200 ml sample is further diluted to 600 ml and placed in the analyzer. The final consistency of pulp slurry that is used to measure coarseness is generally between about 0.67 and about 3.33 mg/liter. The weight of pulp in this sample may be calculated from the sample volume and the original weight and moisture content of the pulp that was sampled from the handsheet. This weight is entered into the analyzer and the coarseness test is run according to the operating manual's instructions.

Coarseness values are usually reported in mg/100 meters. Fiber lengths are reported in millimeters. For instruments of this type, three average fiber length measurements are usually reported. These measurements are often referred to as the number-weighted or arithmetic average fiber length ($l_n$), the length-weighted fiber length ($l_w$) and the weight-weighted fiber length ($l_z$). The arithmetic average length is the sum of the product of the number of fibers measured and the length of the fiber divided by the sum of the number of fibers measured. The length-weighted average fiber length is defined as the sum of the product of the number of fibers measured and the length of each fiber squared divided by the sum of the product of the number of fibers measured and the length of the fiber. The weight-weighted average fiber length is defined as the sum of the product of the number of fibers measured and the length of the fiber cubed divided by the sum of the product of the number of fibers and the length of the fiber squared. Unless otherwise specified, weight-weighted fiber length is used in this specifications and claims describing the fiber lengths of the current invention.

Caliper Measurement

In this category, both actual and perceived caliper are thought to be especially important to consumers. As discussed previously, the tissue of the present invention will have a caliper of at least about 4 mils per pound of basis weight per 8 sheets. It is preferred that this be accompanied by an opacity in excess of about 72.

The caliper of the tissue of the present invention may be measured using the Model II Electronic Thickness Tester available from the Thwing-Albert Instrument Company of Philadelphia, Pa. The caliper is measured on a sample consisting of a stack of eight sheets of tissue using a two-inch diameter anvil at a 539±10 gram dead weight load.

Opacity

The opacity of tissues of the present invention can be measured using a GretagMacbeth™ Color-Eye® 3100 spectrophotometer, available from:

GretagMacbeth™
For Service: 800-622-2384 ext. 279
M C Scientific Corp.
806 Gray Street
St. Charles, Ill. 60174
630-377-1008
630-377-5964 (FAX)

utilizing an integrating sphere to provide diffuse illumination and 8° observation geometry (d/8) so that specimen surface structure has a negligible effect on test results.

Dry Tensile Strength, Modulus and Tensile Stiffness

All dry tensile properties reported herein including dry tensile strengths (the force per unit width required to break a specimen), percent stretch (the percentage elongation at break), and modulus (peak load divided by stretch at peak load) are measured using constant rate of elongation equipment (Instron Model 4000: Series IX) equipped with a 20 pound load cell with heavyweight grip; 3-in wide jaw line contact grips (pneumatic preferred) with the crosshead speed set to 2.0 in. (50.8 mm) per minute and the jaw span set at 3.0 in. (76.2 mm) using specimens cut exactly 3.0 in. (76.2 mm) wide and long enough to be clamped in the grips when they are 3.0 in. apart.

The tensile stiffness of a tissue product is the geometric mean of the values obtained by measuring the tensile stiffness in machine and cross-machine directions.

After standard TAPPI conditioning, the specimen(s) are aligned and clamped in the upper grip. After any noticeable slack is carefully removed, the lower end of the specimen is clamped in the lower grip, making sure the specimen is exactly parallel with direction of travel.

After each test, the tensile and stretch readings are recorded.

The modulus (in each direction, MD and CD) is calculated as:

$$\text{Modulus} = \frac{\text{Peak Load}}{\text{Stretch at Peak Load}}$$

And the GM modulus is:

$$GM = \frac{GM_1 + GM_2}{2}$$

where $$GM_1 = \sqrt{MD_1 \cdot CD_1}$$

and $$GM_2 = \sqrt{MD_2 \cdot CD_2}$$

The results are reported in units of "grams per 3-inch"; a more complete rendering of the units would be "grams per 3-inch by 3-inch strip." The geometric mean tensile of the present invention, when normalized for basis weight, will preferably be between about 21 and about 35 grams per 3 inches per pound per ream. The ratio of MD to CD tensile is also important and is preferably between about 1.25 and about 3, more preferably between about 1.5 and about 2.5. The specific tensile stiffness of the web is preferably less than about 2.0 g/inch/% strain per pound of basis weight and more preferably less than about 1.0 g/inch/% strain per pound of basis weight, most preferably less than about 0.75 g/inch/% strain per pound of basis weight.

Throughout this specification and claims, by basis weight, we mean basis weight in pounds per 3000 square ft. ream of the web. Many of the values provided throughout the specification have been normalized based on the weight of tissue in a 3000 sq ft ream. Where a quantity is expressed in units of "per pound of basis weight", "per pound of tissue", "per pound" or the like, such quantity should be understood as being normalized based on the weight of tissue in a 3000 sq ft ream.

Wet Tensile Strength

CD wet tensile strengths of tissue base sheet and finished product reported herein are generated by the following method using a constant-rate-of-elongation tensile tester equipped with: a 2.0 pound load cell; 3 inch wide line-contact grips; a 3-in Finch cup testing fixture equipped with a base to fit a 3-in. grip. Suitable Finch cup testing fixtures are available from:

High-Tech Manufacturing Services, Inc.
31 05-8 NE 65th Street
Vancouver, Wash. 98663
360-696-1611
360-696-9887 (FAX)
Part number: HT1563.

If not pre-marked by the manufacturer, each Finch cup fixture should be provided with a line marked 9/32 inch from the top lip of the cup. Finch cup fixtures are also supplied by Thwing-Albert Instrument Company of Philadelphia, Pa.

The 3-in. wide standard line contact grips are adjusted to ensure that the grips are 4.55 inches apart and the Finch cup fixture installed such that the distance from the center of the upper line contact to the bottom of the Finch Tester bar is exactly 1.75 inches Specimens are cut 3.0-in wide by at least 4.5-in. long with the width of the specimens and condition of the cut edges being carefully controlled to ensure that the specimens are cut cleanly. In the case of specimens for testing of CD wet tensile, care is observed that the specimens are with the long axis exactly parallel to the CD direction.

For fresh base sheet and finished product (aged 30 days or less for towel product; aged 24 hours or less for tissue product) containing wet strength additive, the test specimens are subjected to simulated aging by being placed in a forced air oven at 105° C.±3° C. (221° F.±5° F.) for 5 minutes such that each sample is individually heated then cooled at ambient for 5 minutes before testing. No oven aging is needed for other samples. After cutting and aging (if called for), the specimens are ready for testing.

The crosshead speed on the tensile tester is set to 2.0 in. (50.8 mm) per minute and the Finch cup filled to the line marked 9/32 inch from the top of the cup with Standard Water Solution (supplied adjusted to a pH of 7.0+0.1), NC9664470, at 23° C. (73° F.), available from: Fisher Scientific Company 800-772-6733.

A loop is formed by squarely doubling the 3-in. specimen in half, in the long direction, care being taken not to crease, stretch, stress or damage the specimen. The looped end of the specimen is slipped around the bar on the Finch tester assembly; the loose ends of the specimen fitted in the upper grips (light weight pneumatic grips equipped with 3.0-in.×1.0-in. rubber coated facing and 3.0-in. line contact) and aligned with care being taken not damage to the specimen and the specimen aligned so it is straight, leaving a little slack under the bar of the Finch cup to be certain that the specimen is not stretched.

The Finch cup is smoothly raised into its uppermost position, care being taken so the solution does not splash. Five seconds after the cup is in position; the tensile tester is started with the cup section remaining in position while the test is running.

For generation of product wet strength degradation curves, testing is repeated using timer settings of 1 minute, 2 minutes, and 5 minutes, or until the tensile strength drops below 39 grams. In each case, one-half the peak load is recorded as the wet tensile strength. The water solution in the cup is changed after six sets of samples have been tested to prevent build-up of chemicals that may leach out of the product during testing The average CD wet tensile strength is reported to the nearest 0.1 gram.

For temporary wet strength grades, the wet tensile of the present invention will be at least about 1.5 grams per three inches per pound per ream in the cross direction as measured using the Finch Cup, more preferably at least about 2 and most preferably at least about 2.5. Normally, only the cross direction wet tensile is tested, as the strength in this direction is normally lower than that of the machine direction and the tissue is more likely to fail in use in the cross-machine direction.

For bath tissue, it is important that, if the product has wet strength, the wet strength is of a temporary nature, so that the tissue will disintegrate fairly quickly after use without posing a clogging problem for the toilet or its associated plumbing. Insuring that a product's wet strength is temporary can be accomplished by the same wet tensile test described above with the soak time increased from five seconds to a longer time period. By comparing the sheet's initial wet tensile strength (5 second soak) to that obtained after longer soak times, the percent wet tensile remaining can be calculated. The wet strength of a product can be considered to be temporary as long as the tissue's initial wet strength (measured in the cross-machine direction) decays to less than about 20 g/3" after a soak time of 10 minutes.

Bulk

The bulk density of a tissue product is determined by immersing a sample of the product in a nonswelling liquid and measuring the amount of liquid absorbed by the sample. Care should be taken to insure that the sample to be tested has been subjected to minimal handling. To measure bulk density, a one-inch by one-inch sample of the tissue is cut and weighed to 0.0001 gram. Using self-holding tweezers to grasp the tissue specimen at a corner, the sample is then completely immersed in Porofil 3 Wetting Liquid which can be obtained from Coulter Electronics of Hialeah, Fla. The sample is immersed for ten seconds. Then, using tweezers, the sample is removed from the liquid and allowed to drain for thirty seconds while being held suspended. Care should be taken not to shake the sample during draining. After the tissue specimen has been drained, one of its corners is lightly touched to blotter paper to remove any excess liquid. The specimen is then transferred to a balance and the sample's wet weight is obtained to the nearest 0.0001 gram. The bulk density is expressed in % weight gain and is obtained using the formula:

$$\text{Bulk Density (\%)}=[(\text{Wet weight}-\text{Dry weight})/\text{Dry Weight}]*100$$

Bulk Density has been found to positively correlate with several important tissue attributes; consequently, higher bulk density values are preferred. It is important to note that, somewhat paradoxically, higher numerical values of bulk density measured in this way correspond to fluffier sheets.

Softness

Softness is a quality that does not lend itself to easy quantification. J. D. Bates, in "Softness Index: Fact or Mirage?" TAPPI, Vol. 48 (1965), No. 4, pp. 63A-64A, indicates that the two most important readily quantifiable properties for predicting perceived softness are (a) roughness and (b) what may be referred to as stiffness modulus. Tissue produced according to the present invention has a more pleasing texture (relative to control samples) as measured by reduced values of either or both roughness and stiffness modulus or the sidedness parameter which is derived from the relative roughness of the two exposed sides of the tissue sheet. Surface roughness can be evaluated by measuring average deviation in the average friction (GM MMD) using a Kawabata KES-SE Friction Tester equipped with a fingerprint-type sensing unit using the low sensitivity range. A 50 g stylus weight is used, and the instrument readout is divided by 20 to obtain the mean deviation. The geometric mean deviation in the average surface friction is then the square root of the product of the average or mean deviation in the machine direction and the cross-machine direction.

Surface friction can be evaluated by measuring average deviation in the average friction (GMMMD) using a Kawabata KES-SE Friction Tester equipped with a fingerprint-type sensing unit using the low sensitivity range. A 50 g stylus weight is used, and the instrument readout is divided by 20 to obtain the mean deviation. The geometric mean deviation in the average surface friction is then the square root of the product of the average or mean deviation in the machine direction and the cross-machine direction.

Surface roughness can also be evaluated according to the TMI method, which is used herein. The TMI method is preferred when evaluating surface friction and sidedness values. Although the above procedure is described in the context of the Kawabata equipment, the friction values noted herein are expressed in TMI units. Friction values can be roughly converted between Kawabata and TMI units although we have found that results from the Kawabata instruments seem to be considerably less reproducible and, in our opinion, far less useful in predicting perceived softness. Although we find that there is a very significant amount of scatter between Kawabata results and TMI results, the following equation may be used for approximate conversion between Kawabata friction units and TMI friction units:

$$\text{TMI friction}=6.1642\ (\text{Kawabata Friction})-0.65194.$$

Geometric Mean Tissue Friction and Sidedness

Sidedness and friction deviation measurements for the practice of the present invention can be accomplished using a Lab Master Slip & Friction tester described above available from:

Testing Machines Inc.
2910 Expressway Drive South
Islandia, N.Y. 11722
800-678-3221
www.testingmachines.com adapted to accept a Friction Sensor, available from:

Noriyuki Uezumi
Kato Tech Co., Ltd.
Kyoto Branch Office
Nihon-Seimei-Kyoto-Santetsu Bldg. 3F
Higashishiokoji-Agaru, Nishinotoin-Dori
Shimogyo-ku, Kyoto 600-8216
Japan
81-75-361-6360
katotech@mx1.alpha-web.ne.jp The software for the Lab Master Slip and Friction tester is modified to allow it to: (1) retrieve and directly record instantaneous data on the force exerted on the friction sensor as it moves across the samples; (2) compute an average for that data; (3) calculate the deviation—absolute value of the difference between each of the instantaneous data points and the calculated mean; and (4) calculate a mean deviation over the scan to be reported in grams.

Prior to testing, the test samples should be conditioned in an atmosphere of 23.00°±1° C. (73.4°±1.80° F.) and 50%±2% R.H. Testing should also be conducted at these conditions. The samples should be handled by edges and corners only and any touching of the area of the sample to be tested should be minimized as the samples are delicate, and physical properties may be easily changed by rough handling or transfer of oils from the hands of the tester.

The samples to be tested are cut using a paper cutter to get straight edges, any sheets with obvious imperfections being removed and replaced with acceptable sheets. The sheets should be maintained, where applicable, in consecutive order.

Sample Preparation—Finished Multi-Ply Product:

Four consecutive sheets are cut from the sample roll using a guillotine or pivoting blade paper cutter, the machine direction being indicated by drawing an arrow in a corner of each sheet, the first sheet being labeled as "MDT", the second as "CDT", the third as "MDB" and the fourth as "CDB". Note that as tissue is removed from a roll, the "top" side of a sample is always on the outside of the roll.

Sample Preparation—Plies of Precursor (After Embossing, If Any, and Prior to Ply-Bonding):

Pull approximately 20 inches of the ply. Cut a total of four 4.5-in×4.5-in. squares using a paper cutter from the sample as indicated above. Indicate the machine direction as above. Label each square with the testing direction and side. (Square #1 should be labeled MDT for two scans in the cross machine direction on the topside, Square #2 should be labeled CDT, Square #3—MDB and Square #4—CDB). The area to be tested should be free of folds or creases. Repeat this procedure for the other ply. Where it is inconvenient to obtain the plies before the ply-bonding process, it is generally acceptable to obtain the plies by separating the plies of the finished multi-ply product as the effect of the ply-bonding and rewinding procedure is fairly subtle.

Scanning Procedure:

Each specimen is placed on the sample table of the tester and the edges of the specimen are aligned with the front edge of the sample table and the chucking device. A metal frame is placed on top of the specimen in the center of the sample table while ensuring that the specimen is flat beneath the frame by gently smoothing the outside edges of the sheet. The sensor is placed carefully on the specimen with the sensor arm in the middle of the sensor holder.

To compute GMMMD of the finished products, two scans of the sensor head are run on the MD topside of the first sheet, where The Average Deviation value from the first MD scan of the topside of sheet MDT is recorded as $MD_{TS1}$, the result obtained on the second scan on the top side of sheet MDT is recorded as $MD_{TS2}$; $CD_{TS3}$ and $CD_{TS4}$ are the results of the scans run on the CD top side of the sheet $CD_T$, $MD_{BS5}$ and $MD_{BS6}$ are the results of the scans on the bottom sides of sheet $MD_B$; and $CD_{BS7}$ and $CD_{BS8}$ are the results of the scans on the bottom sides of sheet $CD_B$. As used in this specification and claims, the terms "friction" and "friction deviation" and "GMMMD" and "geometric mean deviation in the mean coefficient of friction" should be considered synonymous unless indicated to the contrary.

To compute the GMMMD of the individual plies, scans of the sensor head are similarly run over the specimens, two in the MD on the topside of one specimen, two in the CD on the topside of a second specimen followed by another two in the MD on the bottom of the first specimen and two in the CD on the topside of the second specimen with the Average Deviation value from the specimen window being recorded as above. The second scan is run in the same direction over the same path as the first by returning the stylus to its starting point after the first.

The TMI sidedness of a tissue sample may be computed using the procedure set forth in Soft Bulky Multi-Ply Product, U.S. Pat. No. 6,827,819, Dwiggins, et al., issued Dec. 7, 2004, and Soft Bulky Multi-Ply Product And Method Of Making The Same, U.S. Pat. No. 6,896,768, Dwiggins, et al,. issued May 24, 2005, incorporated herein by reference.

For most creped products, the air side friction deviation will be higher than the friction deviation of the Yankee side. Sidedness takes into account not only the relative difference between the two sides of the sheet but the overall friction level. Accordingly, low sidedness values are normally preferred.

Formation

Formation of tissues of the present invention, as represented by Kajaani Formation Index Number, should be at least about 54, preferably about 60, more preferably at least about 62, as determined by measurement of transmitted light intensity variations over the area of a single sheet of the tissue product using a Kajaani Paperlab 1 Formation Analyzer which compares the transmitivity of about 250,000 subregions of the sheet. The Kajaani Formation Index Number, which varies between about 20 and 122, is widely used through the paper industry and is for practical purposes identical to the Robotest Number which is simply an older term for the same measurement.

Temporary Wet Strength Agents

The pulp can be mixed with temporary wet strength-adjusting agents. The pulp preferably contains up to about 10 lbs/ton of one or more strength adjusting agents, more preferably up to about 5 lbs/ton, still more preferably about 2 to about 3 lbs. Suitable wet strength agents have an organic moiety and suitably include water soluble aliphatic dialdehydes or commercially available water soluble organic polymers including aldehydic units, and cationic starches containing aldehyde moieties. These agents may be used singly or in combination with each other.

Suitable temporary wet strength agents are aliphatic and aromatic aldehydes including glyoxal, malonic dialdehyde, succinic dialdehyde, glutaraldehyde, dialdehyde starches, polymeric reaction products of monomers or polymers having aldehyde groups and optionally nitrogen groups. Representative nitrogen containing polymers which can suitably be reacted with the aldehyde containing monomers or polymers include vinyl-amides, acrylamides and related nitrogen containing polymers. These polymers impart a positive charge to the aldehyde containing reaction product.

We have found that condensates prepared from dialdehydes such as glyoxal or cyclic urea and polyols, both containing aldehyde moieties are useful for producing temporary wet strength. Since these condensates do not have a charge, they are added to the web before or after the pressing roll or charged directly on the Yankee surface. Preferably these temporary wet strength agents are sprayed on the air side of the web prior to drying on the Yankee.

Polysaccharide aldehyde derivatives are suitable for use in the manufacture of tissue according to the present invention. The polysaccharide aldehydes are disclosed in U.S. Pat. Nos. 4,983,748 and 4,675,394. These patents are incorporated by reference in their entirety into this application. A starch of this type can also be used without other aldehyde moieties but, in general, should be used in combination with a cationic softener.

The temporary wet strength resin may be any one of a variety of water soluble organic polymers comprising aldehydic units and cationic units used to increase the dry and wet tensile strength of a paper product. Such resins are described in U.S. Pat. Nos.: 4,675,394; 5,240,562; 5,138,002; 5,085,736; 4,981,557; 5,008,344; 4,603,176; 4,983,748; 4,866,151; 4,804,769; and 5,217,576, each of which is incorporated herein by reference in its entirety. Prior to use and depending upon the particular formulation chosen, the cationic aldehydic water soluble polymer is prepared by preheating an aqueous slurry of approximately 5% solids maintained at a temperature of up to approximately 240° F. and a pH of about 2.7 for approximately 3.5 minutes. Finally, the slurry is quenched and diluted by adding water to produce a mixture of approximately 1% solids at less than about 130° F.

Desirably a commercially available temporary wet strength resin including an aldehydic group on cationic corn waxy hybrid starch may be used. Other temporary wet strength resins are available. These starches are supplied as aqueous colloidal dispersions and do not require preheating prior to use. In addition, other commercially available temporary wet strength agents can be used, as well as those disclosed in U.S. Pat. No. 4,605,702.

Typical temporary strength adjusting agents are well known to the skilled artisan and the method and amounts for their effective use are also understood by the skilled artisan. Preferred temporary wet strength agents which may be used in the present invention include, but are not limited to, glyoxylated polyacrylamide, glyoxal and modified starches.

The use of small amounts of temporary wet strength agents can be especially beneficial in achieving desired levels of softness, making it possible to achieve the minimum wet strength required to avoid undesirable levels of pilling, shredding or shedding in use without unduly increasing dry strength and/or tensile modulus of the sheet.

Softeners and Debonders

In certain applications, addition of at least about 1 lb. per 3000 square foot ream of a cationic nitrogenous debonder in each ply of the multi-ply product is preferred. In certain applications, a temporary wet strength agent in an amount sufficient to bring the wet/dry ratio into the range of from at least about 10 to about 15 percent is preferably added. The resulting finished product preferably has a machine direction tensile strength of from about 21 to about 35 grams/3" width per pound of basis weight and a caliper of at least about 3 mils per 8 plies per pound of basis weight.

In many cases, particularly when a stratified machine is used, starches and debonders can be advantageously used simultaneously. In other cases, starches, debonders or mixtures thereof may be supplied to the wet end while softeners and/or debonders may be applied by spraying.

Suitable softeners and debonders, however, will be readily apparent to the skilled artisan. Suitable softeners and debonders are widely described in the patent literature. A comprehensive but non-exhaustive list includes U.S. Pat. Nos. 4,795,530; 5,225,047; 5,399,241; 3,844,880; 3,554,863; 3,554,862; 4,795,530; 4,720,383; 5,223,096; 5,262,007; 5,312,522; 5,354,425; 5,145,737; and EPA 0 675 225, each of which is specifically incorporated herein by reference in its entirety.

These softeners are suitably nitrogen containing organic compounds preferably cationic nitrogenous softeners and may be selected from trivalent and tetravalent cationic organic nitrogen compounds incorporating long fatty acid chains; compounds including imidazolines, amino acid salts, linear amine amides, tetravalent or quaternary ammonium salts, or mixtures of the foregoing. Other suitable softeners include the amphoteric softeners which may consist of mixtures of such compounds as lecithin, polyethylene glycol (PEG), castor oil, and lanolin.

The present invention may be used with a particular class of softener materials—amido amine salts derived from partially acid neutralized amines. Such materials are disclosed in U.S. Pat. No. 4,720,383, column 3, lines 40-41.

The softener having a charge, usually cationic, can be supplied to the furnish prior to web formation, applied directly onto the partially dewatered web or may be applied by both methods in combination. Alternatively, the softener may be applied to the completely dried, creped sheet, either on the paper machine or during the converting process. Softeners having no charge are applied at the dry end of the paper making process.

The softener employed for treatment of the furnish is provided at a treatment level that is sufficient to impart a perceptible degree of softness to the paper product but less than an amount that would cause significant runnability and sheet strength problems in the final commercial product. The amount of softener employed, on a 100% active basis, is usually up to about 10 pounds per ton of furnish; preferably from about 0.5 to about 7 pounds per ton of furnish, although far higher amounts can be used.

Imidazoline-based softeners that are added to the furnish prior to its formation into a web have been found to be particularly effective in producing soft tissue products and constitute a preferred embodiment of this invention. Of particular utility for producing the soft tissue product of this invention are the cold-water dispersible imidazolines. These imidazolines are mixed with alcohols or diols, which render the usually insoluble imidazolines water dispersible.

Treatment of the partially dewatered web with the softener can be accomplished in various ways. For instance, the treatment step can constitute spraying, applying with a direct contact applicator, or by employing an applicator felt. It is often preferred to supply the softener to the air side of the web so as to avoid chemical contamination of the paper making process. It has been found in practice that even a small amount of an aqueous softener dispersion applied to the web from either side penetrates the entire web and uniformly treats it.

Analysis of the amount of the softener/debonder chemicals retained on the tissue paper can be performed by any method accepted in the applicable art. For the most sensitive cases, we prefer to use x-ray photoelectron spectroscopy ESCA to measure nitrogen content, the amounts in a certain location within the tissue sheet being measurable by using the tape pull procedure described above combined with ESCA analysis of each "split." Normally the background level is quite high and the variation between measurements quite high, so use of several replicates in a relatively modern ESCA system such as at the Perkin Elmer Corporation's model 5,600 is required to obtain more precise measurements. The level of cationic nitrogenous softener/debonder such as Quasoft® 202-JR can alternatively be determined by solvent extraction of the softener/debonder by an organic solvent followed by liquid chromatography determination of the softener/debonder. TAPPI 419 OM-85 provides the qualitative and quantitative methods for measuring total starch content. However, this procedure does not provide for the determination of starches that are cationic, substituted, grafted, or combined with resins. These types of starches can be determined by high pressure liquid chromatography. (TAPPI, Journal Vol. 76, Number 3.)

Specific Preferred Embodiments and Exemplifications of the Present Invention

Base sheets in a 3-ply format (2 plies embossed/unembossed backing ply) were produced on a commercial scale conventional wet press paper machine with a single layer headbox. 3-ply prototypes were converted on a rewinder to form rolls of 198 sheets per roll. A 99 ct. 3-ply prototype was also produced. Table 1 shows the base sheets produced during this trial. Table 2 shows the finished products made from these base sheets.

TABLE 1

Base Sheets

| Base Sheet Number | Base Sheet Basis Weight | Base Sheet Caliper | Calender Middle Ply |
|---|---|---|---|
| O-10 | 10.8 | 38 | yes |
| O-12 | 11.5 | 40 | yes |

TABLE 2

Finished Products

| Finished Product Number | Base Sheets Combined | Finished Product Description (198 ct. unless noted otherwise) | Finished Product Basis Weight (lbs/ream) | Minimum MD/CD Tensiles (g/3") | Finished Product Target Embossed Caliper in mils/8 Plies |
|---|---|---|---|---|---|
| O-10.1 | O-10, O-10, O-10 | 3-ply light weight | 31.0 | 750/300 | 150 to 160 |
| O-12.1 | O-12, O-12, O-12 | 3-ply higher weight | 33.0 | 750/300 | 150 to 160 |

Base Sheet

Tables 3 and 4 show the operating conditions for making base sheets O-10 and O-11 at 10.8 lb/R and basesheets O-12 and O-13 at 11.5 lb/R wherein the softwood to hardwood ratio were adjusted to achieve the tensile target.

TABLE 3

Paper Machine Operating Conditions for 10.8 #/R (After Rewinder) Basesheets

| | Paper Machine Parameter | O-10 10.8 #/ream |
|---|---|---|
| Furnish | Total Furnish | 45% Eucalyptus, 23% SWK, 17% NHWK 15% Machine Broke |
| Softening | Spray Softener: type and amount in cc/min | Hercules TQ236, 50 cc/min |
| Strength/ Chemical | FJ 45 TWSR, lb/ton | (1.6 lb/ton) |
| Creping | Reel Moisture % | 2.5-3.0% |
| | Reel Crepe % (Yankee speed-reel speed)/Yankee speed | 25% |
| | Crepe Blade bevel and blade type | 10° Ceramic |
| | Crepe Blade holder angle | 15° |
| | Crepe Pocket in degrees | 85° |
| | Yankee Modifier/release type in cc/min | Hercules 1145† |
| | Yankee Modifier/release type in cc/min | Hercules 6601‡ 90 cc/min |
| Calendering | Base Sheet Uncalendered caliper in mils/8 plies | 51 |
| | Base Sheet Calendered Caliper in mils/8 plies | 41 |
| | Percent Caliper Reduction in Calendering | 20% |

TABLE 3-continued

| Paper Machine Operating Conditions for 10.8 #/R (After Rewinder) Basesheets | | |
|---|---|---|
| | Paper Machine Parameter | O-10 10.8 #/ream |
| Physicals | Basis Weight (lbs/rm) | 11.0 |
| | Caliper (mils/8 sht) | 41 |
| | MD Tensile (g/3") | 530 |
| | CD Tensile (g/3") | 210 |
| | Tensile Ratio (MD/CD) | 2.52 |
| | MD Stretch (%) | 32 |
| | CD Wet (g/3") | 26 |

TABLE 4

| Paper Machine Operating Conditions for 11.5 #/R (After Rewinder) Basesheets | | |
|---|---|---|
| | Paper Machine Parameter | O-12 11.5 #/ream Calendered |
| Furnish | Total Furnish | 45% Eucalyptus, 23% SWK, 17% NHWK 15% Machine Broke |
| Strength/ Chemical | Spray Softener: type and amount in cc/min | Hercules TQ236, 50 cc/min |
| Softening | FJ-45 TWSR, lb/ton | 1.6 |
| Creping | Reel Moisture % | 2.5-3.0% |
| | Reel Crepe % (Yankee speed-reel speed)/ Yankee speed | 25% |
| | Crepe Blade bevel and blade type | 10° Ceramic |
| | Crepe Blade holder angle | 15° |
| | Crepe Pocket in degrees | 85° |
| | Yankee Adhesive Type in cc/min | Hercules 1145, Started at 300 cc/min. Adjust to achieve effective creping |
| | Yankee Modifier/release type in cc/min | Hercules 6601, 90 cc/min |

TABLE 4-continued

| Paper Machine Operating Conditions for 11.5 #/R (After Rewinder) Basesheets | | |
|---|---|---|
| | Paper Machine Parameter | O-12 11.5 #/ream Calendered |
| Calender | Base Sheet Uncalendered caliper in mils/8 plies | 54 |
| | Base Sheet Calendered Caliper in mils/8 plies | 43 |
| | Percent Caliper Reduction in Calendering | 20% |
| Physicals | Basis Weight (lbs/rm) | 11.7 |
| | Caliper (mils/8 sht) | 43 |
| | MD Tensile (g/3") | 530 |
| | CD Wet (g/3") | 26 |

Converting

Table 5 shows the finished product cells made and the tensile and caliper targets. Emboss penetration was increased until target caliper is reached.

1. The initial embossing nip width was set at 1⅞ inch, with nip impression being taken to ensure emboss level was the same on the drive and operator sides.
2. Draws were held to less than 3%, usually to less than 2% between the unwind stands and the rewinder.
3. The bellows over the spot glassining wheels were adjusted to a pressure 30 psig.
4. Emboss level and Feed Roll Gap were adjusted to hit desired caliper, MD and CD tensile, roll structure, emboss definition and product softness.

Table 5 below sets forth the physical properties and sensory softness of the converted tissue as compared to present commercially available tissue products. It is considered particularly significant that the products exhibited superior opacity combined with high softness and caliper in view of the fact that the basesheets were produced on CWP assets. Surprisingly, when tested in a home use test by consumers, the O-10.1 product achieved parity ratings with the ChU-200 and slightly surpassed all other TAD and UCTAD products in terms of overall acceptance by consumers.

TABLE 5

Physical Properties and Softness Comparison

| Attribute | ChUB (TAD) | CoDR (UCTAD) | ChU-200 (TAD) | QNUDR (CWP) | QNUGR (CWP) | ChUGR (TAD) | ChUMR (TAD) | O-10.1 | O-12.1 | Heavy weight 2 ply |
|---|---|---|---|---|---|---|---|---|---|---|
| Count | 200 | 200 | 200 | 220 | 253 | 250 | 400 | 198 | 198 | 209 |
| BW | 30.5 | 27.5 | 30.8 | 28.9 | 29.0 | 30.3 | 29.4 | 31.9 | 34.1 | 32.4 |
| Cal (mils/8 sh) | 141 | 153.3 | 160.4 | 115.5 | 113.9 | 135.9 | 120.5 | 143.5 | 148 | 130.3 |
| GMT (g/3") | 590 | 762 | 633 | 535 | 563 | 667 | 629 | 579 | 715 | 537 |
| MD Stretch (%) | 20.7 | 11.7 | 20.9 | 19.3 | 23.1 | 21.0 | 17.6 | 18.5 | 22.3 | 21.6 |
| CD Stretch (%) | 9.3 | 13.4 | 9.5 | 6.4 | 6.1 | 9.2 | 9.0 | 6.6 | 6.7 | 5.5 |
| CD wet ten (g/3") | 74.1 | 51.1 | 78.8 | 35.0 | 35.5 | 82.3 | 84.5 | 44.3 | 54.7 | 36.0 |
| GM Break Mod | 43.3 | 61.0 | 45.2 | 49.0 | 48.2 | 48.5 | 50.4 | 52.9 | 59.0 | 49.8 |
| GMMMD | 0.480 | 0.723 | 0.542 | 0.563 | 0.541 | 0.488 | 0.445 | 0.590 | 0.643 | 0.574 |
| Opacity | 71.7 | 70.9 | 71.9 | 73.9 | 73.7 | 72.3 | 72.3 | 75.4 | 77.0 | 75.9 |
| Roll Ø (") | 4.75 | 4.89 | 4.91 | 4.64 | 4.87 | 4.95 | 5.64 | 4.85 | 4.83 | 4.82 |
| Roll comp (%) | 17.6 | 20.1 | 20.2 | 20.7 | 18.7 | 14.6 | 8.3 | 20.3 | 18.4 | 27.9 |
| Sensory Softness | 20.2 | 18.6 | 20.2 | 19.1 | 18.8 | 20.2 | 20.3 | 19.5 | 19.3 | 19.3 |

3-ply calendered and uncalendered base sheets were made with varying furnishes ranging from 100% local to 100% premium in content. These base sheets were converted into 3-ply prototypes at 198 ct. and 4.9 inch roll diameter.

Experimental Procedure: Paper Machine

Table 6 shows the trial base sheets that were made. Table 7 shows the base sheet target properties. Table 8 shows the general starting paper machine operating conditions and initial detailed setpoints.

TABLE 6

| Trial Base Sheets: | |
|---|---|
| Base sheet furnish | Base sheet Number/reels to make |
| 27% SSWK/73% eucalyptus | N8C (calendered) |
| 65% SHWK/35% SSWK | N9C (calendered) |
| 73% eucalyptus/27% NSWK | N10C (calendered) |

TABLE 7

| Base Sheet | | | |
|---|---|---|---|
| Attribute | N8C 73% Eucalyptus 27% SSWK | N9C 70% SHWK 30% SSWK | N10C 73% Eucalyptus 27% NSWK |
| Basis Weight (lbs/rm) | 11.4 | 11.4 | 11.4 |
| Caliper cal/uncal. (mils/8 sht) | 40 | 38 | 40 |
| MD Tensile (g/3") | 540 | 540 | 540 |
| CD Tensile (g/3") | 230 | 230 | 230 |
| Tensile Ratio (MD/CD) | 2.35 | 2.35 | 2.35 |
| MD Stretch (%) | 33 | 33 | 33 |
| CD Stretch (%) | 7.5 | 7.5 | 7.5 |
| CD Wet Tensile (g/3") | 25 ± 4 | 25 ± 4 | 25 ± 4 |

TABLE 8

| Tissue Paper Machine Centerlines | | | | |
|---|---|---|---|---|
| | Paper Machine Parameter | N8C | N9C | N10C |
| Furnish | Total furnish | 73% Cenibra eucalyptus/27% slush softwood | 70% slush hardwood/ 30% slush softwood | 73% Cenibra eucalyptus/ 27% northern softwood |
| | Wet end pH | 5.5 | 5.5 | 5.5-6.0 |
| Strength Control | Spray Softener: type and amount in cc/min | GP B100 Varisoft* 40 cc/min (1 lb/ton) | GP B100 Varisoft* 40 cc/min (1 lb/ton) | GP B100 Varisoft* 40 cc/min (1 lb/ton) |
| | FJ 45 Addition (lb/ton) | 300-350 cc/min | 300-350 cc/min | 300-350 cc/min |
| | Control of Dry Strength (debonder type and cc/min) | 0-100 cc/min Buckman 792† | 0-100 cc/min Buckman 792 | 0-100 cc/min Buckman 792 |
| | Reel Moisture % | 3.8-3.0% | 3.2% | 3.0-3.3% |
| | Reel Crepe % (Yankee speed-reel speed)/Yankee speed | 25-29% | Start at 23.5% | 25-29% |
| | Crepe Blade bevel and blade type | 10° Steel | 10° Steel | 10° Steel |
| Creping | Crepe Blade holder angle | 16° | 16° | 16° |
| | Crepe Pocket in degrees | 84° | 84° | 84° |
| | Yankee Adhesive type in cc/min | Buckman 2616‡ | Buckman 2616 | Buckman 2616 |
| | Yankee Modifier/release type in cc/min | Buckman 2091** | Buckman 2091 | Buckman 2091 |
| | Yankee Speed | 4150 | 4150 | 4150 |

*ion pair softener U.S. Pat. No. 6,245,197;

†debonder composed of propylene glycol, PEG alkyl mono-ester, PEG alkyl di-ester and dimethyl ditallow ammonium chloride;

‡Buckman 2616 Dryer Adhesion Aid;

**complex mixture of PEG esters (mono/di ester), PEG ether (ethoxylated alcohol) and Propylene glycol Converting Converted products were made from the basesheets described above as set forth in Table 9. For ease in manufacturing on converting lines set up for two ply products, the sheets to be embossed were wound together ("pre-plied") onto a single roll prior to embossing as indicated in column 2 of Table 9 by inclusion in parentheses followed by a "P", e.g., (N10C-N9CP) means that basesheets N10C from Table 8 and N9C were pre-plied together.

Tables 9 and 10 show the properties of the finished products.

TABLE 9

| Finished Products 198 ct. | | | | |
|---|---|---|---|---|
| Finished Product Description/Furnish | Finished Products & Base Sheets Combinations; first 2 base sheets listed pre-plied (pre-plied ID) | Basis Weight lb/R | MD/CD Tensile g/3" | Finished Product Embossed Caliper mils/8 plies |
| outside plies: 73% Euc/27% NSWK center: 65% SSWK/35% SHWK | N10.1: N10C, N9C, (N10C-N9CP), N10C | 31.9 | 1050/435 | N10.1: 144 |
| 27% SSWK/73% Eucalyptus | N8.3: N8C, N9C, (N8C-N9CP), N8C | 31.9 | 1050/435 | N8.3: 144 |
| All 3 plies: 35% SSWK/65% SHWK | N9.1: N9C, N9C, (N9C-N9CP), N9C | 31.9 | 1050/435 | N9.1: 138 |
| all 3 plies: 73% Euc/27% NSWK | N10.3: N10C, N10C, (N10C-N10CP), N10C | 31.9 | 1050/435 | N10.3: 144 |

TABLE 10

| Converted Products: 198 ct | | | | |
|---|---|---|---|---|
| Finished Product Description & Furnish | Finished Products & Base Sheets Combinations | BW lb/R | MD/CD g/3" | Desired finished product embossed caliper mils/8 plies |
| Base line: 3 identical plies: 73% eucalyptus: 27% SSWK | N8.1G: N8C, N8C, (N8C-N8CP), N8C | 31.9 | 1050/435 | N8.1G: 144 |

Converting Experimental Procedure

Table 6 contains operating conditions for converting.

198-count, 4.90" roll diameter product were the only product made during this initial screening trial.

Trial Results

Summary of Process Conditions

1. Rubber backup roll was 3 months old, dual durometer at 60 Shore A durometer. The surface of the roll was smooth and in good condition.
2. Emboss nip width was set at the maximum possible for the line ~2.25 inches and was even on both ends.
3. Feed roll gap was set at 0.015 inches to enable the rewinder to feed the sheet through, without reducing caliper.
4. Standard perf blades (0.031×50 bonds=1.55 inch bond width).

Summary of Physical Properties and Sensory Softness:

The following is a summary of the physical properties and sensory softness for this product.

1. A sensory softness of 18.84, was obtained. The lower value for this Example was attributed to high modulus (69.2 g/% stretch compared to O-10.1 at 52.9 g/% stretch) flowing from higher tensile strength (1134 MD/509 CD g/3 inches) compared to O-10.1 tensiles at 809 MD/414 CD g/3 inches and the presence of 30% baled pine in the furnish as compared to all northern softwood in the O-10.1 product.
2. Caliper obtained varied from 125 to 142 mils/8 plies.
3. Roll compression of 24% was obtained.
4. Basis weight of 33.5 lb/R was obtained.
5. Ply bond was excellent at 8 grams with a perf tensile of 597 g/3 inches.

Preliminary Results for 3-ply Ultra Prototypes

Background

Eight prototypes/structures of 3-ply bath tissue prototypes were generated using base sheets made with three different furnish blends comprising:

(i) 100% Southern furnish (65% SHWK/35% SSWK);

(ii) furnish of 70% Eucalyptus: 30% SSWK; and (iii) furnish of 73% Euc: 27% NHWK, the furnish blends ranging in coarseness to length ratio from 6.75 for (i) 100% Southern furnish, 6.0 for (ii) (70% Eucalyptus/30% SSWK) and 5.4 for (iii) (73% Eucalyptus: 27% NHWK). In addition, 3-ply structures comprising either calendered or uncalendered middle plies were produced to demonstrate the effect of calendaring the interior ply on softness and bulk.

Summary of Key Results

Finished product physical properties and sensory softness values for the trial prototypes are shown in Table 11.

Sensory softness values were highest (19.0 to 19.1) for prototypes made with premium fiber on outer plies.

Middle ply comprising non-premium furnish (65% Gum/35% Pine) does not negatively impact sensory softness.

The apparent advantage of using an uncalendered middle ply (in terms of increased bulk) was slight with exception of prototypes made with all local fiber.

TABLE 11

| Core Design QNBT Ultra 3-Ply Prototypes: Physical Properties and Sensory Softness | | | | | |
|---|---|---|---|---|---|
| Attribute | O-10.1 | N10.3 | N10.1 | N8.3 | N9.1 |
| Furnish/Format | AP/C* | AP/C | PLC/C† | CLC/C | AL/C |
| Basis Weight (lbs/ream) | 31.9 | 32.4 | 33.4 | 33.5 | 34.2 |
| Caliper (mils/8 sheets) | 143.5 | 142.4 | 144.2 | 142.9 | 150.6 |
| MD Dry Tensile (g/3") | 809 | 1022 | 1027 | 1165 | 1019 |
| CD Dry Tensile (g/3") | 414 | 404 | 416 | 429 | 429 |
| GMT (g/3") | 579 | 642 | 653 | 706 | 661 |
| MD Stretch (%) | 18.5 | 20.1 | 18.7 | 20.5 | 20.4 |
| CD Stretch (%) | 6.6 | 6.3 | 6.7 | 6.8 | 7.2 |
| Perforation Tensile (g/3") | 461 | 434 | 468 | 488 | 485 |

TABLE 11-continued

| Core Design QNBT Ultra 3-Ply Prototypes: Physical Properties and Sensory Softness | | | | | |
|---|---|---|---|---|---|
| Attribute | O-10.1 | N10.3 | N10.1 | N8.3 | N9.1 |
| CD Wet Tensile (g/3") | 44 | 38 | 42 | 40 | 40 |
| Break Modulus (g/% strain) | 52.9 | 56.4 | 59.2 | 59.9 | 54.9 |
| Friction (GMMMD) | 0.590 | 0.728 | 0.572 | 0.606 | 0.572 |
| MB 3100 Brightness (%) | 87.6 | 89.3 | 87.3 | 87.1 | 83.7 |
| MB3100 L* | 97.02 | 97.63 | 97.27 | 97.29 | 96.59 |
| MB 3100 b* | 3.74 | 3.57 | 4.42 | 4.60 | 6.00 |
| Opacity | 75.4 | 75.9 | 75.5 | 75.2 | 73.9 |
| Roll Diameter (inches) | 4.85 | 4.84 | 4.88 | 4.87 | 4.86 |
| Roll Compression (%) | 20.3 | 19.5 | 19.1 | 19.0 | 17.5 |
| T N Ply Bond (g) | 3.28 | 4.09 | 5.59 | 5.23 | 1.54 |
| Sensory Softness | 19.5 | 19.1 | 19.1 | 18.8 | 18.6 |

*AP = 73% Euc. & 27% NSWK in all plies;
PLC indicates the presence of 73% Euc. & 27% NSWK in the outer plies with 30% SSWK and 70% SHWK in the center;
CLC indicates the presence of 73% Eucalyptus. & 27% NSWK in the outer plies with 30% SSWK and 70% SHWK in the center;
AL = 30% SSWK & 70% SHWK in all plies;
/C indicates that the center ply was calendered.

In addition to the core cells produced, additional 3-ply prototypes were made using different embossing formats to determine which process generates best clarity of emboss.

Table 12 displays the additional embossed product formats. All products were made with (73% Eucalyptus: 27% SSWK outer plies and 70% SHWK: 30% SSWK uncalendered middle ply.

TABLE 12

| Converting Alternatives | | | | |
|---|---|---|---|---|
| Prototype | Embossing Format | Sheet Count | Emboss Clarity | Sensory Softness |
| 1 | 2-ply emboss<br>1-ply unemboss | 198 ct | 4 | 18.5 |
| 2 | All plies embossed | 231 ct* | 4 | 18.1 |

Summary of Key Results for Additional Products

Finished product physical properties and sensory softness values for the trial prototypes are shown in Tables 11 and 13.

1. Embossing 2 plies and not splitting them resulted in higher emboss clarity, and lower sensory softness (−0.4), but, surprisingly, caliper was actually 4 mils/8 plies higher.
2. Embossing all 3 plies and leaving them together resulted in −0.8 sensory softness and 10 mils/8 plies lower caliper. Ply bond without spot glassining was very low.
3. Embossing all 3 plies and splitting them resulted in essentially the same physical properties and sensory softness as embossing 2 plies and splitting them, except that the spot glassined product had 2 g/3 inches higher ply bond. The product with no spot glassining had very little ply bond.
4. The 308 ct. product at 5.65" roll diameter had 11 mils/8 plies lower caliper but equal sensory softness compared to the N8.4 198 ct. product.

TABLE 13

| Finished Product Physical Properties and Sensory Softness Values | | | |
|---|---|---|---|
| Attribute | N8.5 | N8.7 | N8.6 |
| Sheet Count | 198 | 231 | 198 |
| Furnish/Format | Current Local Center Uncalendered | Current Local Center Uncalendered | Current Local Center Uncalendered |

TABLE 13-continued

| Finished Product Physical Properties and Sensory Softness Values | | | |
|---|---|---|---|
| Attribute | N8.5 | N8.7 | N8.6 |
| Embossing Process | 2 ply emboss, 1-ply unemboss | All plies embossed | All plies embossed All plies split, Spot glassined |
| Basis Weight (lbs/ream | 33.5 | 32.9 | 32.8 |
| Caliper (mils/8 sheets) | 147.7 | 134.7 | 144.9 |
| MD Dry Tensile (g/3") | 1028 | 1115 | 1078 |
| CD Dry Tensile (g/3") | 416 | 464 | 469 |
| GMT (g/3") | 653 | 719 | 711 |
| MD Stretch (%) | 18.7 | 19.1 | 18.4 |
| CD Stretch (%) | 5.8 | 7.8 | 7.5 |
| Perforation Tensile (g/3") | 502 | 457 | 477 |
| CD Wet Tensile (g/3") | 39 | 38.6 | 38.4 |
| Break Modulus (g/% strain) | 62.5 | 58.7 | 60.2 |
| Friction (GMMMD) | 0.816 | 0.805 | 0.567 |
| MB 3100 Brightness (%) | 86..8 | 86.8 | 86.9 |
| MB 3100 b* | 4.42 | 4.49 | 4.39 |
| Opacity | 74.5 | 74.3 | 74.4 |
| Roll Diameter (inches) | 4.92 | 4.96 | 4.86 |
| Roll Compression (%) | 22.2 | 19.2 | 20.5 |
| TMI Ply Bond (g) | 4.11 | 0.11 | 6.78 |
| Sensory Softness | 18.5 | 18.1 | 18.8 |

As our invention, we claim:

1. A multi-ply cellulosic tissue comprising: an outer ply bearing a pattern of marks chosen from the group comprising: an embossed pattern; wire marks from a drying fabric; wire marks from an imprinting fabric; wire marks from a forming fabric; creping fabric marks from a creping fabric; printed designs and watermarks; in a first pattern, and an inner ply joined to said outer ply by a plurality of spot embosses, wherein said spot embosses comprise a plurality of glassined spot embosses arrayed in a meandering path interspersed amongst said first pattern, wherein at least said outer ply of tissue comprises a plurality of micro-embossed regions, each comprising an array of closely adjacent regularly spaced micro-emboss elements of a substantially uniform size; said glassined spot embosses:

(a) having an area between 25% and 400% of the area of the closely adjacent regularly spaced micro-emboss elements;

(b) being arranged along a meandering path; and (c) providing a ply bond strength of at least about 0.7 g/" between said outer ply and said inner ply;

each region of said plurality of micro-embossed regions on said outer ply comprises an area having an irregular, non-linear outline having components extending in both the machine direction and the cross direction; and said meandering path of glassined spot embosses by which said outer ply is joined to said inner ply meanders over a path which varies by at least about ¼" in the cross-machine direction and provides a ply bond strength of at least about 1.5 g/" between said outer ply and said inner ply.

2. The multi-ply tissue of claim 1 wherein spot embosses joining said inner ply to said outer ply have an area between one twentieth and no more than 4 times the area of marks in said plurality of marks in said first pattern.

3. The multi-ply tissue of claim 1 wherein a first plurality of marks in said first pattern range from oval to oblong to circular in shape and have an aspect ratio between 1 and 3 and wherein a second plurality of spot embosses joining said inner ply to said outer ply have an aspect ratio between 1 and 3 times the aspect ratio of marks in the first plurality of marks.

4. The multi-ply tissue of claim 1, wherein a plurality of marks in said first pattern are of generally equivalent size and shape ranging from oval to oblong to circular in shape, and have an aspect ratio between 1 and 3 and a plurality of spot embosses joining said inner ply to said outer ply are of generally equivalent size and shape thereto.

5. The multi-ply tissue of claim 1, wherein: each glassined spot emboss joining said outer ply to said inner ply has an area of between about 25% and about 200% of the area of said individual micro-embosses.

6. The multi-ply tissue of claim 1 wherein: the meandering path along which lie said glassined spot emboss joining said outer ply to said inner ply is a sinuous path having a tangent disposed at an angle of between 20° and 70° from the machine direction of said tissue over at least about 40% of its length.

7. The multi-ply tissue of claim 1 wherein: the meandering path along which lie said glassined spot emboss joining said outer ply to said inner ply is generally sinusoidal.

8. The multi-ply tissue of claim 1 wherein said glassined spot embosses provided a ply bond strength of at least about 1.5 g/" between said outer ply and said inner ply.

9. The multi-ply tissue of claim 1 wherein said glassined spot embosses provided a ply bond strength of at least about 2.5 g/" between said outer ply and said inner ply.

10. The multi-ply tissue of claim 1 wherein said glassined spot embosses provided a ply bond strength of at least about 5 g/" between said outer ply and said inner ply.

11. The multi-ply tissue of claim 1 wherein said glassined spot embosses provided a ply bond strength of at least about 7.5 g/" between said outer ply and said inner ply.

12. A multi-ply tissue product comprising at least one ply bearing a pattern of marks chosen from the group comprising: an embossed pattern; wire marks from a drying fabric; wire marks from an imprinting fabric; wire marks from a forming fabric; creping fabric marks from a creping fabric; printed designs and watermarks; and at least one other ply, said one ply being joined to said other ply by glassined spot embosses arranged on a meandering path interspersed with and obscured by marks on said one ply, wherein each said glassined spot emboss has an area of between 50 square mils and 1000 square mils.

13. The multi-ply tissue product of claim 12 wherein said glassined spot embosses are arrayed in a substantially continuous sinuous path.

14. The multi-ply tissue product of claim 12 wherein each said glassined spot emboss has an area of between 100 square mils and 500 square mils.

15. The multi-ply tissue product of claim 12 wherein said glassined spot embosses are arrayed on a sinuous path meandering over lateral extent of between ¼" and 1".

16. The multi-ply tissue product of claim 15 wherein each said spicule has a generally flat contact area defined at its outermost peripheral extent having an area of between 100 square mils and 500 square mils.

17. The multi-ply tissue product of claim 15 wherein said glassined spot emboss are arrayed on a sinuous path meandering over a lateral extent of between ¼" and 1".

18. The multi-ply tissue product of claim 17 wherein between about 5 and 50 glassined spot embosses are provided per MD inch of the tissue product.

19. The multi-ply tissue product of claim 17 wherein between about 10 and 30 glassined spot embosses are provided per MD inch of the tissue product.

20. A multi-ply cellulosic tissue comprising: an outer ply bearing a pattern of marks chosen from the group comprising: an embossed pattern; wire marks from a drying fabric; wire marks from an imprinting fabric; wire marks from a forming fabric; creping fabric marks from a creping fabric; printed designs and watermarks; in a first pattern and an inner ply joined to said outer ply by a plurality of spot embosses, wherein said plurality of spot embosses comprises a plurality of glassined spot embosses arrayed on a path interspersed amongst said first pattern, said spot embosses comprising an elongated central region and a pair of shoulders extending away from said elongated central region generally in the cross direction and extending upwardly toward the surface of said multi-ply cellulosic tissue at an angle of less than 30°, wherein at least said outer ply of tissue comprises a plurality of micro-embossed regions, each comprising an array of closely adjacent regularly spaced micro emboss elements of a substantially uniform size; said glassined spot embosses having an area between 25% and 400% of the area of the closely adjacent regularly spaced micro-emboss elements, providing a ply bond strength of at least about 0.7, 1.0, 1.5, 3, 5, or 7 g/in between said outer ply and said inner ply, wherein each said spot emboss has a generally flat contact region having an area of between 50 square mils and 1000 square mils.

21. The multi-ply tissue of claim 20 wherein spot embosses joining said inner ply to said outer ply have an area between one twentieth and no more than 4 times the area of the most common marks in said plurality of marks in said first pattern.

22. The multi-ply tissue of claim 20, wherein said glassined elongated central regions joining said inner ply to said outer ply have a length of between 0.025" and 0.06" and a width of between 0.005" and 0.015".

23. The multi-ply tissue of claim 20 wherein a first plurality of marks in said first pattern range from oval to oblong to circular in shape and have an aspect ratio between 1 and 3 and wherein a second plurality of spot embosses joining said inner ply to said outer ply have an aspect ratio between 1 and 3 times the aspect ratio of marks in the first plurality of marks.

24. The multi-ply tissue of claim 20, wherein a plurality of marks in said first pattern are of generally equivalent size and shape ranging from oval to oblong to circular in shape, and have an aspect ratio between 1 and 3 and a plurality of spot embosses joining said inner ply to said outer ply are of generally equivalent size and shape thereto.

25. The multi-ply tissue of claim 20, wherein: each glassined spot emboss joining said outer ply to said inner ply has an area of between about 25% and about 200% of the area of said individual micro-embosses.

26. The multi-ply tissue of claim 20 wherein said spot embosses lie on a path extending generally in the machine direction of said tissue and with between about 3 and 30 spot embosses per inch being provided.

27. The multi-ply tissue of claim 20 wherein said spot embosses lie on a path extending generally in the machine direction of said tissue and with between about 5 and 25 spot embosses per inch being provided.

28. A multi-ply tissue product comprising at least one ply bearing a pattern of marks chosen from the group comprising: an embossed pattern; wire marks from a drying fabric; wire marks from an imprinting fabric; wire marks from a forming fabric; creping fabric marks from a creping fabric; printed designs and watermarks; and at least one other ply, said one ply being joined to said other ply by glassined spot embosses arranged on a meandering path interspersed with and obscured by marks on said one ply, each said glassined spot emboss being elongate in shape with the long dimension thereof being between 0.02" and 0.1", the width thereof being between 0.002 and 0.015", with the long dimension of said peak being at an angle of between 20° and 40° from the machine direction and two of said shoulders adjoining the narrows of said elongate region and extending generally in the cross-machine direction decline from the height of said peak at angles less than 20° over a length of at least about 0.08" while two of said shoulders adjoining the length of said elongate region and extending generally in the machine direction between peaks decline at angles of greater than 20°, forming valleys between said peaks, the width of each said valley being between about 0.05" and 0.25".

29. The multi-ply tissue product of claim 28 wherein said glassined spot embosses are arrayed in a substantially continuous meandering path.

30. The multi-ply tissue product of claim 28 wherein each said glassined spot emboss has an area of between 50 square mils and 1000 square mils.

31. The multi-ply tissue product of claim 28 wherein each said glassined spot emboss has an area of between 100 square mils and 500 square mils.

32. The multi-ply tissue product of claim 28 wherein said glassined spot embosses are arrayed on a sinuous path meandering over lateral extent of between ¼" and 1".

33. The multi-ply tissue product of claim 32 wherein each said glassined spot emboss has a generally flat contact area defined at its outermost peripheral extent having an area of between 100 square mils and 500 square mils.

34. The multi-ply tissue product of claim 33 wherein said glassined spot emboss are arrayed on a sinuous path meandering over a lateral extent of between ¼" and 1".

35. The multi-ply tissue product of claim 34 wherein between about 5 and 50 glassined spot embosses are provided per MD inch of the tissue product.

36. The multi-ply tissue product of claim 34 wherein between about 10 and 30 glassined spot embosses are provided per MD inch of the tissue product.

* * * * *